United States Patent
Joergensen

(10) Patent No.: US 9,217,551 B2
(45) Date of Patent: Dec. 22, 2015

(54) LIGHT COLLECTOR WITH A PLURALITY OF MERGED LENSLETS HAVING DIFFERENT OPTICAL POWER

(71) Applicant: Martin Professional ApS, Aarhus N (DK)

(72) Inventor: Dennis Joergensen, Roende (DK)

(73) Assignee: Martin Professional ApS, Aarhus N (DK)

( * ) Notice: Subject to any disclaimer, the term of this patent is extended or adjusted under 35 U.S.C. 154(b) by 0 days.

(21) Appl. No.: 14/562,331

(22) Filed: Dec. 5, 2014

(65) Prior Publication Data

US 2015/0159829 A1 Jun. 11, 2015

(30) Foreign Application Priority Data

Dec. 5, 2013 (DK) .................................. 2013 70746

(51) Int. Cl.
| | |
|---|---|
| *F21V 13/02* | (2006.01) |
| *F21V 13/00* | (2006.01) |
| *F21V 5/00* | (2015.01) |
| *F21W 131/406* | (2006.01) |
| *F21Y 101/02* | (2006.01) |

(Continued)

(52) U.S. Cl.
CPC .......... *F21V 5/007* (2013.01); *F21W 2131/406* (2013.01); *F21Y 2101/02* (2013.01); *F21Y 2105/001* (2013.01); *G02B 19/0014* (2013.01); *G02B 19/0047* (2013.01)

(58) Field of Classification Search
CPC ................. F21V 5/007; G02B 19/0014; G02B 19/0047; F21Y 2105/001; F21W 2131/406
USPC ........................................................ 362/237
See application file for complete search history.

(56) References Cited

U.S. PATENT DOCUMENTS

| 5,309,277 A | 5/1994 | Deck |
| 5,402,326 A | 3/1995 | Belliveau |

(Continued)

FOREIGN PATENT DOCUMENTS

| EP | 1710493 A2 | 10/2006 |
| JP | 2005347279 A | 12/2005 |

(Continued)

OTHER PUBLICATIONS

Search Report and Written Opinion for corresponding Application No. PA 2013 70745, mailed Jul. 21, 2014, 6 pages.

(Continued)

*Primary Examiner* — Joseph L Williams
(74) *Attorney, Agent, or Firm* — Brooks Kushman P.C.

(57) ABSTRACT

The present invention relates to an illumination device comprising a plurality of light sources emitting light, an optical gate; a light collector arranged between the light sources and optical gate and an optical projecting system adapted to image the optical gate at a distance along the optical axis. The light collector is adapted to collect light from a plurality of light sources and where the light collector comprises a plurality of lenslets collecting light from the light sources and convert the light into a plurality of light beams propagating along an optical axis. The lenslets are arranged in a dense pattern including adjacent lenslets, where the lenslets of at least some of the pairs of the adjacent lenslets have different optical power and wherein the exit surfaces of the pairs of the adjacent lenslets having different optical power meet along a boundary.

20 Claims, 25 Drawing Sheets

(51) Int. Cl.
    *F21Y 105/00* (2006.01)
    *G02B 19/00* (2006.01)

(56) References Cited

U.S. PATENT DOCUMENTS

| | | | |
|---|---|---|---|
| 5,850,126 A | 12/1998 | Kanbar | |
| 6,227,669 B1 | 5/2001 | Tiao et al. | |
| 6,402,347 B1 | 6/2002 | Maas et al. | |
| 6,443,594 B1 | 9/2002 | Marshall et al. | |
| 6,601,973 B2 | 8/2003 | Rasmussen et al. | |
| 6,687,063 B1 | 2/2004 | Rasmussen et al. | |
| 7,226,185 B2 | 6/2007 | Dolgin et al. | |
| 2006/0078015 A1 | 4/2006 | Franck | |
| 2008/0084693 A1 | 4/2008 | Shimada et al. | |
| 2009/0122548 A1 | 5/2009 | Dalsgaard | |
| 2010/0073783 A1 | 3/2010 | Sun | |
| 2012/0121244 A1 | 5/2012 | Stavely | |
| 2012/0127710 A1 | 5/2012 | Jurik et al. | |
| 2012/0319616 A1 | 12/2012 | Quilici et al. | |

FOREIGN PATENT DOCUMENTS

| | | |
|---|---|---|
| JP | 2006269182 A | 10/2006 |
| KR | 200446413 | 10/2009 |
| WO | 0102771 A1 | 1/2001 |
| WO | 0198706 A1 | 12/2001 |
| WO | 03025458 A1 | 3/2003 |
| WO | 2006023180 A1 | 3/2006 |
| WO | 2011076213 A1 | 6/2011 |
| WO | 2011076219 A1 | 6/2011 |
| WO | 2011100973 A1 | 8/2011 |
| WO | 2013060329 A1 | 5/2013 |

OTHER PUBLICATIONS

Search Report and Written Opinion for corresponding Application No. PA 2013 70746, mailed Jul. 22, 2014, 6 pages.
Search Report and Written Opinion for corresponding Application No. PA 2013 70747, mailed Jul. 21, 2014, 8 pages.
Lubachevsky et al., "Curved Hexagonal Packings of Equal Disks in a Circle", Discrete & Computational Geometry, 18, 1997, pp. 179-194.
Lubachevsky et al., "Geometric Properties of Random Disk Packings", Journal of Statistical Physics, vol. 60, Nos. 5/6, 1990, pp. 561-583.
Lubachevsky et al., "Dense Packings of 3k(k+1)+1 Equal Disks in a Circle for k = 1, 4, and 5", Springer Lecture Notes in Computer Science 959, 1996, 18 pages.
Graham et al., "Dense Packings of Equal Disks in an Equilateral Triangle: From 22 to 34 and Beyond", The Electronic Journal of Combinatorics, 2, 1995, 39 pages.
Lubachevsky, "How to Simulate Billiards and Similar Systems", J. Computational Physics, 94, 1991, 29 pages.
Innobiz document related to KR 20-0446413, Oct. 28, 2009, 2 pages.

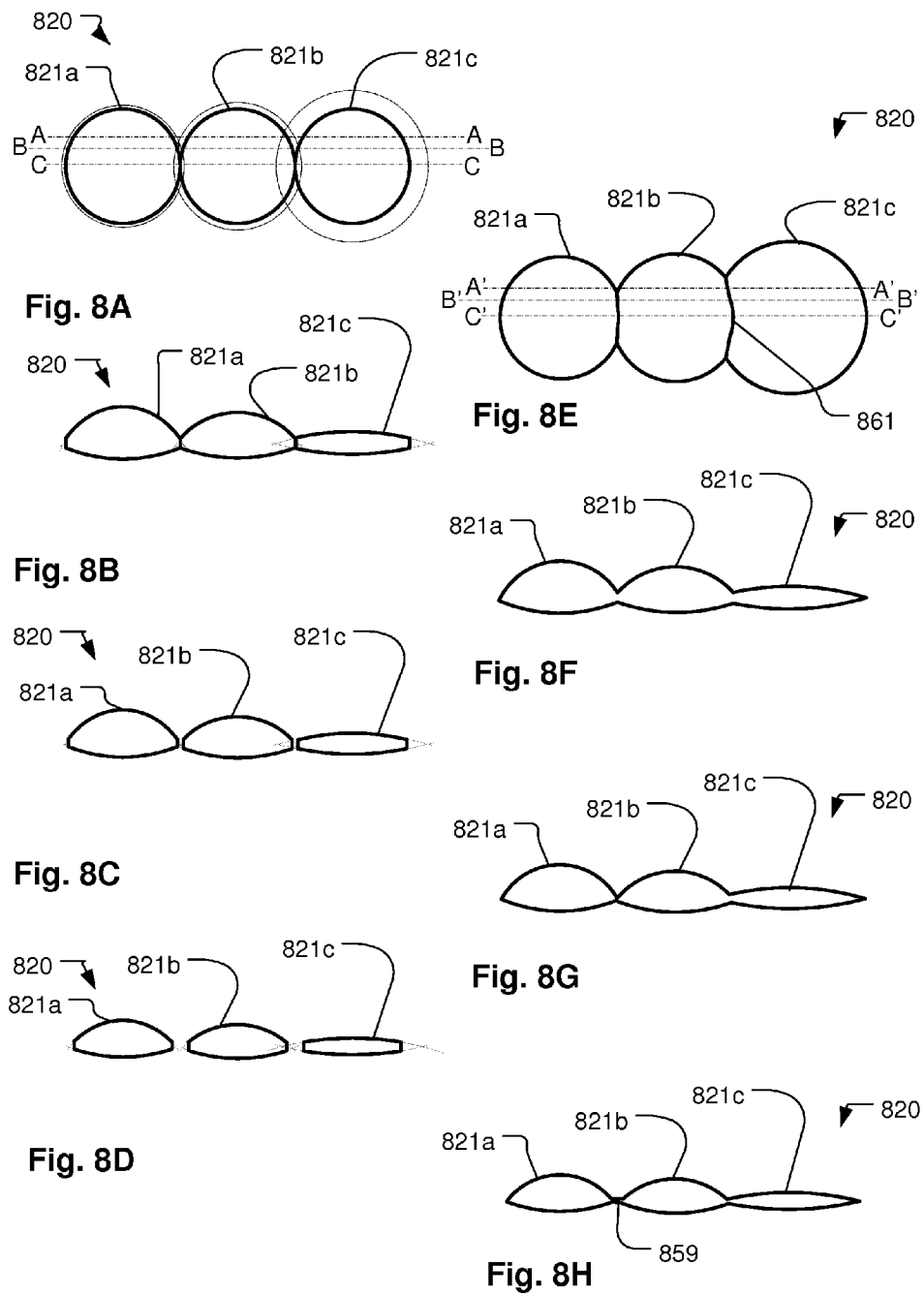

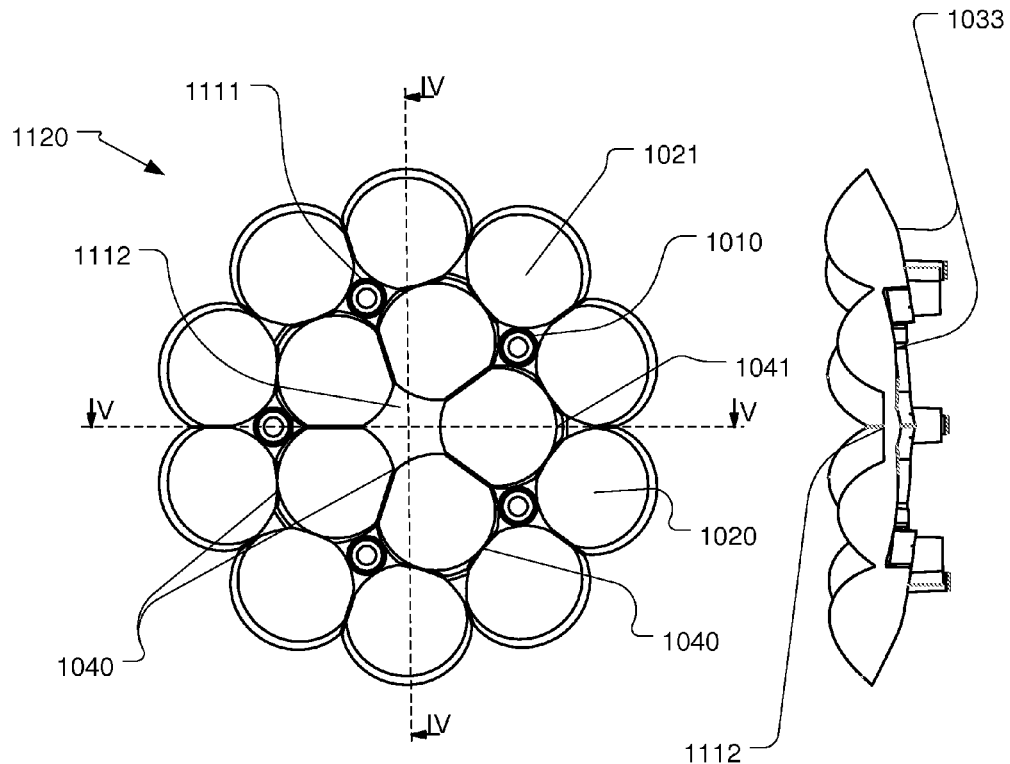
Fig. 11A
Fig. 11B
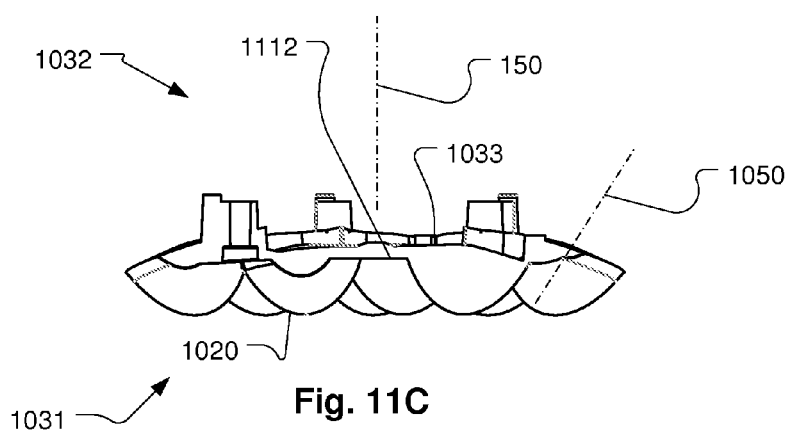
Fig. 11C

LIGHT COLLECTOR WITH A PLURALITY OF MERGED LENSLETS HAVING DIFFERENT OPTICAL POWER

CROSS-REFERENCE TO RELATED APPLICATIONS

This application claims priority to DK Application No. PA201370746, filed Dec. 5, 2013, the disclosure of which is incorporated in its entirety by reference herein.

TECHNICAL FIELD

The invention relates to optical lenses, particularly optical lenses and lens arrays for collecting light from arrays of light sources.

BACKGROUND

In order to create various light effects and mood lighting in connection with concerts, live shows, TV shows, sport events or as a part of an architectural installation light fixtures creating various effects are getting more and more used in the entertainment industry. Typically, entertainment light fixtures create a light beam having a beam width and a divergence and can for instance be wash/flood fixtures creating a relatively wide light beam with a uniform light distribution or it can be profile fixtures adapted to project images onto a target surface.

Light emitting diodes (LED) are due to their relatively high efficiency, low energy consumption, long lifetime, and/or capability of electronic dimming, becoming more and more used in connection with lighting applications. LEDs are used in lighting applications for general illumination such as wash/flood lights illuminating a wide area or for generating wide light beams e.g. for the entertainment industry and/or architectural installations. For instance like in products like MAC 101™, MAC 301™, MAC 401™, MAC Aura™, MAC Quantum™, Stagebar2™, Easypix™, Extube™, Tripix™, Exterior 400™ series provided by Martin Professional. Further LEDs are also being integrated into projecting systems where an image is created and projected towards a target surface. For instance like in the product MAC 350 Entrour™ provided by Martin Professional.

Different kinds of LEDs are currently commercially available. For instance LEDs may be provided as colored LEDs emitting light having a relatively narrow spectral bandwidth and thus emitting light of a single color. Typically, LED based lighting products include a number of these LEDs of different colors, and light generated by the LEDs provided are combined into an outgoing light beam. The intensity of each color can be adjusted relatively to each other whereby the color of the outgoing light beam can be varied as known in the art of additive color mixing. These lighting products can thus create any color within the color gamut defined by the color of the LEDs. Typically, this kind of lighting products include red LEDs, green LEDs and blue LEDs and are known as RGB lighting products. The RGB lighting products can produce red, green and blue by turning the LED of only one color on while turning the remaining colors off. Further, the RGB products can produce white light by turning all colors on (and approximately at the same intensity) at the same time. However, the color rendering index (CRI) of the white light is very low due the fact that the white light is created by combining light with a narrow spectral bandwidth. The consequence is that an object illuminated by this white light, is not reproduced in its natural colors (as it appears when illuminated by sun light).

LEDs are also provided as white LEDs that are adapted to emit light having a broad spectral bandwidth and these may further be provided with different color temperature. These LEDs have a high CRI, as they emitted light over a large spectral bandwidth and are thus used in LED based lighting products to create bright white light, which can be used to illuminate objects and reproduce the objects in substantially its natural color. However, LED based lighting product based on white LEDs cannot create colored light beams without using a color filter as known in the art of subtractive color filtering.

RGBW LED based lighting products, where a number of single color LEDs and a number of white LEDs are combined, are also provided in order to be able to create different colors using additive color mixing and to improve the CRI and the efficacy of the white light. This is achieved by replacing a number of the colored LED with a number of the white LEDs. The white LEDs provide light having a broad spectral bandwidth and the CRI of the white light produced by such device is thus improved by white LEDs and the intensity of the white light is also increased. However the down side is that the intensity of the satiated colors are reduced since there are fewer of these.

The LEDs are also provided in packages having a multiple amount of LED dies emitting light of different color and additionally also a LED die emitting white light. The LED dies can be controlled individual, whereby the relative intensity of the light emitted by each dies may be varied in relation to each other whereby the color of the outgoing light can be varied as known in the art of additive color mixing. Typically, these LED packages includes a red die, green die, blue die and a white die and are known as RGBW 4in1 LEDs. The RGBW 4in1 LED are often used in RGBW LED based lighting products as described above.

In general, it is desired to have a multi-colored LED lighting product with a high lumen and also a high CRI. However, this is hard to achieve with the LED types described above due to Etendue limitations as it is not possible to combine light from an unlimited amount of light sources into a light beam. The known LED based lighting products are as a consequence often designed for specific purposes and it is often necessary to have a large range of LED based lighting products in order to be able to provide a large variety of lighting solutions. This is especially the case in connection with projecting systems, where the light is coupled through an optical gate, where an image creating objects (GOBO) is positioned. An optical projecting system collects the light from the optical gate and is adapted to image the optical gate (and thus also the image creating object) at a target surface. The light beam is very narrow when it passes the optical gate and such projecting systems are thus limited by Etendue. The Etendue, $E=A*\Omega$, at the gate through which light is emitted has a limited opening area A and the imaging optics only collect light from a limited solid angle $\Omega$. For light sources, the Etendue can be calculated in the same way, where A is the radiating area, and $\Omega$ is the solid angle it radiates into. Further, it is also desired to have very compact illumination devices, which is difficult to achieve when more light sources are being integrated into the same illumination device.

In projecting systems, the light is generally collected into an optical gate where the image is generated, and an imaging optical system projects the gate onto a target surface. International Publication No. WO0198706, U.S. Pat. No. 6,227,669 and U.S. Pat. No. 6,402,347 disclose lighting systems comprising a number of LEDs arranged in a plane array where a converging lens is positioned in front of the LED in order to focus the light, for instance to illuminate a predetermined area/gate or for coupling the light from the diodes into an optical fiber.

U.S. Pat. No. 5,309,277, U.S. Pat. No. 6,227,669, International Publication No. WO0198706, Japanese Publication No. JP2006269182 A2, European Publication No. EP1710493 A2, U.S. Pat. No. 6,443,594 disclose lighting systems where the light from a number of LEDs is directed towards a common focal point or focusing area, for instance by tilting the LEDs in relation to the optical axis (Japanese Publication No. JP2006269182 A2, International Publication No. WO0198706, U.S. Pat. No. 5,309,277) or by using individually refracting means positioned in front of each LED (U.S. Pat. No. 6,443,594, U.S. Pat. No. 7,226,185B, European Publication No. EP1710493).

International Publication No. WO06023180 discloses a projecting system comprising a LED array with a multiple number of LEDs where the light from the LEDs is directed towards a target area. The LEDs may be mounted to a surface of a curved base.

The prior art fixtures try to increase the lumen output by adding as many light sources as possible. The consequence is, however, that the efficiency with regard to power consumption versus light output is very low, as it is fundamentally only possible to effectively utilize light sources of same or less Etendue as the imaging optics in this kind of optical system. So if the source Etendue is a close match to the Etendue of the imaging system there are no gains in using multiple sources in order to increase the light output (intensity/lumen) as the Etendue of the light sources then will be larger than the Etendue of the imaging system and the imaging system is thus not capable of collecting the light.

International Publication Nos. WO11076213 and WO11076219 disclose an illumination device comprises a light source module generation light, an aperture delimiting the optical gate and a projecting system adapted to image the optical gate at a target surface. The light source module comprises a number of light sources and a number of light collecting means. The light collecting means comprise a central lens aligned along and a peripheral lens at least partially surrounding the central lens. The central lens collects and converts a first part of the light from the light source images the light source between the aperture the projecting system. The peripheral lens part collects and converts a second part of said light from said light source and is adapted to concentrate said second part of said light at said aperture. The light source module comprises a cooling module including a number of interconnected plane mounting surfaces angled in relation to each other and where the light sources is arranged on said plane mounting surfaces. The cooling module comprises a first side including the mounting surfaces and a second side including a number of cooling fins defining a number of radial air channels.

Even though the illumination device disclosed by International Publication Nos. WO11076213 and WO11076219 is very effective, it has some disadvantages as it is relatively expensive to manufacture as the LEDs and TIR lenses needs to be arranged individually.

SUMMARY

The object of the present invention is to solve the above described limitations related to prior art or other problems of the prior art. This is achieved by an illumination device and method as described in the independent claims. The dependent claims describe possible embodiments of the present invention. The advantages and benefits of the present invention are described in the detailed description of the invention.

In summary, the invention relates to a light collector with a plurality of lenslets arranged in a dense circular pattern wherein the dense pattern has a circular outer periphery. The lenslets are configured to collect light from a corresponding plurality of light sources and to direct the collected light towards a gate or aperture contained in an illumination device. The illumination device comprises a light unit with the light sources, the light collector, the gate and an optical projecting system for projecting the light from the gate or image light from the gate towards a distant object such as a wall or screen.

BRIEF DESCRIPTION OF THE DRAWINGS

Embodiments of the invention will be described, by way of example only, with reference to the drawings, in which

FIGS. 8A-8H illustrate other principles for growing lenslets so that lenslets merges;

FIGS. 11A-11F illustrate views of a light collector with 15 lenslets;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
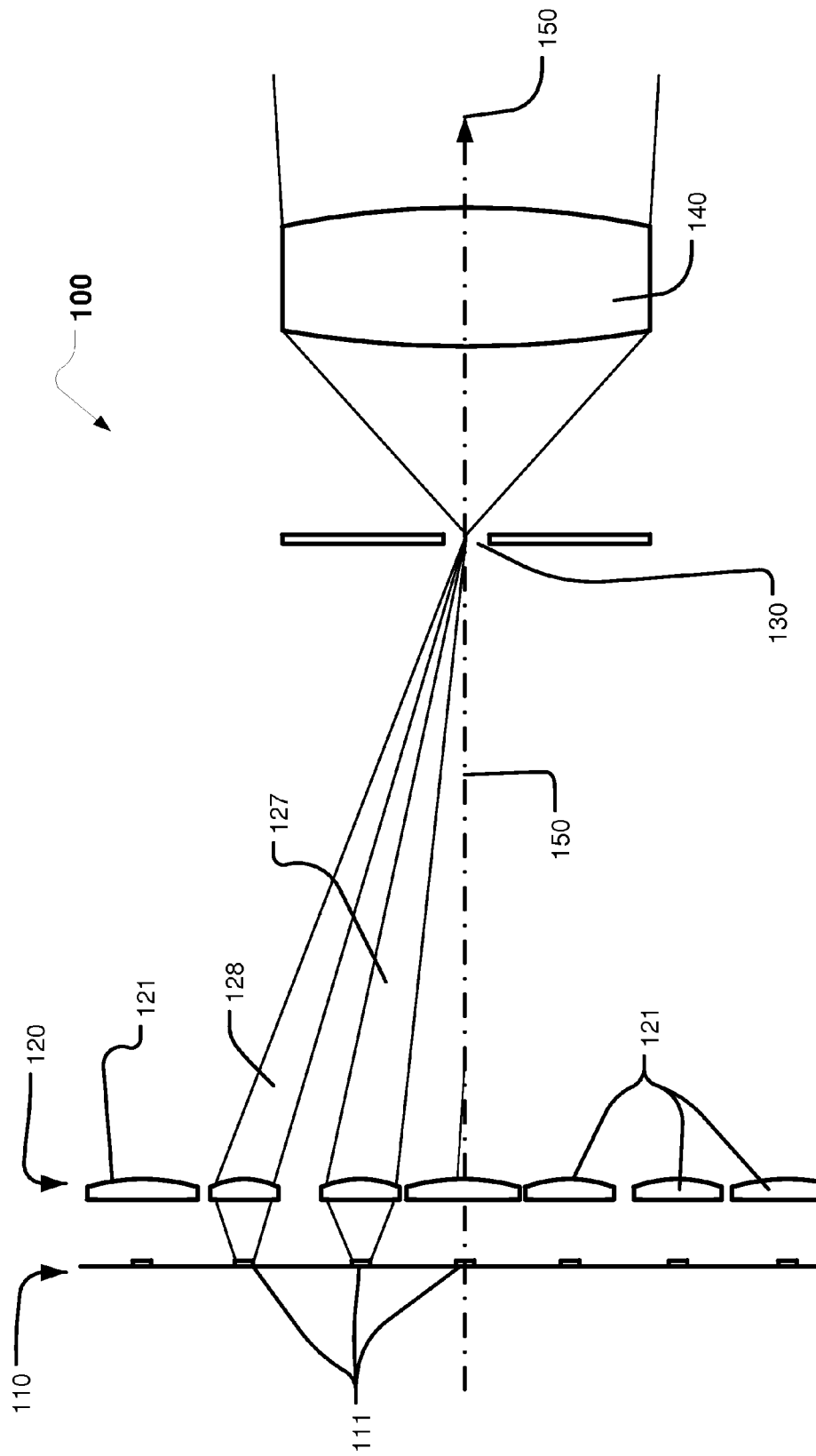
FIGS. 1A-1B illustrate an illumination device and a light collector used with the illumination device.
Figure 1B:
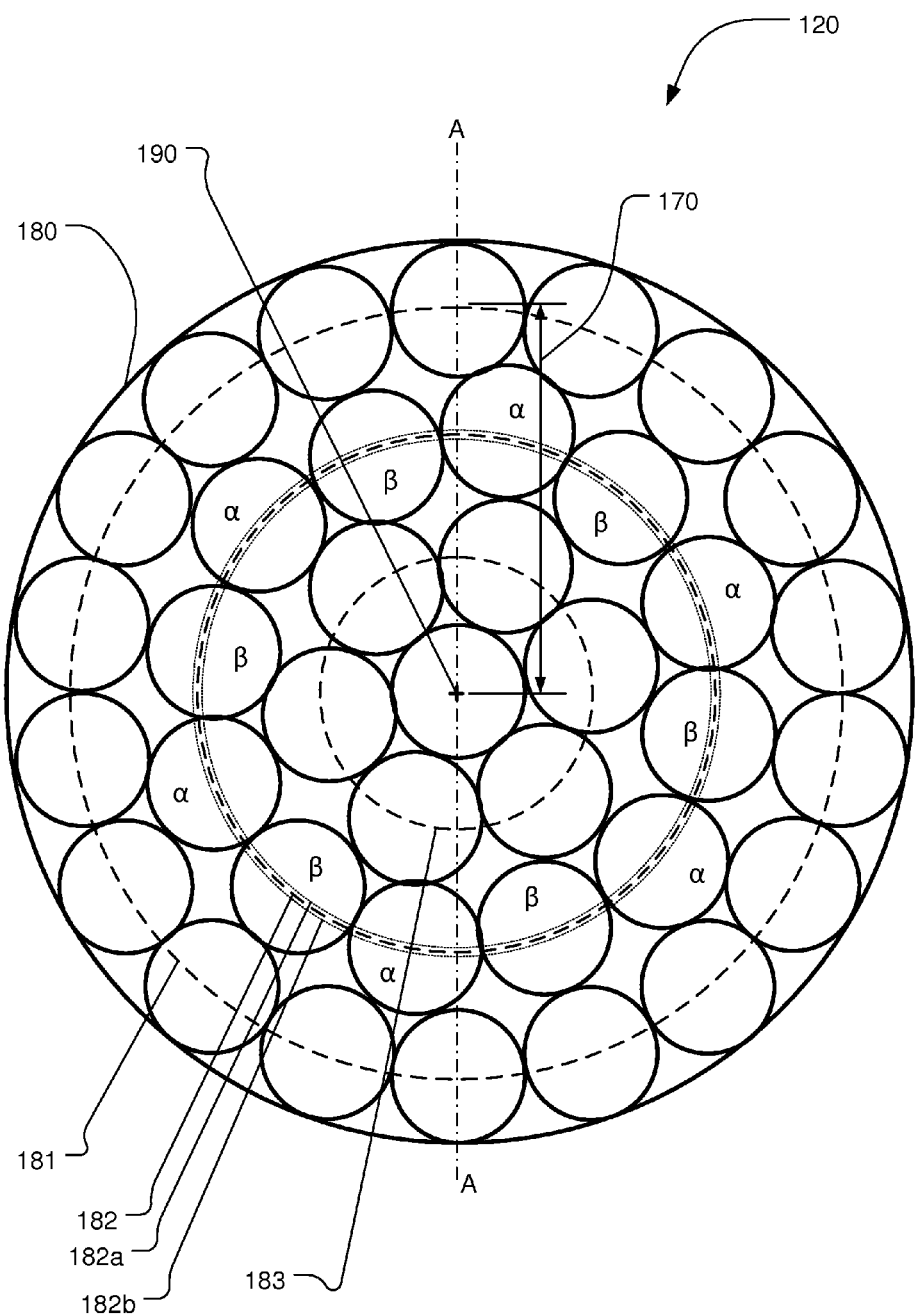

FIG. 1A illustrates a cross sectional view through the center of an illumination device 100 (indicated by dash-dotted line A-A in FIG. 1*b*). The illumination device comprises light unit 110 with a plurality of light sources 111, a light collector 120 with a plurality of lenslets 121, a gate 130 and an optical projecting system 140.

The light sources 111 may be in the form of light emitting diodes (LEDs), discharge lamps, organic light emitting diodes (OLEDs), PLED's, plasma sources, filament lamps, fluorescent light sources, phosphor based light sources, or other suitable light sources. A single light source 111 may contain one or more light sources units, for example, two or more light source units with different colors. For example, a light source may contain one light emitter for emitting e.g. white light, may contain three light emitting diodes with red, green and blue dies (known as a RGB 3in1 LEDs) or may contain four light emitting diodes with red, green, blue and white dies (known as a RGBW 4in1 LEDs).

The lenslets 121 are adapted to collect light from the light sources 111 and to convert the collected light into a plurality of light beams 127, 128 (not all shown) propagating along an optical axis 150.

It is understood that light beams 127, 128 propagating along the optical axis contain rays of light propagating at an angle, for example, an angle less than 45 degrees, to the optical axis. Accordingly, a vector representing a ray propagating along the optical axis contains a vector component which is parallel with the optical axis and a vector component which is perpendicular to the optical axis where the parallel vector component is larger than the perpendicular vector components.

The lenslets 121 may be configured to fill the gate 130 with light from the light sources 111 so that the area, i.e., the aperture, of the gate 130 is illuminated with a uniform intensity or optimized for max output. The gate 130 is arranged along the optical axis 150 and may be shaped as a circular aperture in an opaque plate.

The optical projecting system 140 may be configured to collect at least a part of the light beams 127, 128 transmitted through the gate 130 and to image the optical gate at a distance along the optical axis. For example, the optical projecting system 140 may be configured to image the gate 130 onto some object such as a screen, for example, a screen on a concert stage. A certain image, for example, some opaque pattern provided on a transparent window, an open pattern in a non-transparent material, or imaging object such as GOBOs known in the field of entertainment lighting, may be contained within the gate 130 so that that the illuminated image can be imaged by the optical projecting system 140. Accordingly, the illumination device 100 may be used for entertainment lighting.

Embodiments of the present invention relate primarily to the configuration of the light collector 120 and the configuration thereof in relation to the light unit 110 and the gate 130.

FIG. 1B illustrates the light collector 120 in a top view seen from the gate 130. Each lens is represented by a circle which corresponds to the footprint of a circle. Thus, each of the lenslets has a footprint of substantially uniform circular cross section and substantially equal size or footprint-area. The footprint of a lenslets refers to the basic form of the lenslets, however the actual shape of the lenslets may deviate from the circular footprint for instance due to grow of the lenslets as described elsewhere in the present application. Further, the lenslets 181 are arranged in a dense circular pattern as described elsewhere herein, i.e., so that a circumscribing circle 180 can be defined which connects with all of the outermost circles or lenslets 181 having the same distance 170 to the center of the light collector 120. There may be one lenslet 181 for each light source 111 (shown in FIG. 1A) so that there is a one-to-one correspondence between lenslets 181 and the light sources 111, i.e., so that each light source has an associated lenslet. However, one light source may contain one or more light source units possibly integrated into a single light source device such as a 3in1 or a 4in1 LEDs.

As an effect of the dense packing, the lenslets may be arranged in a number of rings 181, 182, 183 around the center 190 of the circumscribing circle 180. Accordingly, the lenslets may comprise a plurality of outermost adjacent lenslets with their center at the outermost ring 181 and located along an outer circular boundary 180. The outermost lenslets have the same radial distance 170 to a center of the light collector 120 or to a center of a center lenslet.

Lenslets located along the second outermost ring 182 may appear to be arranged at the same distance from the center 190, however in order to accomplish dense circular packaging, the lenslets in second outermost ring are actually arranged in an annular ring, where the annular rings are delimited by two concentric rings 182a and 182b (illustrated by thin dotted lines). The annular ring 182 comprises at least two set of lenslets, where each set of lenslets comprise a number lenslets having the same radial distance to the center of the light collector and where the radial distance to the center of the light collector are different for the two set of lenslets.

In the illustrated embodiment, every second lenslet in the annular ring 182 is arranged at the same distance from the center 190 of the light collector and arranged respectively with it's center at the first concentric ring 182a and the second concentric ring 182b, indicated at the inner and outer side of the circle 182. The second outermost ring comprises thus two set of lenslets, where each set of lenslets is arranged at the same radial distance from the center 190 of the circumscribing circle light collector. For instance, the first set of lenslets comprises the lenslets labeled with a and the lenslets of the second set of lenslets comprises the lens lets with β. Compared to the prior art where the hexagonal packaging of lenslets is considered as being most optimized, packaging some of the lenslets by packing the lenslets in annual rings as described above results it the fact that a more dense packing can be provided, as some lenslets encircling the center lenslet can be moved closer to the center and thereby utilize more of the dead space between the lenslets and thus be squeezed together. Where the dead space constitutes the areas of the light collector without lenslets.

Lenslets (or sets of lenslets) belonging to the same annular ring may be defined as lenslets having roughly the same radial distance to the center of the light collector, where roughly the same radial distance means that the difference between the radial distance of the outermost lenslet and the radial distance of the innermost lenslet is less than the half diameter of the lenslets. Lenslets located along one of the same one of the rings 182-183 except for the outermost circle 181 can be said to have at roughly the same radial distance to the center as can be verified from tables 1a-1l. Lenslets located at the outermost circle can be said to have the same radial distance to the center which can also be verified from tables 1a-1l.

The present invention relates also to a method for manufacturing a light collector adapted to collect light from a plurality of light sources, wherein the light collector comprises a plurality of lenslets adapted to collect light from the light sources and further adapted to convert the collected light into a plurality of light beams so that the light beams propagate along an optical axis, wherein each lenslet comprises an entrance surface where the light enters the lenslet and an exit surface where the light exits the lenslet, and wherein each lenslet has a substantial uniform circular cross section of the lenslet. The method comprises:

arranging the lenslets in a dense pattern, wherein the lenslets comprise a plurality of outermost lenslets located along an outer circular boundary, wherein each of the outermost lenslets has the same radial distance to a center of the light collector, and optimizing a packaging density defined by a ratio of a sum of areas of the circular cross sections of the lenslets and an area of the outer circular boundary.

Figure 2A:
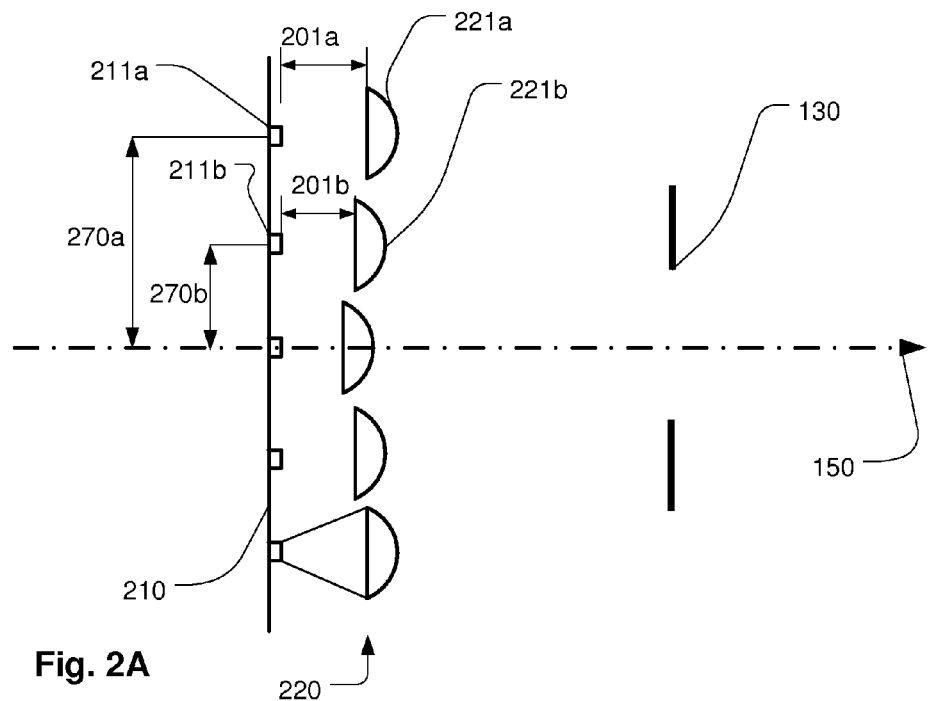
FIGS. 2A-2C illustrate different axial positions of the lenslets, different radial positions of lenslets relative to light sources, different tilt angles of lenslets relative to the optical axis.

FIG. 2A illustrates an embodiment in which the axial distances 201a and 201b between the lenslets 221a, 221b and the associated light sources 211a, 211b along the optical axis 150 for adjacent lenslets 221a, 221b are different for at least some of the adjacent lenslets.

The axial distances 201a and 201b may depend on a radial distance 270a and 270b from the lenslets or the corresponding light source to a center of the light collector or to the optical axis 150. Lenslets having the same radial distance to the center or optical axis have the same axial distance. Thus, lenslets having different radial distances or lenslets located along different rings 181-183 may have different axial distances and the different sets of lenslets in the annular rings may also have different axial distance.

The different axial distances may enable a suitable imaging of a light source 211 towards the gate 130 so that an imaging fills the gate 130 optimally and so that the imaging does not exceed the border of the gate 130.

The greater the radial center distance 270a; 270b for a lenslet is, the greater the distance is from the lenslet to the gate 130. The different distances from lenslets 22a1 and 222a to the gate 130 implies that the axial distances 201 need to be different in order to enable a suitable imaging of a light source 211 towards the gate 130.

Accordingly, in an embodiment wherein the axial distances 201 depend on a radial distance 270 from one of the adjacent lenslets to a center of the light collector or to the optical axis, lenslets having the same radial distances 270 to the center or lenslets located along the same ring 181-183 may also have the same axial distances 201.

The axial distances 201 may be within the range from 0 to 10 millimeters.

Figure 2B:
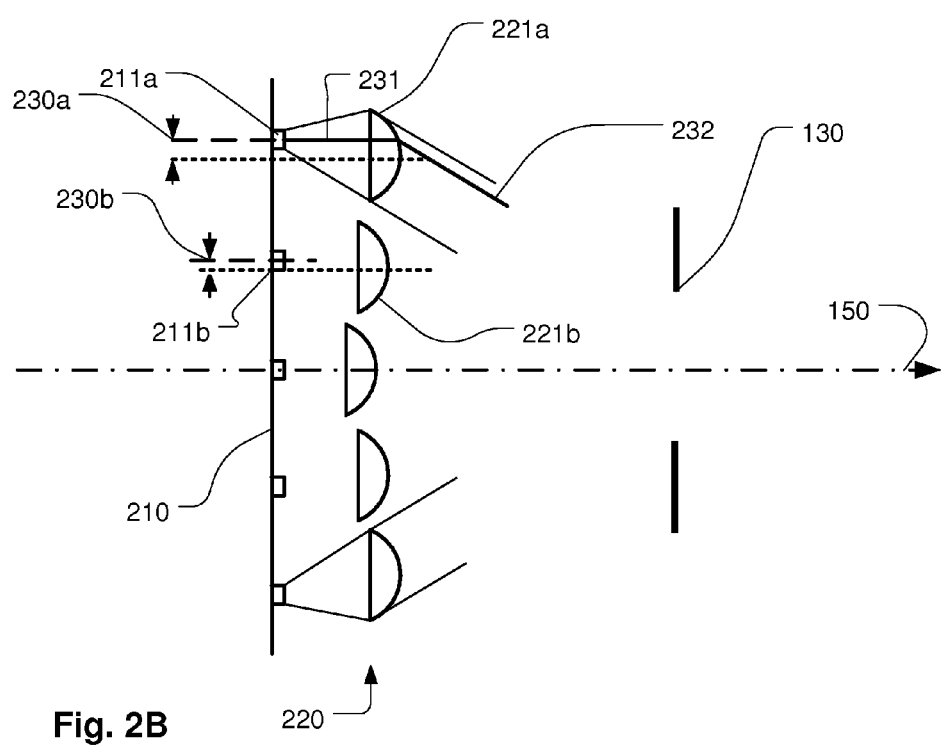

Additionally or alternatively to different axial distances 201 between the lenslets and light sources, at least some of the light sources 111 may be displaced relative to the associated lenslet 121 in a direction perpendicular or substantially perpendicular to the optical axis 150, for example, in a radial direction relative to the center of the light collector or optical axis. The displacement may be in a form so that the center of a light source 111 is displaced relative to the center of an associated lenslet 121 as shown by displacement 230a and 230b in FIG. 2B. The relative displacement of the light source 211 in a plane (perpendicular to the optical axis 150) of the light unit 210 may have the effect that a ray 231 being substantially parallel with the optical axis 150 is deflected into ray 232. Thereby, the displacement 230a and 230b may be chosen so that light 231 from light sources is directed towards the gate 130.

The relative displacement 230 may be within the range from 0 to 5 millimeters.

In an embodiment, the displacement (e.g., radial displacement) between one of the light sources and the associated lenslet increases as a function of a radial distance 170 from the associated lenslets to a center of the light collector or the optical axis. Thereby, the larger the radial distance 170 is for a light source 111, the larger is the displacement and, thereby, the deflection-angle towards the optical axis 150.

Figure 2C:
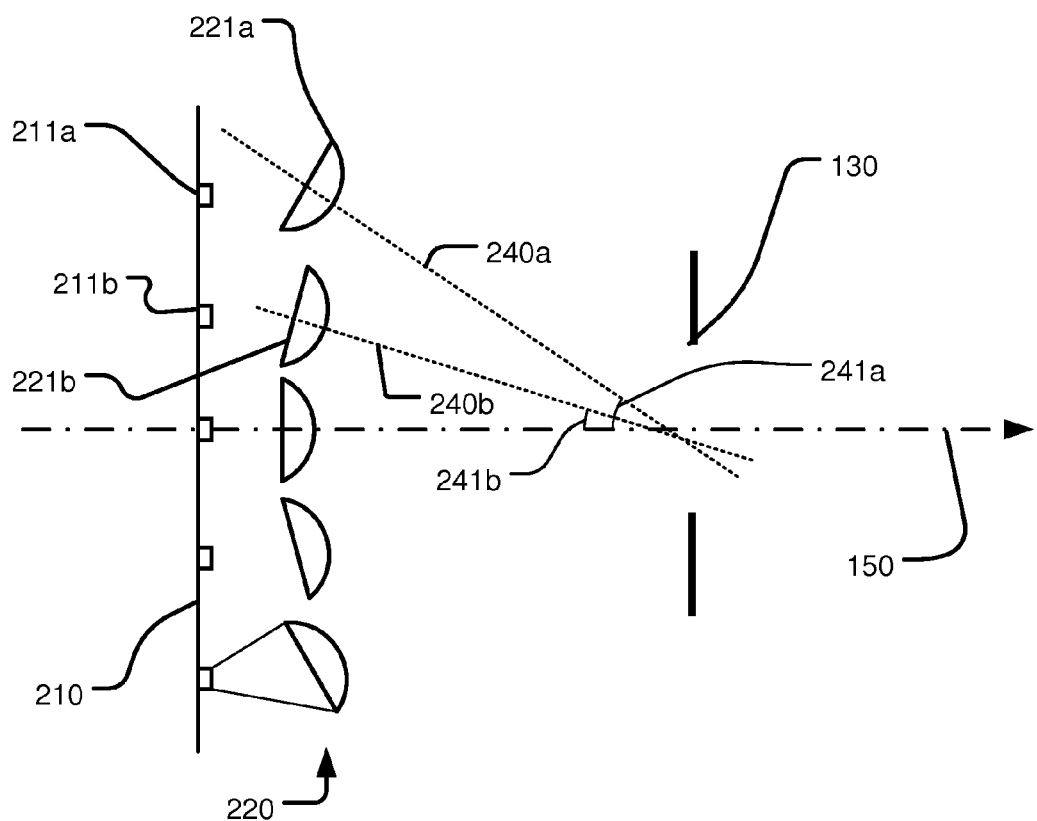

As illustrated in FIG. 2C, additionally or alternatively to different axial distances 201 (shown in FIG. 2A) between the lenslets and light sources and the relative displacement 230 (shown in FIG. 2B), optical axes 240a, 240b (in dotted line) of at least some of the lenslets may be angled by an angle 241a, 241b relative to the optical axis 150 of the light collector 120. The angling may improve the imaging of light from the light sources 121 onto the gate 130. Generally, the angling is within the range from 0 to 30 degrees and the angling is oriented so that the lenslets points towards the optical axis, i.e., so that lenslets located above the optical axis 150 is rotated clockwise and lenslets located below the optical axis 150 is rotated counter clock-wise.

In an embodiment, the angle 241 of the angled lenslets depends on a radial distance 170 from one of the lenslets to a center of the light collector or the optical axis so that lenslets having different radial distances or lenslets located along different rings 181-183 may be angled different and the different sets of lenslets in the annular rings may also have different angles. Thus, the larger the radial distance 170 is for a lenslet, the larger the angle 240 may be in order to provide optimal imaging of the light sources onto the gate 130.

Additionally or alternatively to different axial distances 201, for different relative displacements 230 and for different angles 240, the lenslets 121 may have different optical properties, such as, for example, properties that are in the form of different optical powers. The possible different optical powers or shape of the lens that deviate from spherical surfaces are determined so as to obtain a suitable or optical imaging of the light sources onto the gate 130, i.e., so as to optimize the efficiency and/or uniformity of the intensity in the gate 130.

In general, a suitable or optimal imaging of the light sources onto the gate 130 may be satisfied when the gate 130 is filled with light from a light source in a way so that the gate is filled with light having intensity variations below a given percentage and/or so that a given percentage of the power from a light source is transmitted through the gate 130.

Due to one or more of different axial distances 201 (shown in FIG. 2A) between the light sources 211 and the lenslets 221, displacements 230 (shown in FIG. 2B) between the light sources 211 and the lenslets 221 perpendicular to the optical axis, angling of lenslets 221 relative to the optical axis 150 and lenslets 221 having different optical powers of, the light sources 211 can be imaged or projected onto the gate 130 so that the gate is properly filled with a uniform intensity distribution. This arrangement of the lenslets may be particularly advantageous when the light sources 211 are arranged in a flat plane, for example, on a plane printed circuit board as such solution may make manufacturing of the illumination devise simpler and cheaper. Accordingly, in an embodiment, the light unit 210 may be configured as a plane or a flat unit in which all of the light sources 211 are located on the same plane.

As described in connection with FIG. 1B, the lenslets 121 are arranged in a dense circular pattern. The inventor has realized that arranging the lenslets in a pattern which is both dense (i.e., wherein the ratio of areas of lenslets and the area of the circumscribing circle is improved in comparison with a non-dense pattern) and circular is advantageous since the dense pattern may improve the percentage of light-power transmitted through the light collector 120 and illumination device 100. Further, the imaging lens has a circular aperture, that ideally should be filled to the edge and dense circular pattern optimizes this whereby the efficiency is improved. The circular pattern may be advantageous to non-circular patterns since a circular image projection on a wall may have a more attractive visual appearance in comparison to non-circular image projections. Further, the circular packing makes it possible to use an axial symmetric projecting system without too much loss of light which simplifies the optical design and reduces costs of the projecting system.

The problem of arranging circles of the same size in a dense circular pattern has been described in the references (1) "R. L. Graham, B. D. Lubachevsky, Dense packings of 3k(k+1)+1 equal disks in a circle for k=1, 2, 3, 4 and 5, Proc. First Int. Conf. "Computing and Combinatorics" COCOON'95, Springer Lecture Notes in Computer Science 959 (1996), 303-312" and (2) "B. D. Lubachevsky, R. L. Graham, Curved Hexagonal Packings of Equal Disks in a Circle, Discrete Comput. Geom. 18 (1997), 179-194" which are hereby incorporated by reference. The incorporated references describe how a dense pattern can be obtained generally for any number of circles and specifically when the number of circles equals a hexagonal number h(k):

$$h(k)=3k(k+1)+1, \text{ wherein } k \text{ is an integer} \quad \text{(Eq. 1)}$$

The incorporated references (1) and (2) describe that the dense pattern for a general number of circles can be obtained through an optimization method wherein a packaging density is optimized using a known computer based "billiards" simulation algorithm. The packaging density is defined by a ratio of a sum of areas of the circles and an area of an outer circular boundary circumscribing the circles.

The "billiards" simulation algorithm is described in (3) "B. D. Lubachevsky, How to simulate billiards and similar systems, J. Computational Physics 94 (1991), 255-283"; (4) "B. D. Lubachevsky and F. H. Stillinger, Geometric properties of random disk packings, J. Statistical Physics 60 (1990), 561-583" and (5) "R. L. Graham and B. D. Lubachevsky, Dense packings of equal disks in an equilateral triangle: from 22 to 34 and beyond, The Electronic Journ. of Combinatorics 2 (1995)". These three references are also incorporated by reference.

The incorporated references as noted above (i.e., (1) and (2)) describe that the dense pattern for a hexagonal number can be obtained analytically, i.e., without computer simulation, by arranging the circles in a curved hexagonal packing pattern including six curved paths of circles.

Figure 3A:
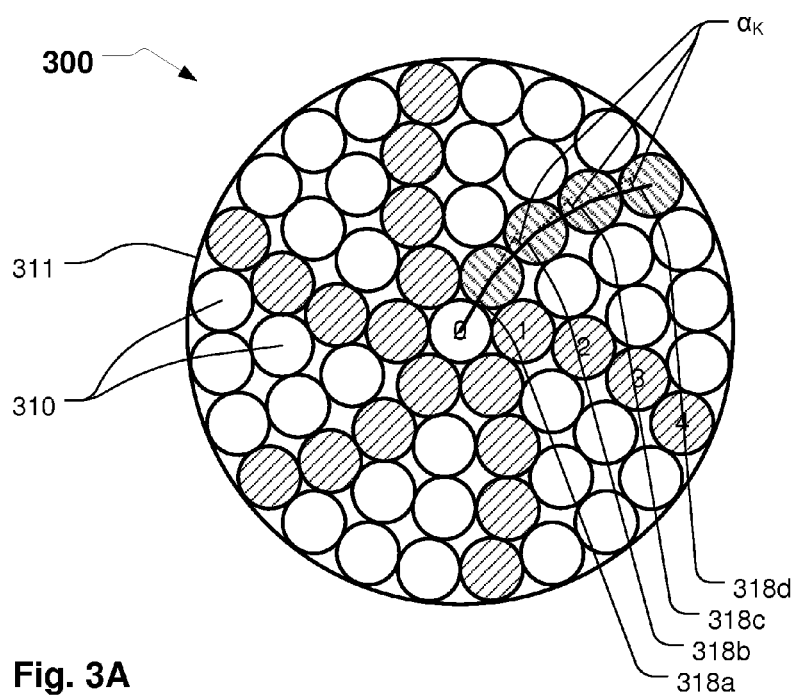
FIGS. 3A-3C illustrate a curved hexagonal dense circular packaging of lenslets.

FIG. 3A illustrates a curved hexagonal packing pattern 300 obtained for the hexagonal number of 61 circles or discs 310 of equal sizes by use of the analytical method for obtaining a dense circular pattern. The pattern shows the six curved paths 301 (illustrated by hatched circles) of adjacent circles extending from the center of the circumscribed circle 311 (outer circular boundary 311) to the periphery of the circumscribed circle.

In general, the lenslets of a light collector according to the analytical method, are arranged in six curved paths of adjacent lenslets, wherein each path extends from the center of the light collector to the outer circular boundary and wherein consecutive straight lines starting from a lenslet located adjacent to a lenslet located at the center of the light collector and ending at the outer circular boundary are angled with respect to the preceding straight line by an angle αk=+/−pi/3k, where k defines the number of adjacent lenslets in each of the curved paths with the exclusion of the lenslet located at the center of the light collector.

The inventor has recognized that the methods described in references (1), (2) and (3) can be used in the process of developing a light collector.

The dense pattern 300 or other patterns of a hexagonal or non-hexagonal number of densely packed discs contained within a circular boundary 311 is utilized in an embodiment of the invention for placing the lenslets 121 in a dense pattern. Accordingly, the discs 310 can be replaced by lenslets so that a circle or disc 310 and the area of a disc 310 are equivalent to a circumference of a lenslet and an area of that circumference. The circumference of a lenslet may be defined by the footprint of the lenslet, i.e., the circumference of the entrance or exit surface of a lenslet. Thus, a lenslet 121 as depicted in FIG. 1B may correspond to a cross-section of a lenslet or a footprint of a lenslet so that the footprint of lenslet 121 is equivalent to a circle 310. Therefore, the circles 310 and the outer circular boundary 311 also represent cross sectional views or footprints of lenslets 121 and an outer circular boundary 180, respectively. For convenience, the reference number 310 will be used for referring to lenslets 121 and the outer circular boundary 311 will be used for referring to the outer circular boundary 180 of the lenslets.

Thus, each lenslet defines a disc 310 corresponding to a substantially circular cross section of the lenslet 121. It is understood that the substantially circular cross section need not be exactly circular but may be circular in a broader sense which includes elliptical or other shapes. The possible deviation from an exact circular shape is due to the merging of lenslets by extending the volume of lenslets (described elsewhere herein). Furthermore, the discs 310 of the lenslets 121 have the same diameter and are located in a common plane which is perpendicular to the optical axis 150. Further, the dense pattern of the lenslets has been obtained by optimizing a packaging density defined by a ratio of a sum of areas of the discs 310 and an area of a container disc 311 circumscribing the discs 310.

It is noted that the shape of a cross section of lenslets 121 in a plane substantially perpendicular to the optical axis of the lenslet is non-hexagonal, i.e., does not include hexagonal shapes, but may include circular shapes or deviations of circular shaped which have a smooth circumference.

Accordingly, as illustrated in FIG. 1B, the lenslets 121 of a light collector 120 may comprise a plurality of outermost adjacent lenslets located along an outer circular boundary 180, wherein each of the outermost lenslets has the same radial distance 170 to a center of the light collector, and wherein the dense pattern has been obtained by optimizing a packaging density defined by a ratio of a sum of areas of the circular cross sections or footprints of the lenslets 121 and an area of the outer circular boundary 180.

In the case that the light collector 120 is configured with a hexagonal number of lenslets 121, the dense pattern of lenslets can be analytically determined as shown in FIG. 3A and as described in references (1) and (2), by determining a pattern which includes six curved paths 301 of adjacent lenslets 310, wherein each path extend from the center of the light collector 120 to the outer circular boundary 311.

As illustrated in FIG. 3A, each curved path 301 may be determined by initially defining an number of straight lines 318a-318d, which connects centers of the adjacent lenses and by determining angles αk between the straight lines, so that the consecutive straight lines starting from a lenslet located adjacent to the lenslet located at the center of the light collector 120 and ending at the outer circular boundary 311 are angled with respect to the preceding straight line by an angle α_k=π/3k where k is the hex-number and is given by eq. 1 and defines the number of adjacent lenslets in a curved path (shown by hatched circles) with exclusion of the lenslet located at the center of the light collector.

It is characteristic that the curved paths (illustrated by the hatched circles) are invariant under a 60 degrees rotation and consequently that the dense pattern of all lenslets comprised by a light collector 120 is invariant under a 60 degrees rotation.

In the illustrated embodiment, constructive straight lines have been angled in the clockwise direction, however it is noticed that they also can be angled in the counterclockwise direction resulting in a mirrored pattern. The curved hexagonal pattern comprises a number of layers/rings which have been labeled by numbers 0-4 where the layers and rings can be defined and arranged as describe in connection with FIG. 1B.

Further, a number of permutations of the curved hexagonal patterns exist and these permutations can be obtained by rotating sets of constructive layers starting from the 2nd layer and out by an angle corresponding to αk in the opposite directing as in the basic curved regular patterns as illustrated in FIG. 3A. Rotating constructive layers means that all layers outside innermost rotated layer (the first layer to be rotated) are rotated by the same angle and in the same direction. For instance, in general with layer 2 as the inner most rotated layer would result in that all layers 2 to k are rotated and with layer 3 as the innermost layer would result in the fact that all layers 3 to k are rotated. It is noticed that it does not matter whether or not the outermost layer k is rotated as this layer is invariant under rotations of αk. As a consequence there exit k-3 (rotation of layer 0, 1 and K does not result in permutations) different ways that the constructive outer layers can be rotated in relation to the innermost non-rotated layers. In addition, it is noticed that mirror permutations of the different patterns also exists.

Figures 3B, 3C:
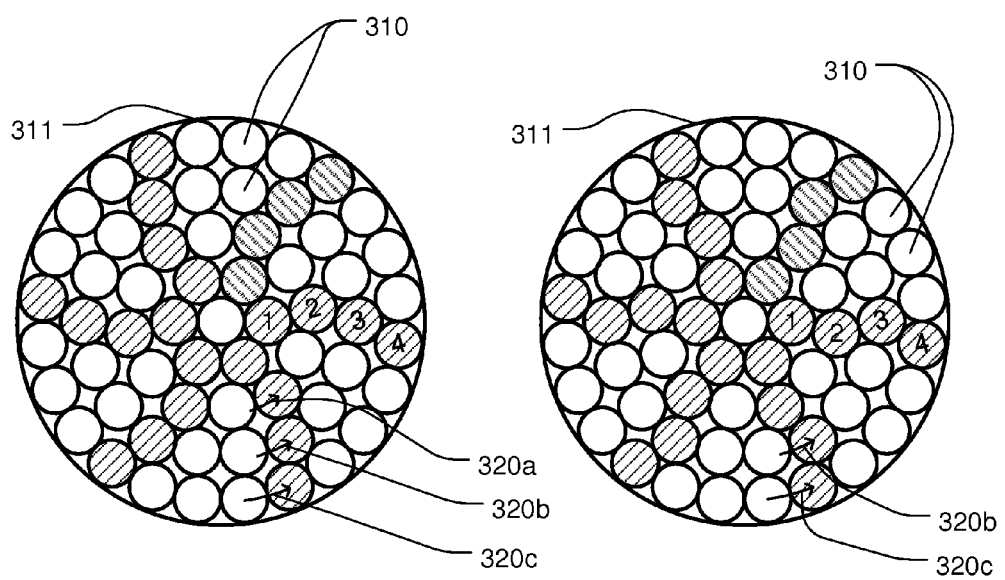

FIG. 3B illustrates a permutation of the basic pattern of FIG. 3A, where layers 2, 3 and 4 have been rotated αk degrees in the counter clockwise direction in relation to layer 0 and 1. Arrows 320a, 320b, 320c indicate respectively, the rotation of 2nd, 3rd and 4th layer.

FIG. 3C illustrates a permutation of the basic pattern where layers 3 and 4 have been rotated αk degrees in the counter clockwise direction in relation to layer 0,1,3. Arrows 320b, 320c indicate respectively the rotation of 3rd and 4th layer.

The dense circular pattern of the lenslets, where a plurality of outermost adjacent lenslets are located along an outer circular boundary, wherein each of the outermost lenslets has the same radial distance to a center of the light collector, can thus for a hexagon number (defined by equation 1) both analytically or through iterative analysis/calculations, for example, performed by a computer. The dense circular pattern of a non-hexagon number of lenslets can be found through iterative analysis/calculations. FIG. 4A-4L illustrate a number of dense circular patterns of lenslets and which have be created through computer simulations.

Whether the light collector 120 is configured with a hexagonal or non-hexagonal number of lenslets 121, it is characteristic that at least some of the outermost lenslets, i.e., lenslets in the outermost ring 181, are located adjacent to two other outermost located lenslets. In the case that the light collector 120 is configured with a hexagonal number of lenslets it is characteristic that each of the outermost lenslets are located adjacent to and in contact with two other outermost located lenslets, i.e., the outermost lenslets forms a closed ring outer 181.

The number of lenslets 121 in a light collector 120 may be larger than 14. In order to obtain a large packaging density, the number of lenslets may be chosen according to eq. 1 with k greater than two. Alternatively, the number of lenslets may be chosen to be a non-hexagonal number, but chosen according to the equation for a reduced hexagonal number hr(k):

$$hr(k)=3k(k+1), \text{ wherein } k \text{ is an integer} \quad (\text{Eq. 2})$$

Thus, the number of lenslets given by eq. 2 is one less than the hexagonal numbers given by eq. 1. The packaging density which is obtainable by designing a light collector with a number of lenslets given by eq. 2 is close to the packaging density obtainable by designing a light collector with a number of lenslets given by eq. 1. Further, in some embodiments the dense circular pattern can be made based on a hexagonal number of lenslets. However, one of the lenslets have be removed in order to use its space for other purposes for instance as inlet space for molding material during the molding process. The number of lenslets is thus reduced to a number given by equation 2.

Figure 12A:
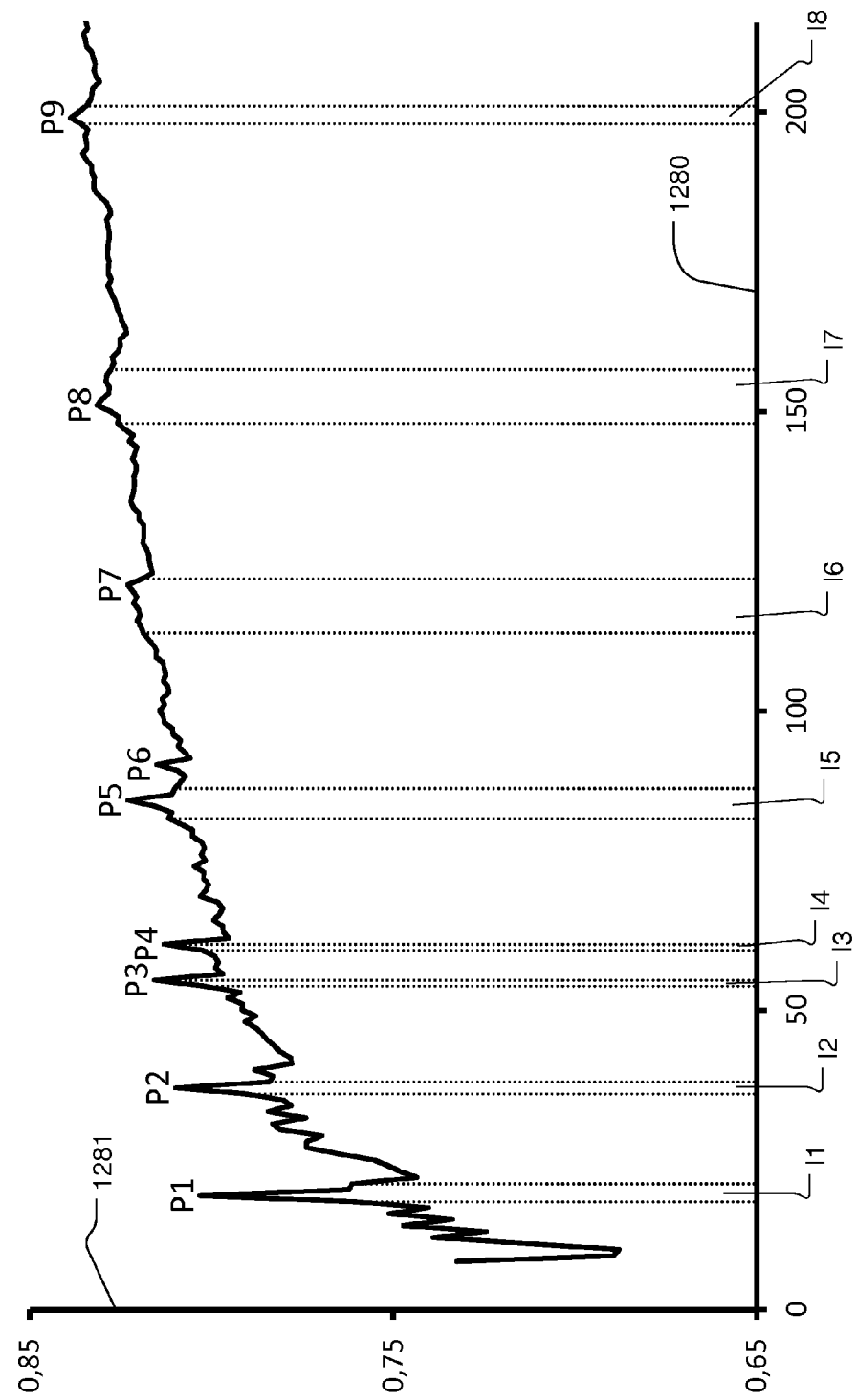
FIGS. 12A, 12B and 12C illustrate graphs of the packing density of circular lenslets packed in a circle, as a function of the number of lenslets.
Figure 12B:
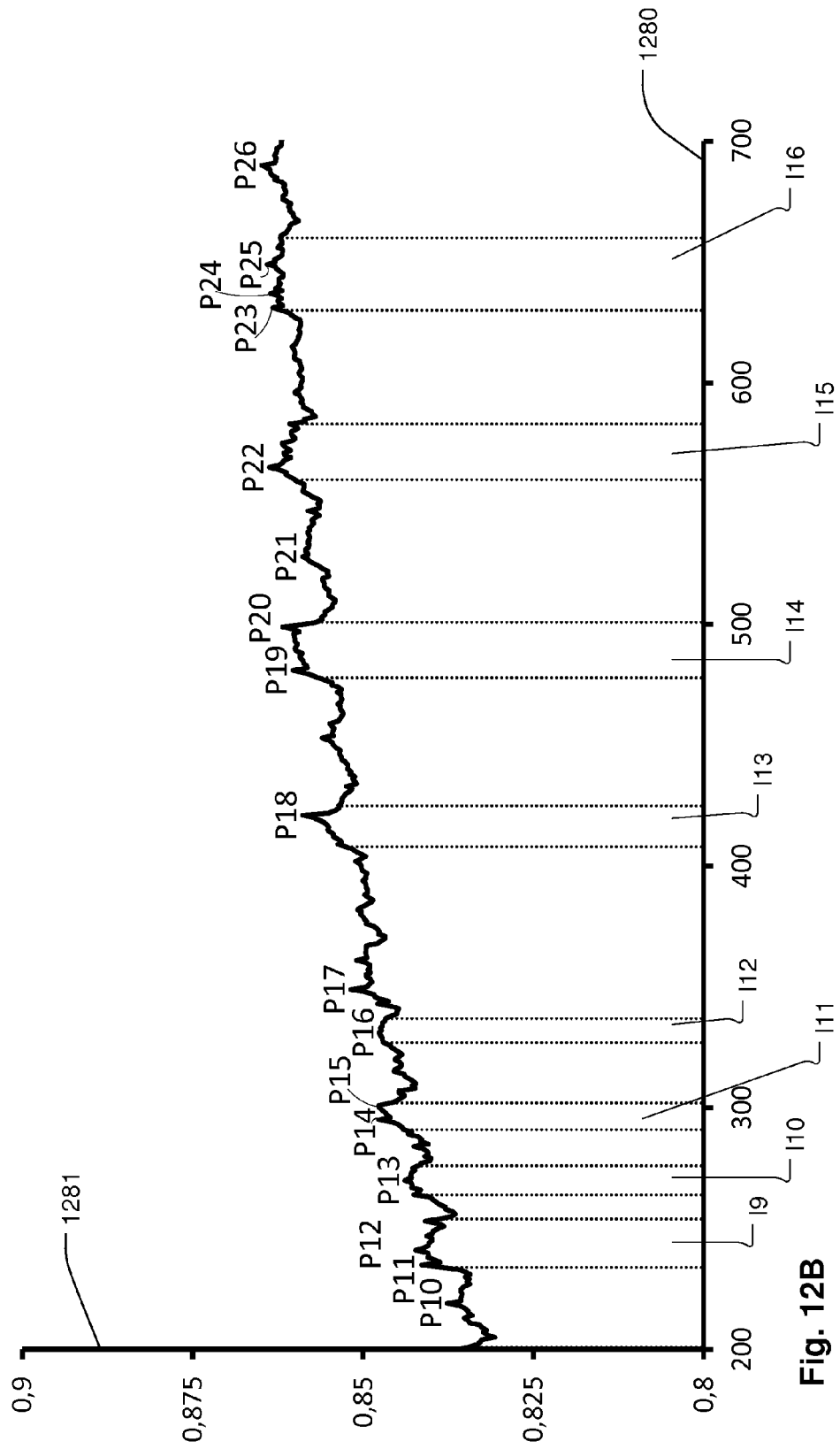
Figure 12C:
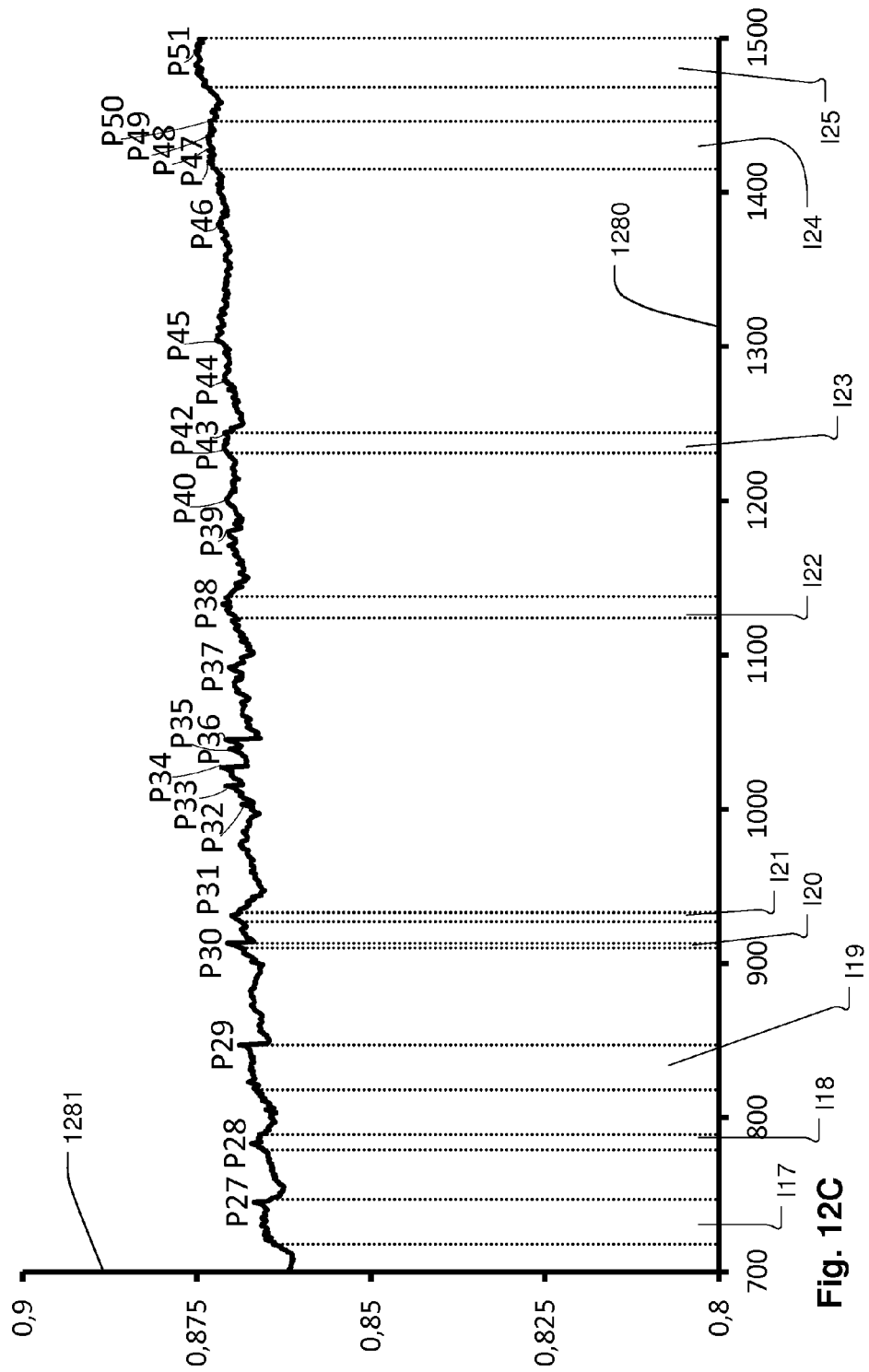

FIGS. 12A, 12B and 12C illustrate graphs of the packing density of circular lenslets packed in a circle and comprising at least 7 outermost lenslets as a function of the number of lenslets. The packing densities of the circular lenslets packed in a circle have been obtained based on a number of dense circular packaging of circular lenslets obtained by computer simulations. FIG. 12A illustrates the packing density in the interval 1-225 lenslets; FIG. 12B illustrates the packing density in the interval 200-700 lenslets; and FIG. 12C illustrates the packing density in the interval 700-1500 lenslets. The horizontal axis 1280 indicates the number of lenslets and the vertical axis 1281 indicates the packing density of the circular lenslets inside the circle defined by the area of the outer circular boundary defined by the outermost lenslets. The line 1282 indicates the graph of the packing density.

The graphs reveal that there are a number of local crowning intervals I1-I25, where the packaging densities of the lenslets are higher than the surrounding ranges of number of lenslets. In one embodiment, the light collector according the present invention comprises a number of lenslets within one of the crowing intervals I1-I25 indicated in table 0a, where the crowing intervals I1-I25 are indicated as closed intervals meaning that the end points indicated in table 0a are included in the crowing intervals I1-I25.

TABLE 0a

Intervals with higher circular packaging density than surroundings ranges of number of lenslets

| Interval number | Number of lenslets | |
| --- | --- | --- |
| | Start | End |
| I1 | 18 | 21 |
| I2 | 36 | 38 |
| I3 | 54 | 55 |
| I4 | 60 | 61 |
| I5 | 82 | 87 |
| I6 | 113 | 122 |
| I7 | 148 | 157 |
| I8 | 198 | 201 |
| I9 | 234 | 254 |
| I10 | 264 | 276 |
| I11 | 291 | 302 |
| I12 | 327 | 337 |
| I13 | 498 | 425 |
| I14 | 478 | 501 |
| I15 | 560 | 583 |
| I16 | 630 | 660 |
| I17 | 718 | 747 |
| I18 | 779 | 789 |
| I19 | 817 | 847 |
| I20 | 910 | 913 |
| I21 | 927 | 933 |
| I22 | 1124 | 1138 |
| I23 | 1231 | 1244 |
| I24 | 1415 | 1446 |
| I25 | 1468 | 1500 |

Choosing the number of lenslets to be in one of the crowing intervals I1-I25 ensures that the packaging density of lenslets can be optimized within a given range of lenslets. For instance, if due to other reasons the number of light sources must be within the range of 50-75 light sources, it can be seen that the number of lenslets and light sources can be chosen from crowing intervals I3 and I4 in order to optimize the packaging density of the lenslets and thereby also optimize the efficiency of the illumination device. Similarly, if the number of light sources must be within the range of 75-125 numbers of light sources, then the number of lenslets and light sources can be chosen from crowing intervals I5 and I6.

Further, the graphs show that there are a number of local density peaks P1-P51, where the packaging density with a specific number of lenslets are higher that the density of the surrounding number of lenslets.

It can be seen that for a total number of lenslets that are less than 100 that the at the number of lenslets equal the a hexagonal numbers given in equation 1 forms local density peaks P2, P4, and P6. However, surprisingly it is also apparent that if the number of lenslets equals a hexagonal number minus 6 also form substantial density peaks, for instance P3, P5 and P7.

In one embodiment the light collector according the present invention comprises a number of lenslets equal to one of the local density peaks as indicated in table 0b.

TABLE 0b

Density peaks with higher density packaging than surrounding number of lenslets

| Peak number | Number of lenslets | Packaging density |
| --- | --- | --- |
| P1 | 19 | 0.8032 |
| P2 | 37 | 0.8100 |
| P3 | 55 | 0.8158 |
| P4 | 61 | 0.8131 |
| P5 | 85 | 0.8229 |
| P6 | 91 | 0.8150 |
| P7 | 121 | 0.8231 |
| P8 | 151 | 0.8315 |
| P9 | 199 | 0.8388 |
| P10 | 219 | 0.8377 |
| P11 | 235 | 0.8414 |
| P12 | 241 | 0.8423 |
| P13 | 270 | 0.8439 |
| P14 | 295 | 0.8477 |
| P15 | 301 | 0.8477 |
| P16 | 331 | 0.8476 |
| P17 | 349 | 0.8518 |
| P18 | 421 | 0.8589 |
| P19 | 481 | 0.8603 |
| P20 | 499 | 0.8618 |
| P21 | 528 | 0.8589 |
| P22 | 565 | 0.8638 |
| P23 | 631 | 0.8632 |
| P24 | 637 | 0.8636 |
| P25 | 649 | 0.8641 |
| P26 | 690 | 0.8648 |
| P27 | 745 | 0.8668 |
| P28 | 783 | 0.8672 |
| P29 | 847 | 0.8689 |
| P30 | 913 | 0.8707 |
| P31 | 931 | 0.8701 |
| P32 | 1003 | 0.8685 |
| P33 | 1015 | 0.8708 |
| P34 | 1027 | 0.8715 |
| P35 | 1039 | 0.8703 |
| P36 | 1045 | 0.8708 |
| P37 | 1092 | 0.8704 |
| P38 | 1133 | 0.8713 |
| P39 | 1180 | 0.8705 |
| P40 | 1201 | 0.8707 |
| P42 | 1236 | 0.8711 |
| P43 | 1244 | 0.8711 |
| P44 | 1278 | 0.8712 |
| P45 | 1304 | 0.8722 |
| P46 | 1379 | 0.8719 |
| P47 | 1420 | 0.8733 |
| P48 | 1427 | 0.8733 |
| P49 | 1436 | 0.8735 |

TABLE 0b-continued

Density peaks with higher density packaging than surrounding number of lenslets

| Peak number | Number of lenslets | Packaging density |
| --- | --- | --- |
| P50 | 1446 | 0.8732 |
| P51 | 1491 | 0.8752 |

By designing the light collector with a number of lenslets at the local density peaks P1-P51 it possible to within a given range of number of light sources and lenslets to design the light collector with the densest lenslets pattern and thereby optimize the light output. For instance, if due to other reasons, the number of light sources must be within the range of 50-75 light sources, it can be seen that the number of lenslets and light sources can be from the following peak local density peaks P3 and P4 in order to optimize the packaging density of the lenslets and thereby also optimize the efficiency of the illumination device. Similarly, if the number of light sources must be within the range of 75-125 numbers of light sources, then the number of lenslets and light sources can be chosen from the local density peaks P5, P6 or P7. It can be seen that the crowing intervals and local density peaks tend to be less dominant as the number of lenslets increases; however, improvements in efficiency can still be achieved by choosing the number of lenslets at the peak density points and/or within the peak density intervals.

The packaging density as defined above generally increases for increasing numbers of lenslets. Thus, for dense packing, the packaging density varies between approximately 0.71 for a light collector with 15 lenslets and approximately 0.88 for a light collector with 1500 lenslets. The packaging densities at the local density peaks P1-P51 are indicated in table 0b.

FIGS. 4A-4G illustrate a number of exemplary dense circular packagings of circular lenslets 421 obtainable by computer simulations. The lenslets have been arranged in a circle with a radius of 1 (one). The resulting radiuses of the lenslets and the packing density have been indicated below. The coordinates of the center of the lenslets 421 in relation to the center of the circle have been indicated in the tables at the end of this application. The person skilled in the art would be able to scale the size of the circumscribed circle into any desired size and scale the size and coordinates of the lenslets accordingly. That is, if a diameter of the circumscribed circle should be 10 (in a given unit) then the radius of the lenslets and the radial part of the coordinates should be multiplied by 10.

Figure 4A:
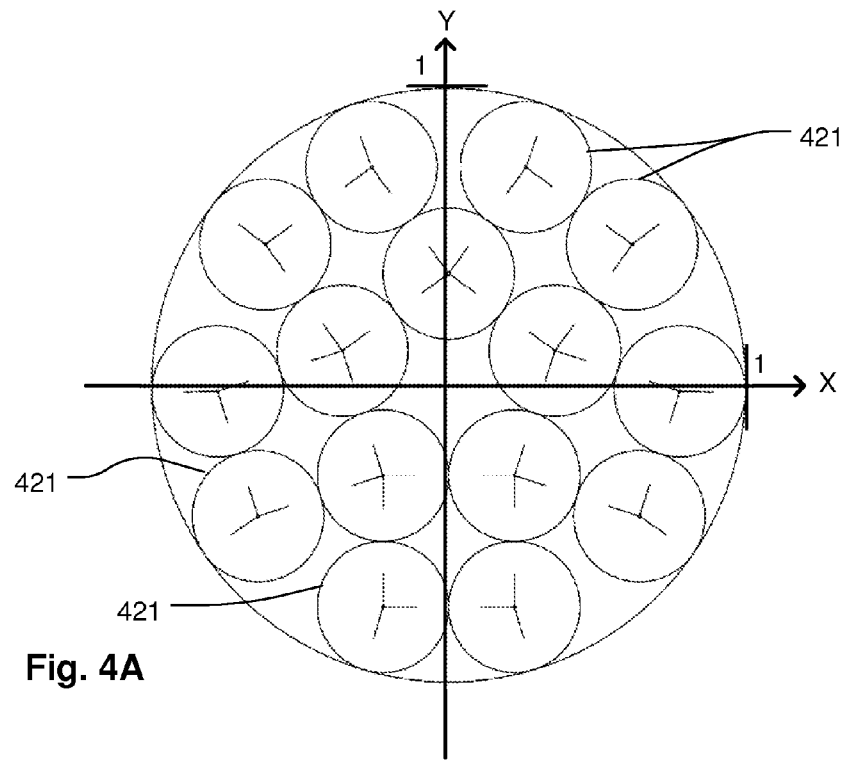
FIGS. 4A-4L illustrate dense circular packings of 15, 24, 36, 37, 60, 61, 90, 91, 121, 151, 199, and 235 lenslets.

FIG. 4A illustrates a dense circular packaging of 15 circular lenslets that are arranged in a dense circular pattern. The relative radius of the lenslets in relation to the outer circular boundary of the circular pattern is 0.2212 and the packaging density of the lenslets is 0.7338.

Figure 4B:
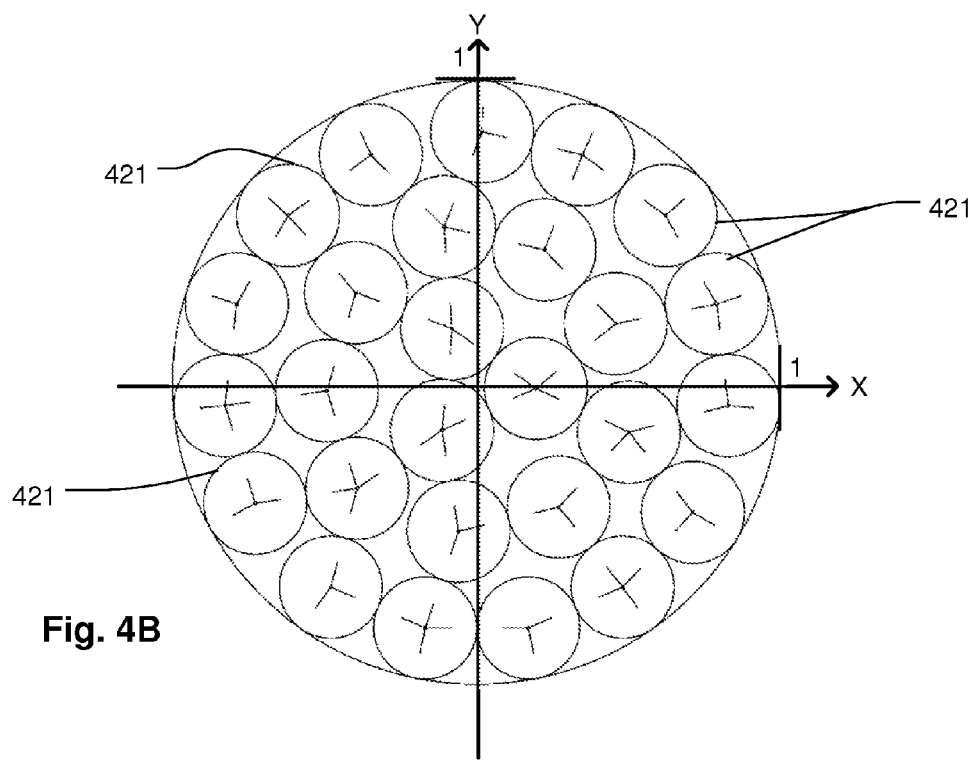

FIG. 4B illustrates a dense circular packaging of 24 circular lenslets 421 that are arranged in a dense circular pattern. The relative radius of the lenslets in relation to the outer circular boundary of the circular pattern is 0.1693 and the packaging density of the lenslets is 0.7740.

Figure 4C:
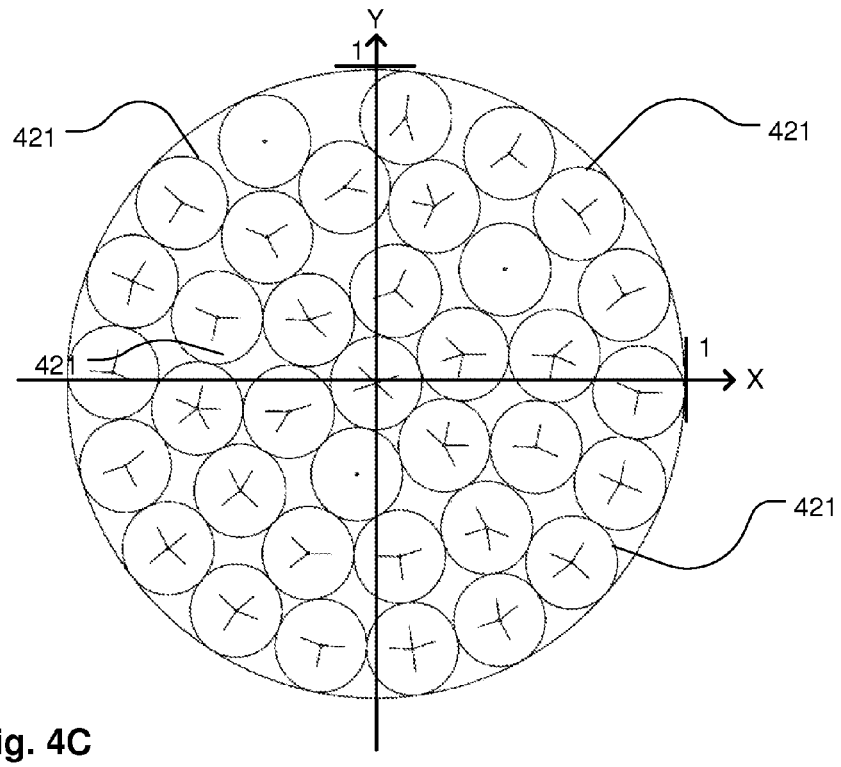

FIG. 4C illustrates a dense circular packaging of 36 circular lenslets that are arranged in a dense circular pattern. The relative radius of the lenslets in relation to the outer circular boundary of the circular pattern is 0.1482 and the packaging density of the lenslets is 0.7909. Thus, in one embodiment, the illumination device according to the present invention comprises at least 36 lenslets and has a packaging density of at least 0.79.

Figure 4D:
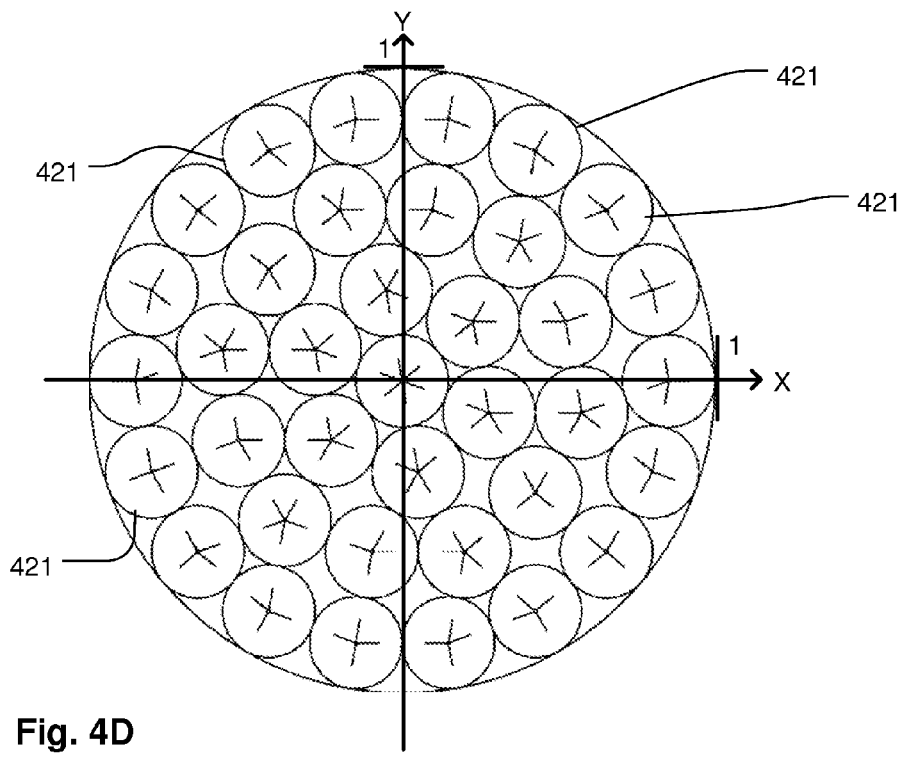

FIG. 4D illustrates a dense circular packaging of 37 circular lenslets that are arranged in a dense circular pattern. The relative radius of the lenslets in relation to the outer circular boundary of the circular pattern is 0.1480 and the packaging density of the lenslets is 0.8100. This packaging corresponds to a local density point P2 and is within the crowing interval I2. Thus, in one embodiment the illumination device according to the present invention comprises at least 37 lenslets and has a packaging density of at least 0.81.

Figure 4E:
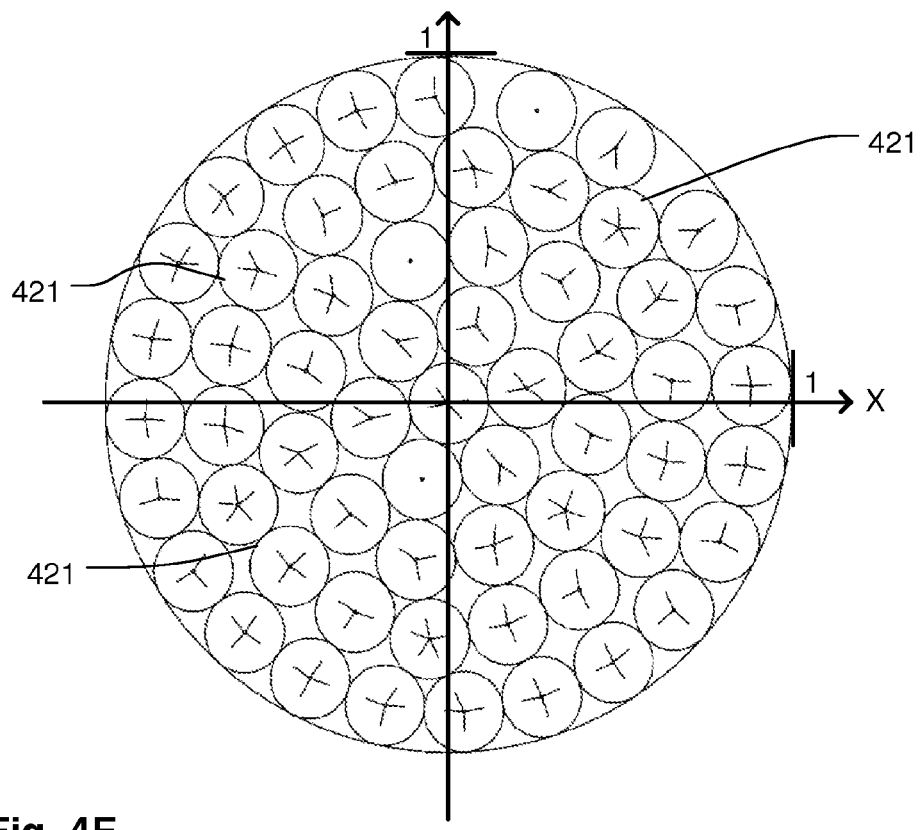

FIG. 4E illustrates a dense circular packaging of 60 circular lenslets that are arranged in a dense circular pattern. The relative radius of the lenslets in relation to the outer circular boundary of the circular pattern is 0.1157 and the packaging density of the lenslets is 0.8026. This packaging is within the crowing interval I4. Thus, in one embodiment the illumination device according to the present invention comprises at least 60 lenslets and has a packaging density of at least 0.80.

Figure 4F:
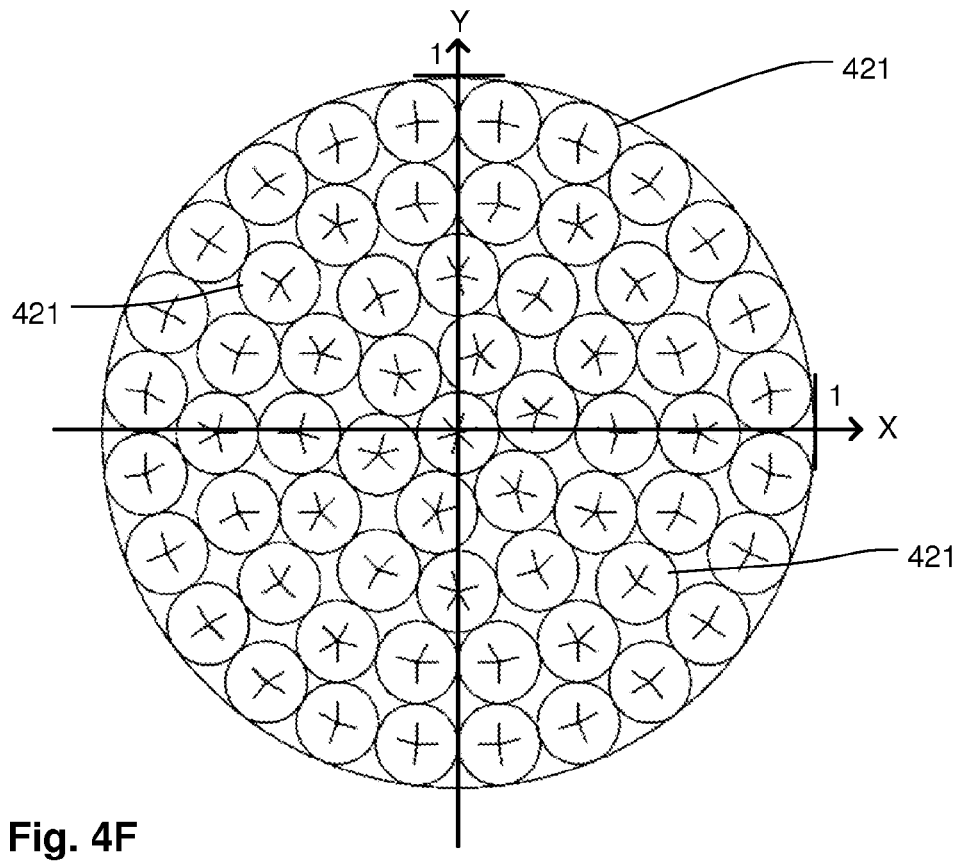

FIG. 4F illustrates a dense circular packaging of 61 circular lenslets that are arranged in a dense circular pattern. The relative radius of the lenslets in relation to the outer circular boundary of the circular pattern is 0.1155 and the packaging density of the lenslets is 0.8131. This packaging corresponds to local density point P4 and is within the crowing interval I4. Thus, in one embodiment the illumination device according to the present invention comprises at least 61 lenslets and has a packaging density of at least 0.81.

Figure 4G:
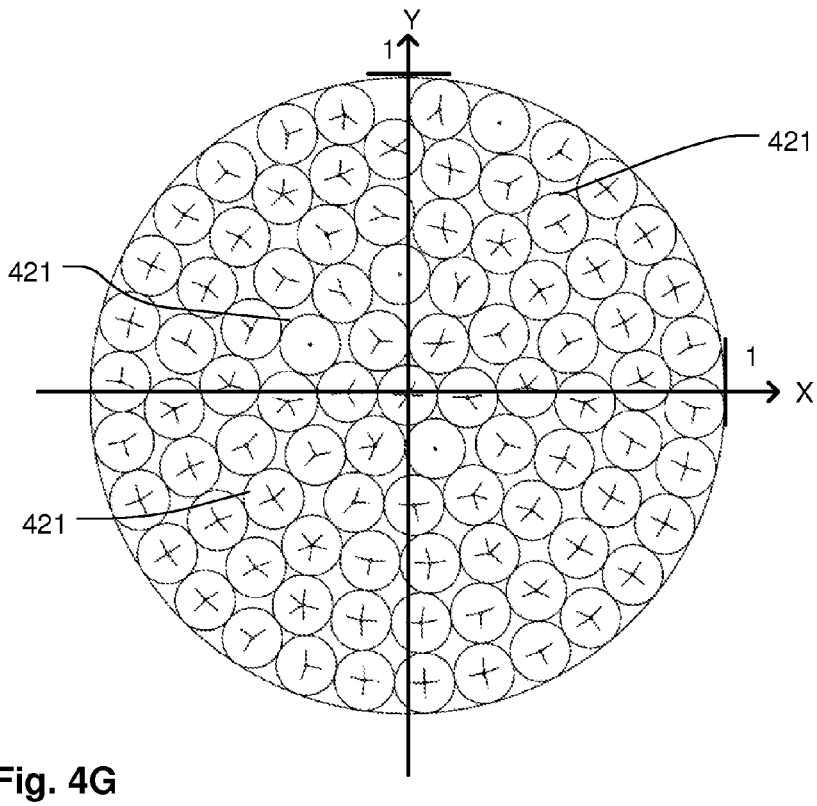

FIG. 4G illustrates a dense circular packaging of 90 circular lenslets that are arranged in a dense circular pattern. The relative radius of the lenslets in relation to the outer circular boundary of the circular pattern is 0.0948 and the packaging density of the lenslets is 0.8092. Thus, in one embodiment the illumination device according the present invention comprises at least 90 lenslets and has a packaging density of at least 0.80.

Figure 4H:
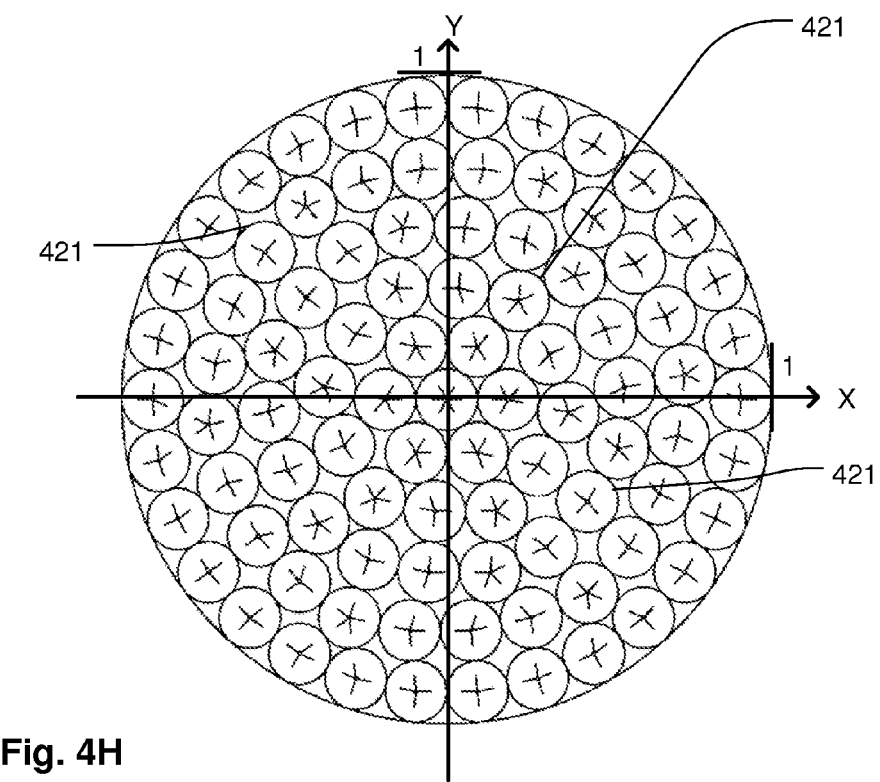

FIG. 4H illustrates a dense circular packaging of 91 circular lenslets that are arranged in a dense circular pattern. The relative radius of the lenslets in relation to the outer circular boundary of the circular pattern is 0.0946 and the packaging density of the lenslets is 0.8150. This packaging corresponds to local density point P6.

Figure 4I:
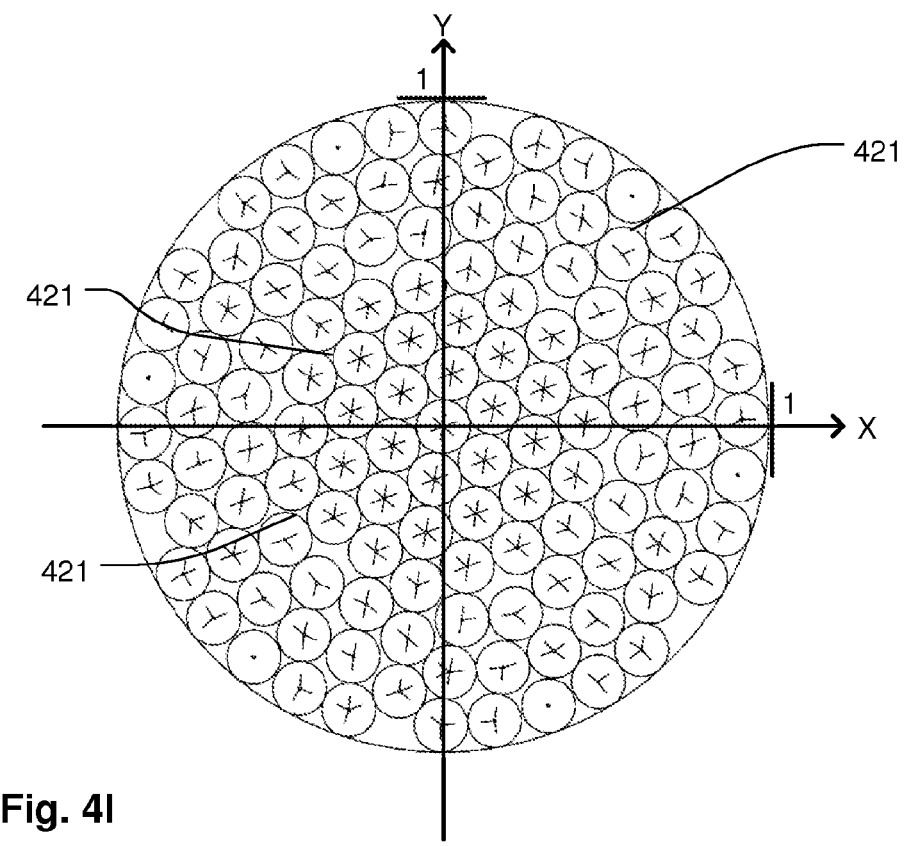

FIG. 4I illustrates a dense circular packaging of 121 circular lenslets that are arranged in a dense circular pattern. The relative radius of the lenslets in relation to the outer circular boundary of the circular pattern is 0.0825 and the packaging density of the lenslets is 0.8231. This packaging corresponds to a local density point P7 and is within the crowing interval I6.

Figure 4J:
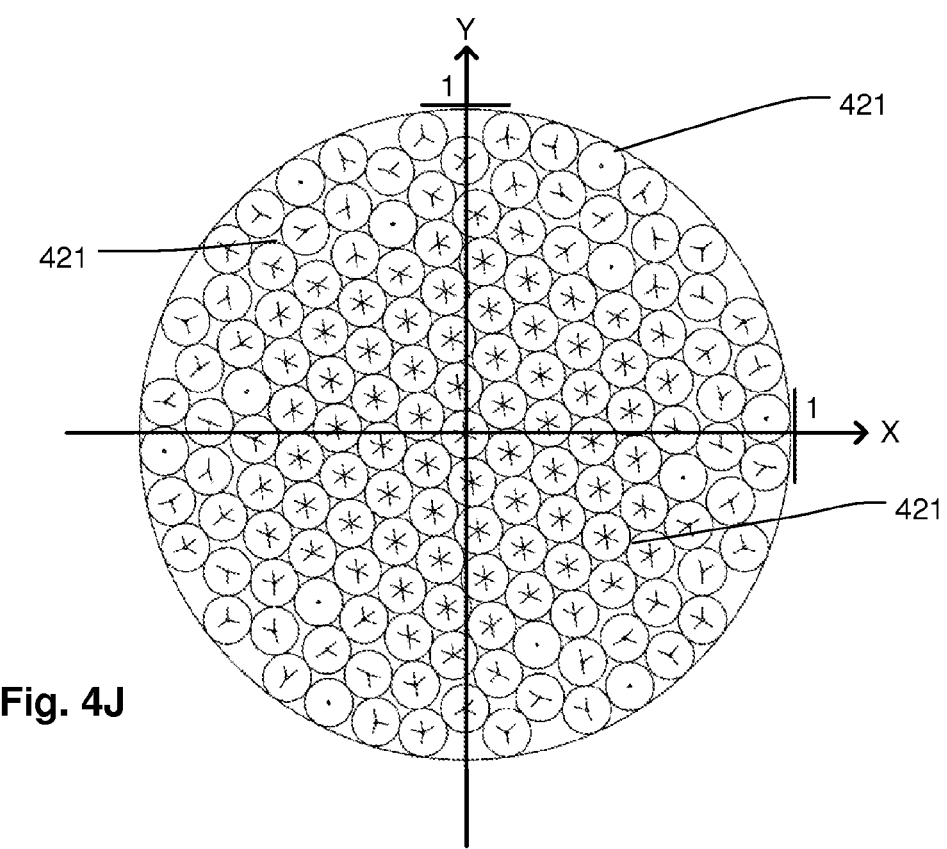

FIG. 4J illustrates a dense circular packaging of 151 circular lenslets that are arranged in a dense circular pattern. The relative radius of the lenslets in relation to the outer circular boundary of the circular pattern is 0.10742 and the packaging density of the lenslets is 0.8315. This packaging corresponds to a local density point P8 and is within the crowing interval I7.

Figure 4K:
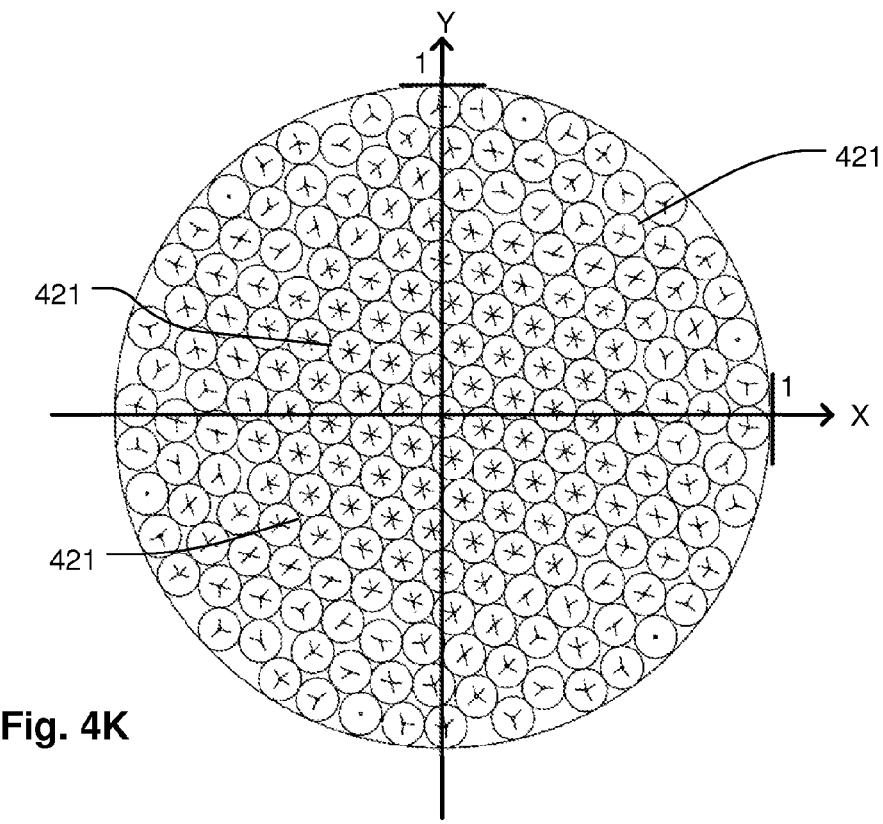

FIG. 4K illustrates a dense circular packaging of 199 circular lenslets that are arranged in a dense circular pattern. The relative radius of the lenslets in relation to the outer circular boundary of the circular pattern is 0.0649 and the packaging density of the lenslets is 0.8388. This packaging corresponds to a local density point P9 and is within the crowing interval I7.

Figure 4L:
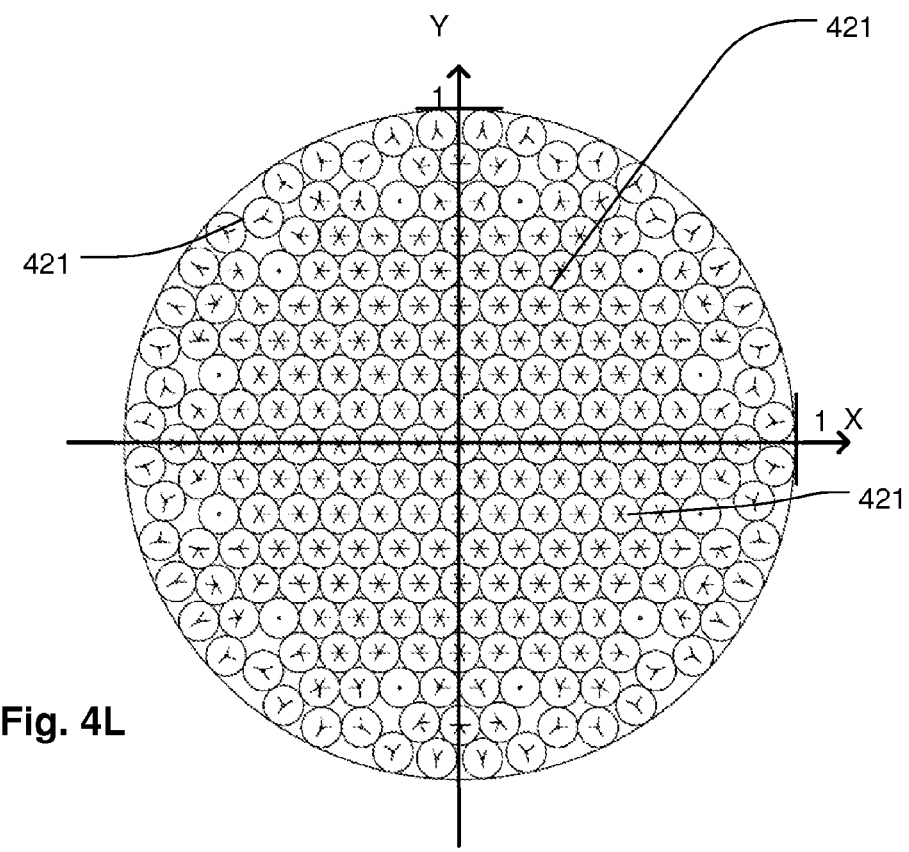

FIG. 4L illustrates a dense circular packaging of 235 circular lenslets that are arranged in a dense circular pattern. The relative radius of the lenslets in relation to the outer circular boundary of the circular pattern is 0.0598 and the packaging density of the lenslets is 0.8414. This packaging corresponds to a local density point P11 and is within the crowing interval I9.

FIG. 4E illustrates a light collector 120 with 60 lenslets as given by eq. 2 with k=4. An alternative design with 60 lenslets can be provided by providing a light collector 120 with 61 lenslets as shown in FIG. 4F where one lenslet has been removed, for example, where the center lens or a lens located along the circumscribing circle has been removed. The packing density for a light collector 120 with 61 lenslets as shown in FIG. 4E is 0.8131 and the packing density for a light collector with 60 lenslets provide by removing one lenslet from the light collector with 61 lenslets is 0.8000. The packing density of the optimized 60 packing (FIG. 4E) provides 0.8026. On the other hand, a light collector with 62 lenslets only has a packaging density of 0.795. Similar the packing density for a light collector 120 with 91 lenslets as illustrated in FIG. 4H is 0.8150 and the packing density for a light collector 120 with 90 lenslets provide by removing one lenslet from the light collector with 91 lenslets is 0.8060. The packing density of the optimized 90 packing (FIG. 4G) provides 0.8092. On the other hand, a light collector 120 with 92 lenslets only has a packaging density of 0.8058. Accordingly, light collectors 120 with a hexagonal number of lenslets tends to have higher packaging densities, light collectors 120 with a reduced hexagonal number of lenslets according to Eq. 2 has slightly reduced packaging densities whereas light collectors with an increased hexagonal number of lenslets (i.e., the number provided by Eq. 1 added with one) has significantly reduced packaging densities. Accordingly, light collectors 120 having a number of lenslets as provided by Eq. 1 or Eq. 2 may be preferred.

The light collectors in FIGS. 4D, 4F and 4H, respectively, having 37, 61 and 91 lenslets contains a hexagonal number of lenslets according to Eq. 1, whereas light collectors having in FIGS. 4C, 4F and 4G respectively, 36, 60 and 90 lenslets contains a reduced hexagonal number of lenslets according to Eq. 2. Any of the light collector designs with a hexagonal number of lenslets can be modified to a design with a reduced hexagonal number of lenslets by removing one lenslets. Removal of one lenslet from a design with a hexagonal number of lenslets may be necessary in order to establish hole in a mold for the light collector wherein molding material can be injected. However, other number of lenslets may also be used, for instance as illustrated in FIGS. 4B, 4I, 4J, 4K and 4L where the light collectors respectively have 27, 121, 151, 199 and 235 lenslets, and which has been chosen as the density of the lenslets in these embodiments forms a local maximum compared the density of light collects having a similar but different number of lenslets. For instance, the light collector in FIG. 4B with 27 lenslets froms a local density maximum (0.7740) as it has a higher density than a light collector with 26 (0.7654) and 28 (0.7739) lenslets. Further, the light collectors illustrated in FIGS. 4I, 4J, 4K, 4L respectively with 121, 151, 199, 235 all form a local density maximum with a density larger than the density of light collectors having between −5 and +5 lenslets. The same is the case with light collectors having 19, 37, 55, 61, 85, 91, 100, 135, 151, 176, 219, 235, 241, 253 lenslets, however it is noticed that light collectors with others larger number of lenslets also may fulfill this. Also, the light collectors with 19, 37, 55, 85, 121, 151, 199, 219, 241 and 270 all forms a local density maximum with a density larger than the density of light collectors having between −10 and +10 lenslets.

The number of lenslets can also be chosen based on power and cooling requirements of the LED light engine system and then optimized to a dense circular pattern. For instance, the light collectors illustrated in FIG. 4A comprises 15 lenslets which is useful in connection with 15 diodes of the type SBT-70 LED's from luminous devices as the power and driver requirements fits with 0.6 kW which fits with the number of drivers and power supply of an existing product from the applicant. The number of lenslets can thus be chosen based on other requirements in addition to the pure optical requirements.

Tables 1a-1l in the end of the detailed description show normalized coordinates for the placement of lenslets of the light collectors in FIGS. 4A-L.

According to the embodiments, the lenslets may comprise a plurality of outermost adjacent lenslets located along an outer circular boundary 180. Accordingly, the densely packed lenslets form a light collector having a circular periphery. The circular light collector is in contrast to hexagonal shaped light collectors, i.e., light collectors having a hexagonal periphery or hexagonal entrance and exit apertures. Such hexagonal light collectors may be chosen to obtain a high packaging density, possibly a packaging density of 0.907 for a hexagonal pattern of lenslets. A disadvantage of hexagonal light collectors is the non-circular periphery. For example, the non-circular periphery of a hexagonal light collector may be disadvantageous since there is a mis-match between the non-circular pattern of the light collector and the round pupil of the imaging system. This leads to pure efficiency and bad image/light quality. Advantageously, embodiments of the present invention may achieve both a circular periphery and a high packaging density by use of a non-hexagonal packaging pattern, i.e., a curved hexagonal packaging pattern.

FIGS. 5-8 illustrate another aspect of the light collector according to the present invention and illustrate the manner in which the lenslets can be joined with a reduced amount of "dead" areas/zones of the light collector.

FIGS. 5A-5E illustrate cross sectional views of adjacent lenslets 521a-521c of a light collector 520.

Figure 5A:
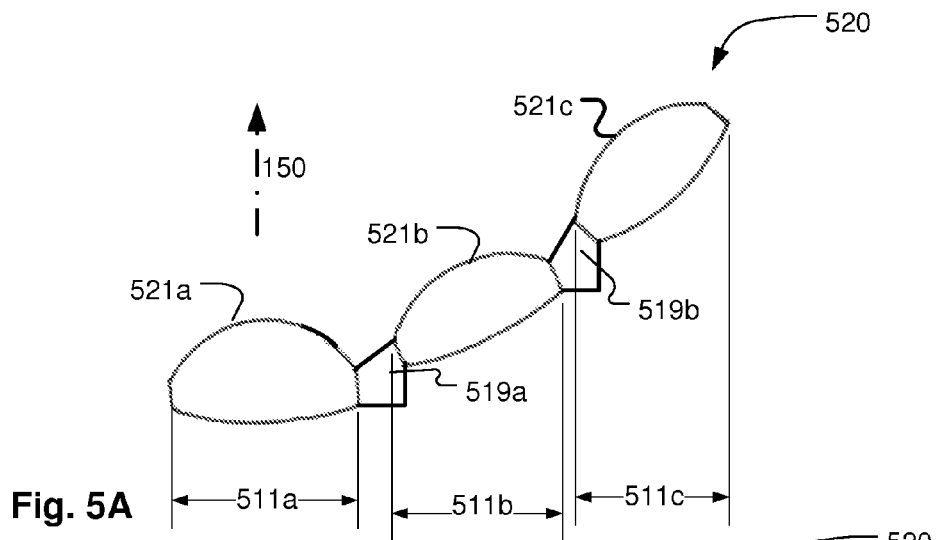
FIGS. 5A-5E illustrate principles for growing lenslets so that lenslets merges.

FIG. 5A illustrate a principal illustration of a number of adjacent lenslets 521a, 521b, 521c in a light collector 520. The adjacent or adjoining lenslets may have different radial distances 170 (illustrated in FIG. 1B) to the center of the light collector 120 or to the optical axis 150. The adjacent lenslets 521a, 521b, 521c have different longitudinal or axial positions along the optical axis 150, i.e., so that the axial distances 201 (illustrated in FIG. 2A) between the lenslets and light sources (not shown in FIG. 5A) along the optical axis for the adjacent lenslets 521a, 521b, 521c are different. The footprint of the lenslets 521a, 521b, 521c, i.e., the largest cross sectional area in a plane perpendicular to the optical axis 150, e.g., the area of the largest circular periphery are indicated by reference 511a, 511b or 511c.

In an embodiment, the light collector 520 is molded as a one piece light collector so that the assembly of all lenslets 521 is integrally formed as a single piece. In such a molded light collector 520, it would be possible to connect the adjacent lenslets 521a-521c, e.g., by adding material in a volume as indicated by reference 519a, 519b. However, such a connection volume 519a, 519b may be undesirable since the connection volume 519a, 519b may introduce steep edges which may not be acceptable due to molding requirements, for example, since the edges may make it impossible to separate the molded light collector from the mold. The connection volume 519a, 519b may also be undesirable since the resulting assembly of lenslets may not utilize the light collecting property of the light collector 120 in a sufficient way.

In order to improve molding conditions and to improve the percentage of power of emitted light from the light sources 111 which is transmitted through the gate 130, the adjacent lenslets 521a-c may be connected by extending the volume of one or all of the adjacent lenslets 521a-c.

Figure 5B:
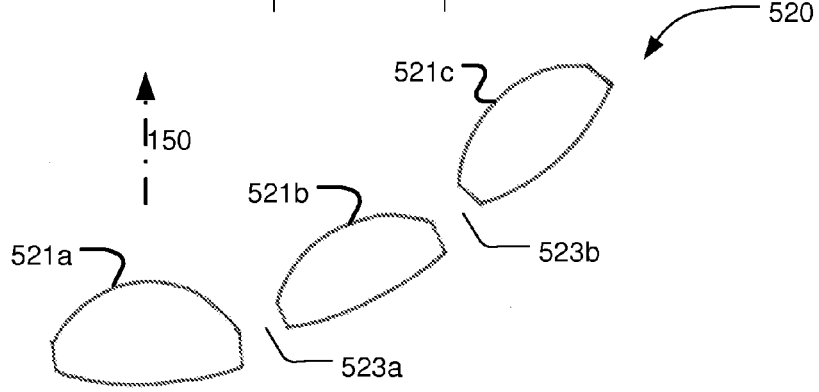

FIG. 5B shows the lenslets 521a-521c from FIG. 5A in an unconnected configuration. FIG. 5B shows a separation 523a and 523b respectively, between the lenslets 521a/521b and 521b/521c for convenience. However, it is noted that at least some or most of the adjacent lenslets connect at a point due to the dense packing as shown, for example, in FIG. 1B.

Figure 5C:
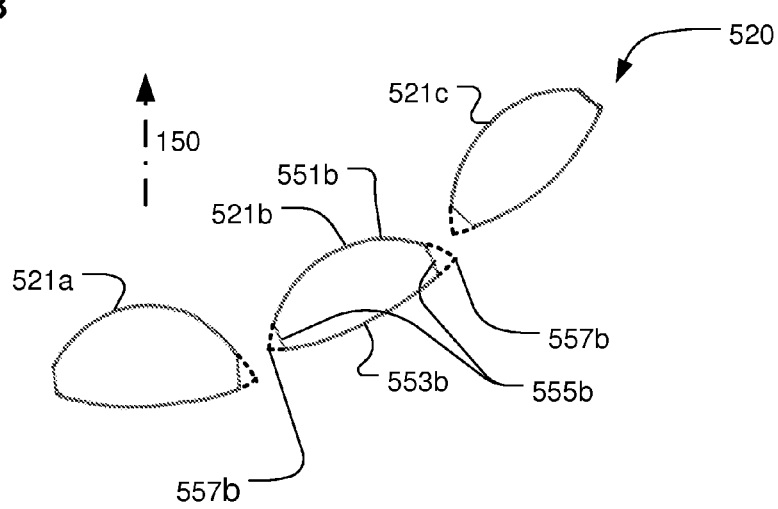

FIG. 5C illustrates the manner in which a volume of a lenslets 521a, 521b, 521c are extended by extending the upper curved exit surface 551b (for simplicity only indicated for lenslet 521b) and the lower curved entrance surface 553b beyond the plane edges 555b until the surfaces meet at a point 557b as indicated by broken lines. The surfaces are extended along the mathematically defined three-dimensional surfaces (typical determined by an optical design program) of the lenslets.

Figure 5D:
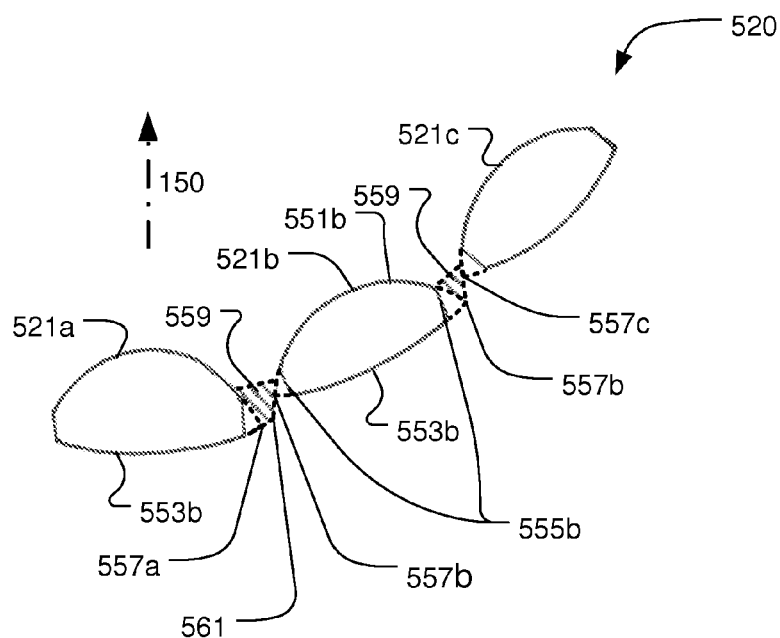

As can be seen in FIG. 5C, the extension or growth of the lenslet surfaces may not cause the lenslets to grown into each other. FIG. 5D illustrates that in order to connect adjacent lenslets, which does not merge by extending the exit and entrance surfaces, additional connection volumes 559 (hatched areas) are introduced between the extended adjacent lenslets. The additional connection volumes 559 are introduced by extending the entrance surface 553a of a first of the adjacent lenses and the exit surface 551b of a second of the adjacent lenses until they meet at a common point 561. The additional volume 559 is then added above the extended parts of the entrance surface 553a and the exit surface 551b of the adjacent lenses. The top of the additional volume is provided between the exit surfaces 551a and 551b of the adjacent lenslets and the height of the additional volume depends on molding and strength requirements to the light collector, as in order to allow molding the thickness of the light collector need to be above a certain dimension in order to allow flow of the molding material and the strengthen the light collector does also depend the thickness.

Figure 5E:
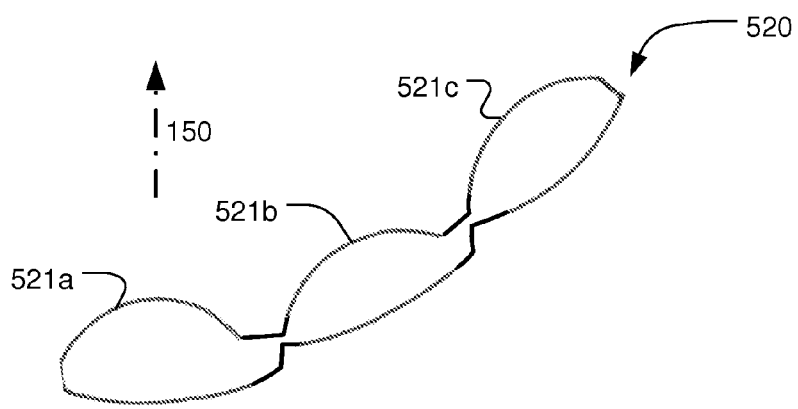

FIG. 5E illustrates a cross section of the final light collector shown in FIGS. 5B-5D. Merging the lenslets as described above make it possible to minimize the additional volumes and maintain more of the original optical properties of the lenslets, as a result more light can be collected and directed in the desired direction.

Figure 6A:
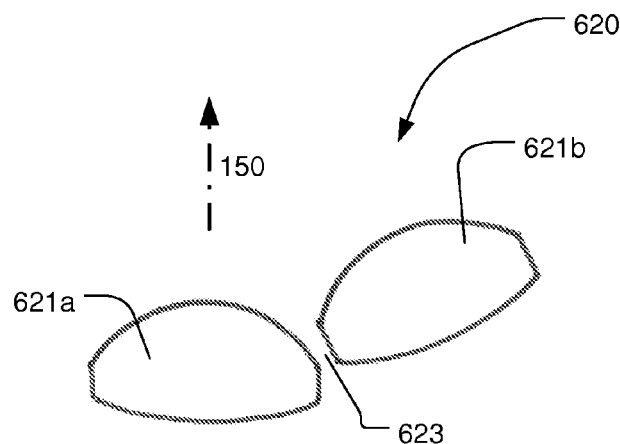
FIGS. 6A-6C illustrate other principles for growing lenslets so that lenslets merges.
Figure 6B:
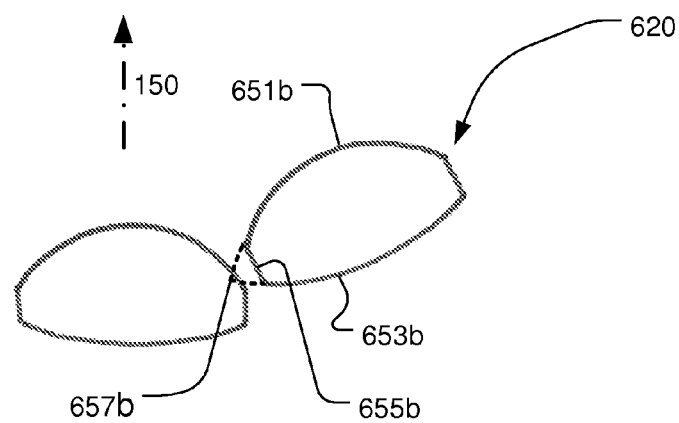
Figure 6C:
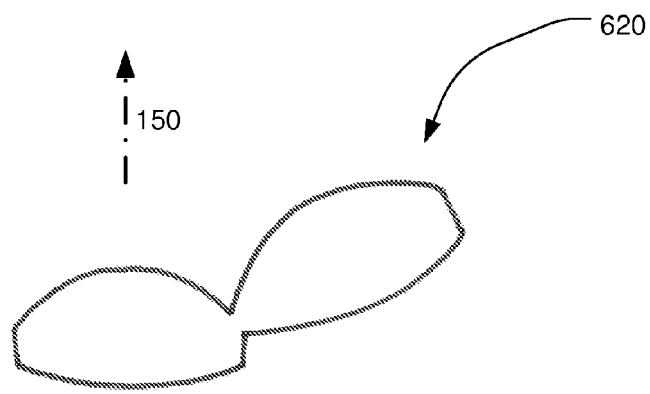

FIG. 6A-6C illustrate cross sectional views of adjacent lenslets 621a, 621b of a light collector and illustrate principles for making extended lenslets 621 when the lenslet surfaces are grown into each other.

FIG. 6A shows the lenslets 621a and 621b in an unconnected configuration. FIG. 6A shows a separation 623 between the lenslets 621a/621b for convenience. However, it is noted that at least some or most of the adjacent lenslets connect at a point due to the dense packing as shown in, for example, FIG. 1B.

FIG. 6B illustrates the manner in which a volume of the lenslet 621b is extended by extending the upper curved exit surface 651b and the lower curved entrance surface 653b beyond the plane edges 655b until the surfaces meet at a point 657b as indicated by broken lines. The surfaces are extended along the mathematically defined three-dimensional surfaces of the lenslets. In this embodiment, the lenslets 621a and 621b are arranged so close that lenslet 621a will grow into lenslet 621 when the entrance surface 653b and exit surface 655b are extended until they meet in point 657b. In this situation, the entrance surface 653b and exit surface 655b are extended until they meet the adjacent surfaces of lenslet 621a. The resulting light collector 620 is shown in FIG. 6C.

FIG. 7A-7D illustrate cross sectional views of adjacent lenslets 721a, 721b of a light collector 720 and illustrate principles for making extended lenslets 721 when the two adjacent lenslets grow into each other when both lenslets are grown.

Figure 7A:
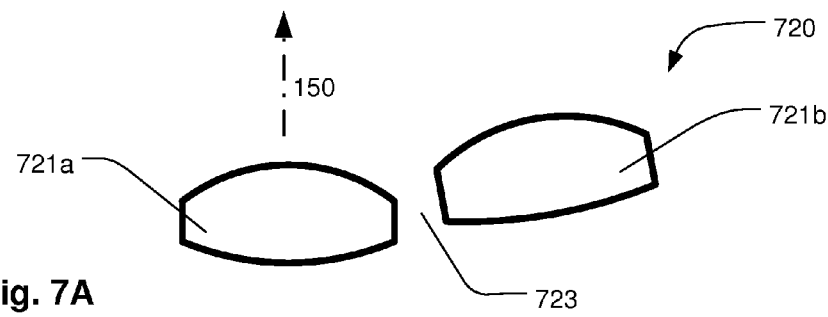
FIGS. 7A-7D illustrate other principles for growing lenslets so that lenslets merges.

FIG. 7A illustrate the lenslets 721a and 721b in an unconnected configuration. FIG. 7A shows a separation 723 between the lenslets 721a/721b for convenience.

Figure 7B:
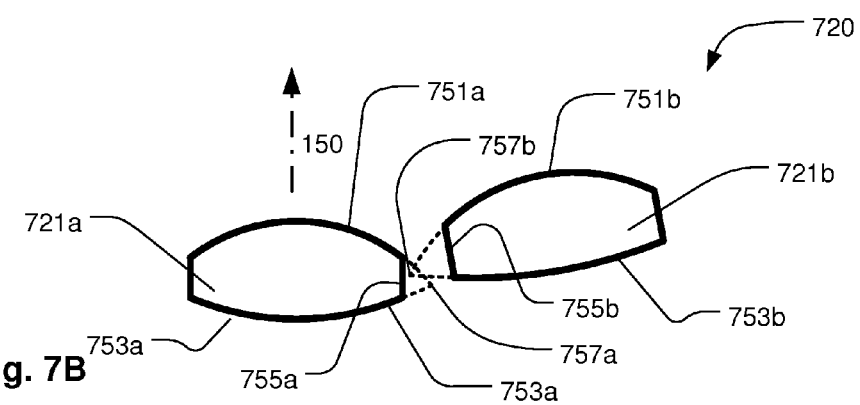
Figure 7C:
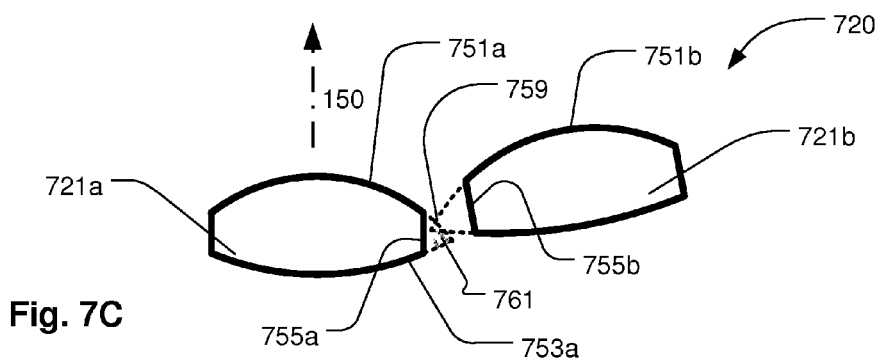

FIGS. 7B and 7C illustrate the manner in which the volume of the lenslets 721a and 721b are extended by extending the upper curved exit surfaces 751a, 751b and the lower curved entrance surfaces 753a,753b beyond the edges 755a and 755b until they, respectively, meet in points 757a, 757b as indicated by broken lines. The surfaces are extended along the mathematically defined three-dimensional surfaces of the lenslets. In this embodiment, the extended exit surfaces 751a and 751b meet in point 759 and the exit surfaces 751a and 751b are only extended to this point and the two lenslets are thus joined in this point. At the entrance side, hatched part 761 has a structure which cannot be molded since slip-angles of the extended surface 751a at the entrance side are smaller than an allowed minimum slip angle (e.g., 91 degrees). Furthermore, the parts 761 contain lens volumes which have no optical effect or has undesired optical effects. Removal of the volume 761 further has the effect that the area of the entrance surface of lenslet 721b is increased since the shadow effect of part 761 on lenslet 721b is removed. Correspondingly, the shadow of part 761 on the lenslet 721a for a light propagating along the optical axis 150 is eliminated by removal of part 761 and, thereby, part 761.

Figure 7D:
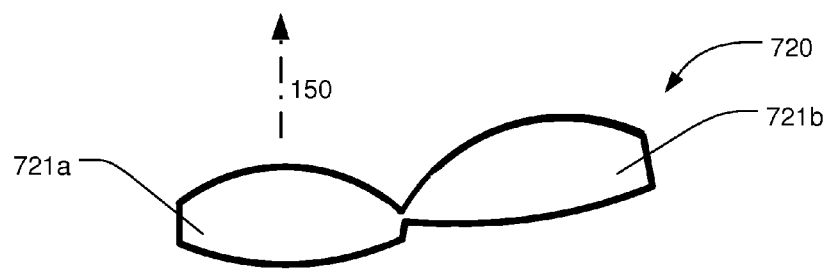

The resulting design is shown in FIG. 7D wherein the angles of edges are larger than the allowed minimum slip angle. The design in FIG. 7D also satisfies the requirements to the minimum thickness of the material of the light collector.

FIGS. 8A-8H illustrate the manner in which the volume of a number of lenslets 821a, 821b, 821c are extended by extending the upper curved exit surfaces and the lower curved entrance surfaces and further illustrate the manner in which the lenslets can be extended at different cross sections of the light collector. FIGS. 8A-8D illustrate the light collector 820 in an un-grown configuration prior to letting the lenslets grow and FIGS. 8E-8H illustrates the light collector 820 in a grown configuration, where the lenslets have grown into each other. FIGS. 8A and 8E illustrate a top view of the light collector. FIGS. 8B and 8F illustrates a cross sectional view respectively along line A-A in FIG. 8A and line A'-A' in 8E; FIGS. 8C and 8G illustrates a cross sectional view respectively along line B-B in FIG. 8A and line B'-B' in 8E; FIGS. 8D and 8H illustrates a cross sectional view respectively along line C-C in FIG. 8A and line C'-C' in 8E.

In the cross sectional view of the un-grown light collector 820 in FIG. 8B-8D, the dotted lines indicates the extended parts of the entrance and exit surfaces of the lenslets 821a, 821b, 821c and in the top view, the dotted lines indicate where the extended exit surface and extended exit surface of each lenslets will meet if they are extended until they meet.

In FIGS. 8B and 8F, it can be seen that the lenslets already meet (due to dense packaging described above) a long line C-C and C'-C' and it is thus not necessary to grow the lenslets into each at these points. The lenslets 821a and 821c have thus only been grown at the outermost part along line C-C and C'-C' the lenslets are not grown at the points where the lenslets meet.

In FIGS. 8C and 8G it can be seen that along line B-B and B'-B', the exit surface of lenslet 821a and 821b have been extended until the meet in a point between the two lenslets and the their entrance surface also have been extended until they meet in a point between the two lenslets. It can also be seen that extended exit surface of lenslet 821c hits/meets the exit surface of lenslets 821b and that the extended exit surface of lenslet 821c hits/meets the entrance surface of lenslets 821b. As a result, along line B-B and B'-B', only the lenslet 821c have been grown until it meets the original lenslet 821b. As can been seen in the top view illustrated in FIG. 8E the result is that a part of the boundary 861 (curved part) where lenslets 821b and 821c meet follows the original shape of lenslet 821b.

In FIGS. 8D and 8H, it can be seen that along line A-A and A'-A' that the extension of the exit surface and entrance surface of lenslets 821a and 821b does not result in the lenslets being merged. An additional volume 859 has been added an additional volume (as describe in FIG. 5) in the area between the extended lenslets and such that the minimum thickness requirements are fulfilled. Further, it can be seen that along line A-A and A'-A' that the exit surface of lenslet 821b and 821c have been extended until the meet in point between the two lenslets and that the their entrance surface also have been extended until they meet in a point between the two lenslets.

FIGS. 8A-8H illustrate a row of three lenslets however it is to be understood that any number of lenslets can be grown into each other and that the lenslets can be arranged in array having any shape.

Figure 9A:
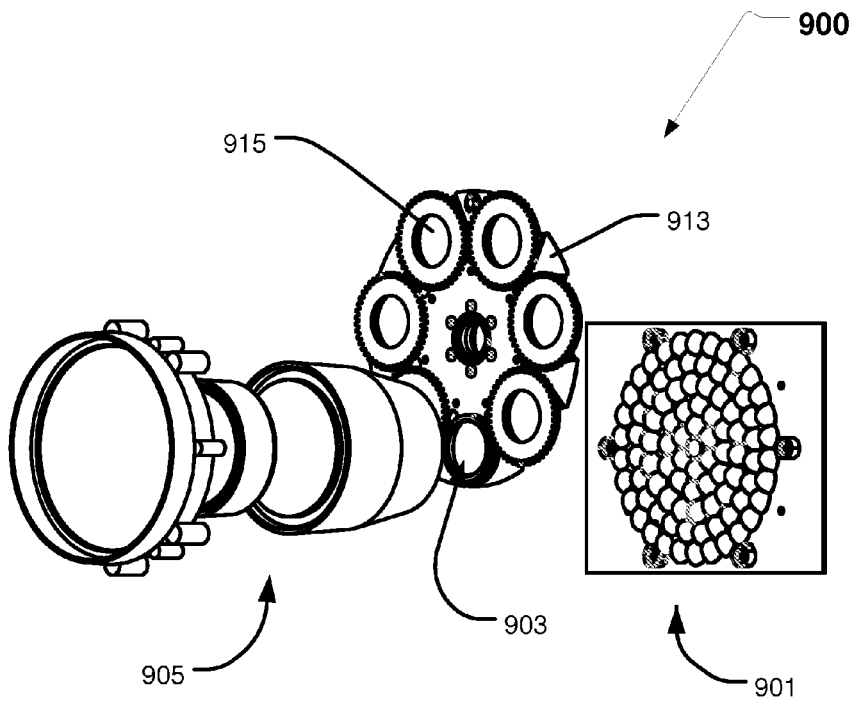
FIGS. 9A-9C illustrate an illumination device comprising a light unit and a light collector according to the present invention.
Figure 9B:
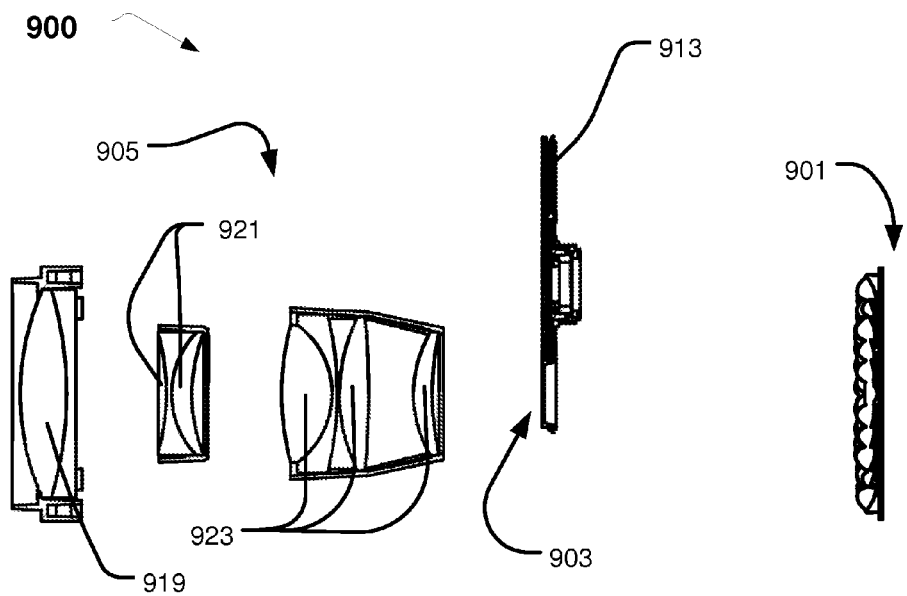
Figure 9C:
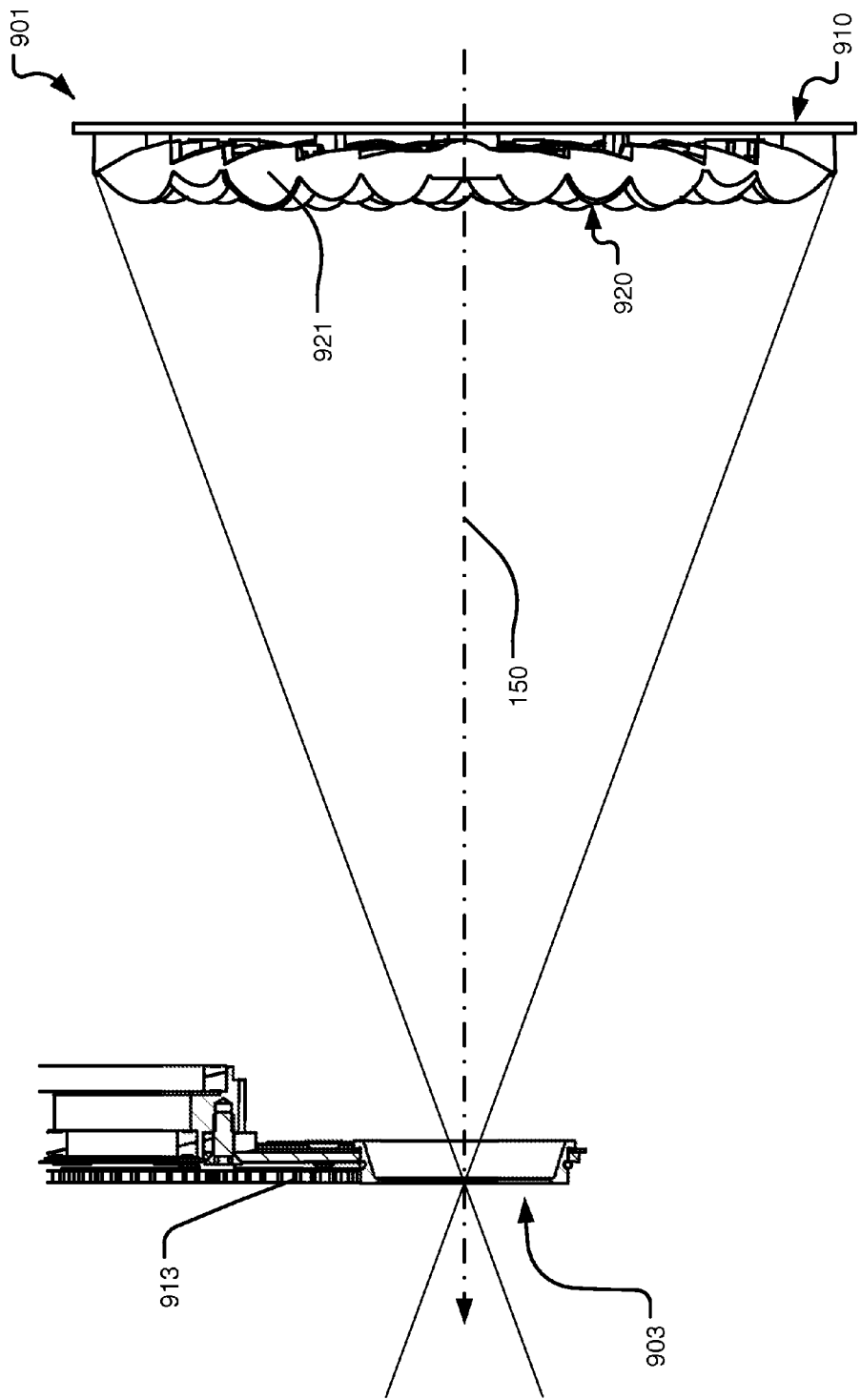

FIGS. 9A-9C illustrate an illumination device in the form of a gobo projector 900 comprising a light source module 901. The light source module 901 comprises a light collector 920 and a light unit 910 similar to the one depicted in FIG. 1. FIG. 9A illustrates a front perspective view of the illumination device, FIG. 9B illustrates a cross sectional view, and FIG. 9C illustrates an enlarged cross sectional view of the light source module 901, light collector 920, light unit 910 and a gobo wheel 913. The illumination device further comprises a projecting system 905 adapted to image the gobo of one of the apertures 903 onto a target surface.

The gobo wheel 913 comprising a number of gobos 915 mounted on a rotating carousel as known in the art of entertainment lighting. The gobo wheel can for instance be embodied as described in U.S. Pat. No. 5,402,326, U.S. Pat. No. 6,601,973, U.S. Pat. No. 6,687,063 or U.S. Publication No. 2009/0122548 incorporated herein by reference. Each gobo can be moved into aperture 903 by rotating the carousel. The aperture 903 is equivalent to the gate 130 shown in FIG. 1.

The projecting system is adapted to create an image of the gobo at a target surface (not shown) and comprises a projecting system 905 including a number of optical lenses, such as, for instance, a front lens 919, a number of zoom lenses 921, and a number of focus lenses 923. The zoom lenses and focus lenses can be moved in relation the front lens and the aperture, as known in the art of projecting systems.

The illustrated gobo projector can also comprise a color wheel comprising a number of optical filters (e.g., dichroic filters, color gels or the like) which can also be positioned into the light beam. The color wheel is useful in the case that the light sources produce a white light beam and can be used to create a certain color of the light beam. Graduated color filters which gradually can change the color of the light beam can also be used, for instance in connection with the known CMY color mixing systems. The color wheel is, however, optional, as it can be omitted in the case where the light sources 111 are of different colors and adapted to perform additive color mixing as known in the art of dynamic lighting. This is for instance possible by having a number of red, green and blue LEDs where the color mixing is based on the intensity of the different colors. The intensity of the different colors can for instance be controlled by the commonly known pulse width modulation (PWM) method, or by adjusting the DC current through each color LED.

FIG. 9C shows that lenslets have different axial distances (illustrated in FIG. 2A) between an arbitrary plane of the light unit 910 where the light sources are placed. FIG. 9C also shows the different angling of lenslets 921 (as also shown in FIG. 2C) relative to the optical axis 150. The lenslets 921 also have different optical powers which however may be difficult to see clearly from FIG. 9C.

Figure 10A:
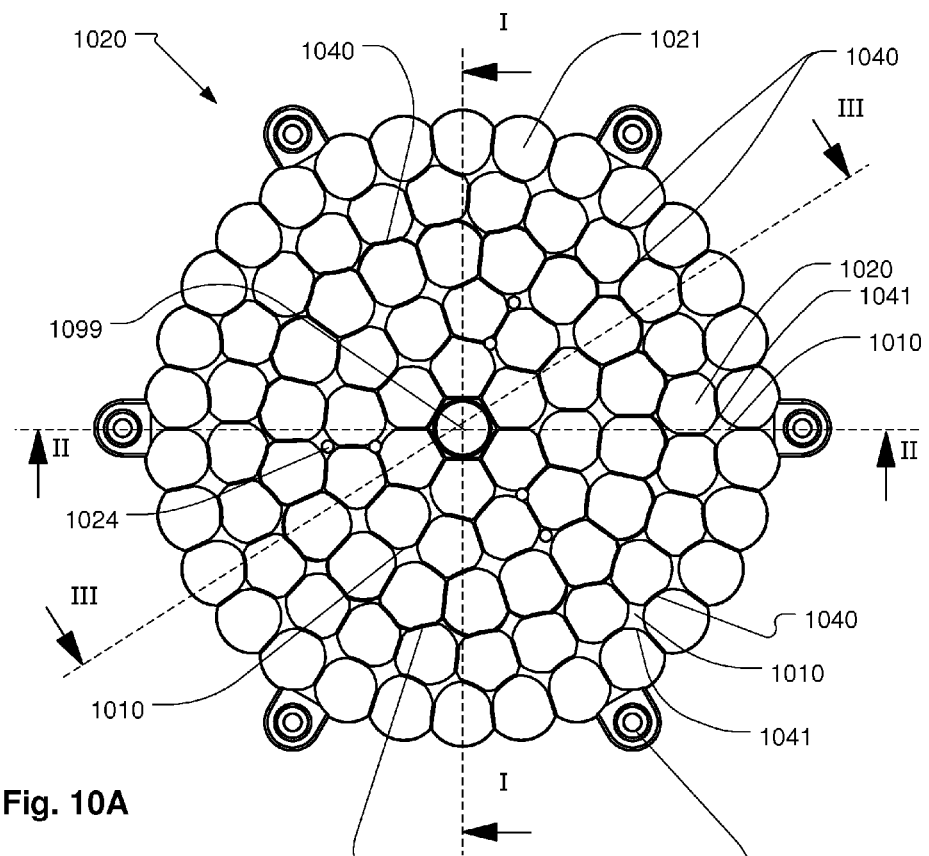
FIGS. 10A-10E illustrate views of a light collector with 90 lenslets.
Figure 10B:
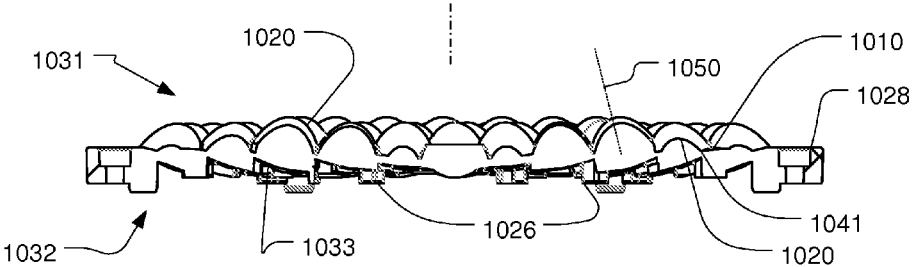
Figure 10C:
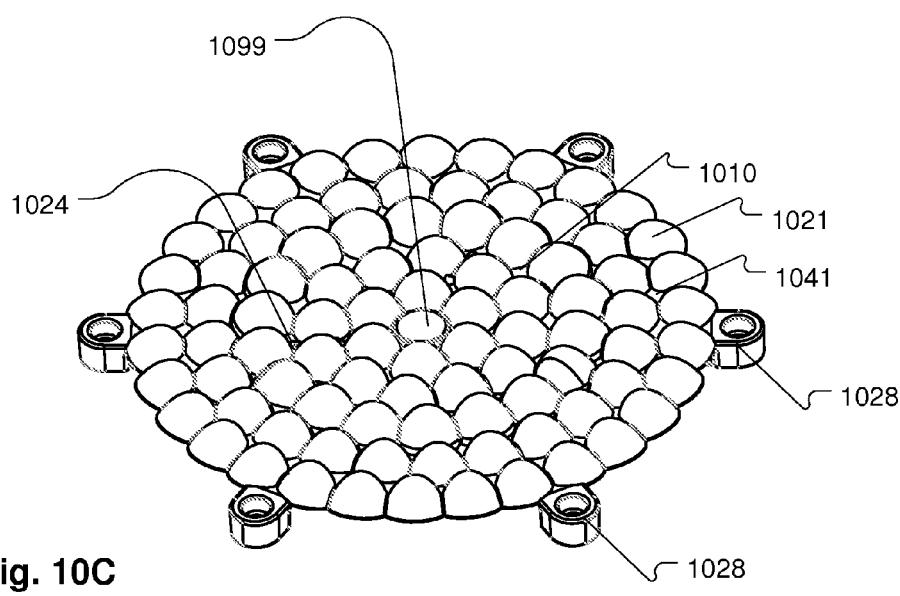
Figure 10D:
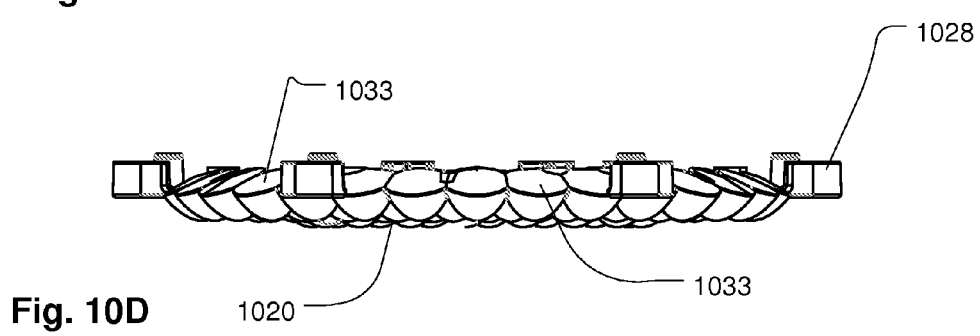
Figure 10E:
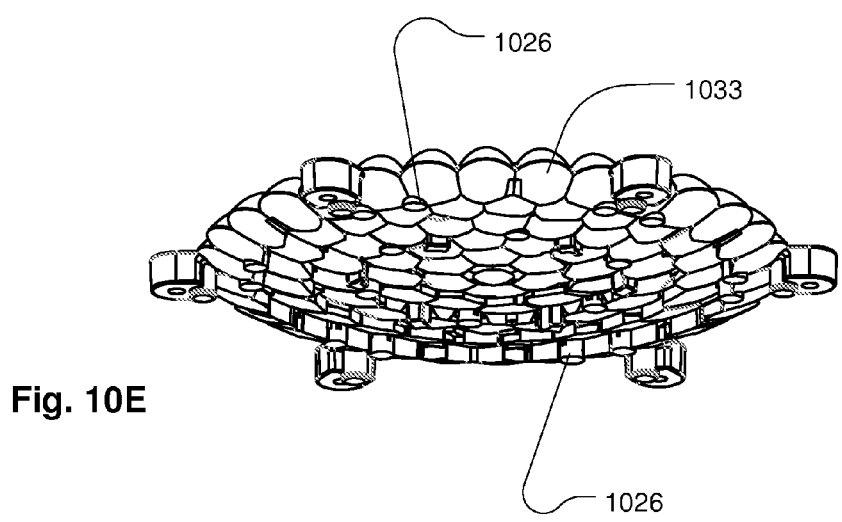

FIGS. 10A-10E illustrate views of a light collector 1020 with 90 lenslets 1021, where FIG. 10A is a top view (seen towards the exit surfaces of the lenslets); FIG. 10B is a cross sectional view along line II-II; FIG. 10C is a tilted view of exit surface of the light collector FIG. 10*d* is a side view of the light collector 1020; and FIG. 10E is a tilted view of entrance surface of the light collector.

The 90 lenslets 1021 of the light collector 1020 are arranged in a dense circular packaging as described previously. The dense circular packaging is equivalent to the circular packing shown in FIG. 4H, and where the center lens have been omitted in order to use this space as a molding inlet.

The top image illustrates that the extended lenslets (i.e., lenslets extended according to the principles described in connection with FIG. 5-8) are merged together so that the exit surfaces of adjacent lenslets meet along boundaries or edges 1040 (only a few are indicated by a labeled in the figure). The boundary 1040 between at least some of the adjacent lenslets may have a length greater than 1 mm or greater than at least 5% of the diameter of a lenslet or even greater than 20% of the diameter of a lenslet as shown in the drawings.

FIG. 10B illustrates that the lenslets 1021 have different longitudinal/axial positions and/or have optical axes 1050 that are angled relative to the optical axis 150 of the light collector.

Further, the dense pattern includes plane zones 1010 having plane or substantially plane surfaces of a given area of substantial size. The plane surfaces may be substantially perpendicular or angled in relation to the optical axis 150. The front and back faces of the plane zones are respectively denoted as exit and entrance surfaces in analogy with the exit and entrance surfaces of the lenslets. Thus, the plane zones have no optical power. Due to molding requirements, the thickness of the plane zones along the optical axis 150 is at least 2 mm, or at least 3 mm, however, silicone based light collectors can be molded with thickness of at least 1 mm. The FIGS. 10A and 10B show that exit surfaces 1020 of at least some of the lenslets 1021 meet the exit surfaces of the plane zones 1010 along a curved boundary 1041.

Advantageously, some of the plane zones 1010 in the light collector may comprise mounting holes 1024, for example, for mounting the light collector fixedly relative to the light collector 120. The planar zones may also be provided with bosses/turrets 1026 adapted to support the light collector when mounted. Further, a number of protrusions 1028 may be provided at the outer part of the light collector and these protrusions may be provided with holes and/or supporting means for fastening the light collector to a PCB with the LEDs.

FIG. 10B illustrates that the light collector 120 comprises a front side 1031 on which all exit surfaces 1020 are located and a back side 1032 on which all entrance surfaces 1033 are located.

In order to provide an inlet for enabling the liquid molding material to flow into the mold, the mold may be configured so that the resulting dense pattern of lenslets of the light collector does not include a lenslet at the center of the light collector or so that a lenslet at another location has been removed. FIG. 10A shows that the light collector does not have a lenslet in the center 1099. In general a light collector 1020 may be configured so that at least one of the lenslets in the dense pattern is omitted in order to enable molding of the light collector.

Figure 11D:
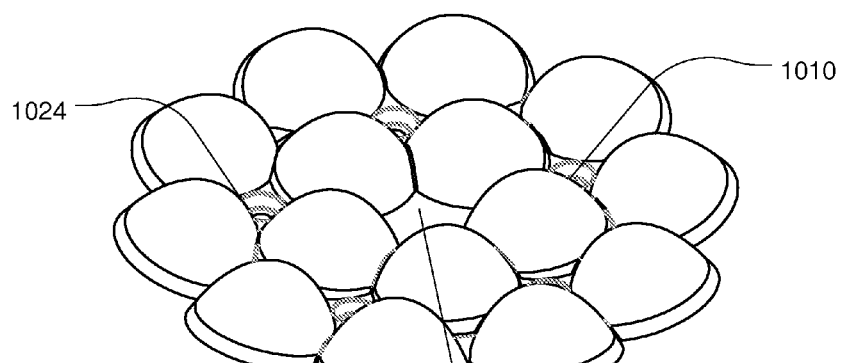
Figure 11E:
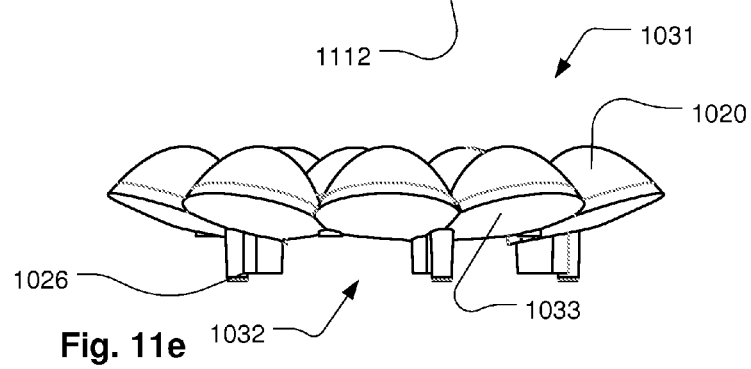
Figure 11F:
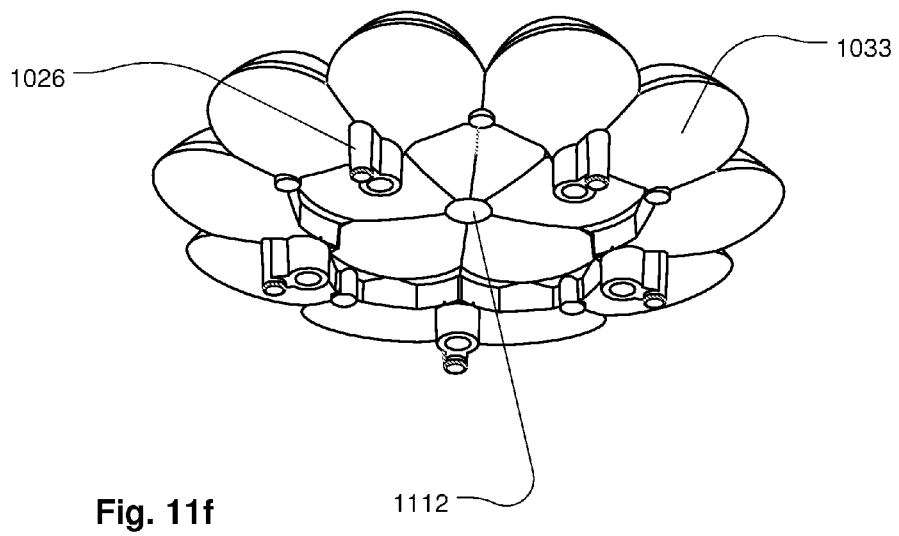

FIGS. 11A-11F illustrate views of a light collector 1120 with 15 lenslets 1121, where FIG. 11*a* is a top view, FIG. 11B is a cross sectional view along line IV-IV, FIG. 11C is a cross sectional view along line V-V; FIG. 11D is a top perspective view, FIG. 11E is a side view and FIG. 11*f* is a bottom perspective view. The reference signs in FIGS. 11A-11F refer to features which are identical or equivalent to features indicated with the same reference signs in FIGS. 10A-10F and will not be described further.

The dense circular packaging is equivalent to the circular packing shown in FIG. 4A with 15 lenslets and does thus not include a center lenslet—accordingly, the center 1112 in this design may be used for forming an inlet in the mold for the liquid molding material.

An embodiment of the invention relates to a method for manufacturing an illumination device. The method includes a molding step wherein a mold for a light collector is provided. The mold is shaped to form a plurality of lenslets adapted to collect light from the light sources and adapted to convert the collected light into a plurality of light beams so that the light beams propagate along an optical axis. The mold is shaped so that each of the lenslets comprises an entrance surface where the light enters the lenslet and an exit surface where the light exits the lenslet, so that the lenslets are arranged in a dense circular pattern, and so that the axial distances between the lenslets and light sources along the optical axis for adjacent lenslets are different for at least some of the adjacent lenslets. The manufacturing method further comprises providing a light unit having a plurality of light sources and arranging the light unit relative to the light collector so that lenslets are arranged at a correct position relative to the light sources.

A related embodiment of the invention relates to a method for manufacturing an illumination device wherein the method includes steps for determining a dense packing of the lenslets. The arrangement of the lenslets in a dense pattern comprises arranging a plurality of the lenslets as outermost lenslets along an outer circular boundary so that each of the outermost lenslets has the same radial distance to a center of the light collector. The method further comprises optimizing the packaging density of the lenslets by optimizing a packaging density defined by a ratio of a sum of areas of the circular cross sections or footprints of the lenslets and an area of the outer circular boundary.

A related embodiment of the invention relates to method for manufacturing a light collector adapted to collect light from a plurality of light sources wherein the method comprises:

providing a mold of the light collector, wherein the mold is shaped to form a plurality of lenslets adapted to collect light from the light sources and adapted to convert the collected light into a plurality of light beams so that the light beams propagate along an optical axis, and wherein the mold is shaped so that:

each of the lenslets comprises an entrance surface where said light enters the lenslet and an exit surface where the light exits the lenslet, and wherein the lenslets are arranged in a dense circular pattern including adjacent lenslets, wherein the exit surfaces of at least some pairs of the adjacent lenslets meet along a boundary.

Any of the methods for manufacturing a light collector may further include injecting a molding fluid into the mold through an inlet located in a center of the mold so that the center lenslet is missing in the molded light collector. Hereby is achieved that low tolerances in the light collector can be maintained as the flow and molding pressure of the molding material is symmetrical during the molding process. However low viscosity molding materials the mold could be injected through the edge so center lenslet could be maintained.

The present invention is described in view of an illumination device comprising a number of LEDs that generate a light beam. However the person skilled in the art realizes that any kind of light source such as discharge lamps, PLEDs, OLEDs, plasma sources, halogen sources, fluorescent light sources, and phosphor based light sources, etc. can be used. Further it is to be understood that the illustrated embodiments only serve as illustrating examples illustrating the principles of the present invention and that the skilled person will be able to provide several embodiments within the scope of the claims. In the illustrated embodiments the illustrated light beams and optical means do only serve as to illustrate the principles of the invention rather than illustrating exact and precise light beams and optical means. Any reference signs in the claims should not be construed as limiting the scope.

The following tables 1a-1l show normalized coordinates of lenslets of the light collector designs shown in FIGS. 4A-L respectively.

TABLE 1a 15 lenslets
density of lenslets 0.8388
radius of lenslets 0.0649

| x | y | distance to center |
|---|---|---|
| 0.3579 | 0.1163 | 0.3763 |
| 0.0000 | 0.3763 | 0.3763 |
| −0.3579 | 0.1163 | 0.3763 |
| −0.2212 | −0.3044 | 0.3763 |
| 0.2212 | −0.3044 | 0.3763 |
| 0.6179 | 0.4741 | 0.7788 |
| 0.2600 | 0.7341 | 0.7788 |
| −0.2600 | 0.7341 | 0.7788 |
| −0.6179 | 0.4741 | 0.7788 |
| −0.7786 | −0.0204 | 0.7788 |
| −0.6419 | −0.4411 | 0.7788 |
| −0.2212 | −0.7468 | 0.7788 |
| 0.2212 | −0.7468 | 0.7788 |
| 0.6419 | −0.4411 | 0.7788 |
| 0.7786 | −0.0204 | 0.7788 |

TABLE 1b 24 lenslets
density of lenslets 0.8414
radius of lenslets 0.0598

| x | y | distance to center |
|---|---|---|
| 0.1560 | −0.0559 | 0.1657 |
| −0.1544 | 0.1141 | 0.1920 |
| −0.0344 | 0.4634 | 0.4646 |
| −0.3093 | −0.3528 | 0.4692 |
| 0.3072 | 0.3572 | 0.4711 |
| 0.0233 | −0.4735 | 0.4741 |
| −0.4733 | −0.0392 | 0.4749 |
| 0.3545 | −0.3488 | 0.4973 |
| 0.4954 | 0.0444 | 0.4973 |
| −0.3870 | 0.3808 | 0.5429 |
| 0.8164 | −0.1045 | 0.8231 |
| 0.7848 | 0.2480 | 0.8231 |
| −0.3717 | 0.7343 | 0.8231 |

TABLE 1b-continued 24 lenslets
density of lenslets 0.8414
radius of lenslets 0.0598

| x | y | distance to center |
|---|---|---|
| −0.8229 | 0.0157 | 0.8231 |
| −0.0290 | 0.8225 | 0.8231 |
| −0.5447 | −0.6171 | 0.8231 |
| −0.7534 | −0.3313 | 0.8231 |
| 0.3191 | 0.7587 | 0.8231 |
| −0.2352 | −0.7887 | 0.8231 |
| 0.6971 | −0.4376 | 0.8231 |
| 0.1177 | −0.8146 | 0.8231 |
| 0.6081 | 0.5546 | 0.8231 |
| 0.4489 | −0.6899 | 0.8231 |
| −0.7403 | 0.3598 | 0.8231 |

TABLE 1c 36 lenslets
density of lenslets 0.7908
radius of lenslets 0.0649

| x | y | distance to center |
|---|---|---|
| 0.0006 | 0.0022 | 0.0023 |
| −0.0611 | −0.2877 | 0.2942 |
| −0.2814 | −0.0891 | 0.2952 |
| 0.2216 | −0.1955 | 0.2955 |
| −0.2172 | 0.2032 | 0.2975 |
| 0.2823 | 0.0947 | 0.2977 |
| 0.0644 | 0.2957 | 0.3026 |
| 0.4183 | 0.3639 | 0.5545 |
| 0.0773 | −0.5499 | 0.5553 |
| −0.4390 | −0.3401 | 0.5553 |
| −0.5136 | 0.2113 | 0.5553 |
| 0.5180 | −0.2006 | 0.5555 |
| −0.2190 | −0.5388 | 0.5816 |
| 0.3591 | −0.4581 | 0.5821 |
| −0.5776 | −0.0781 | 0.5829 |
| −0.3517 | 0.4674 | 0.5849 |
| 0.5787 | 0.0895 | 0.5856 |
| 0.1892 | 0.5646 | 0.5954 |
| −0.1009 | 0.6254 | 0.6335 |
| −0.3597 | 0.7712 | 0.8510 |
| 0.6579 | 0.5410 | 0.8518 |
| −0.8107 | −0.2613 | 0.8518 |
| −0.4520 | −0.7219 | 0.8518 |
| 0.4009 | −0.7516 | 0.8518 |
| −0.1772 | −0.8331 | 0.8518 |
| −0.6275 | 0.5760 | 0.8518 |
| −0.6721 | −0.5233 | 0.8518 |
| 0.6342 | −0.5687 | 0.8518 |
| 0.7906 | −0.3169 | 0.8518 |
| −0.8510 | 0.0366 | 0.8518 |
| 0.4326 | 0.7337 | 0.8518 |
| 0.8035 | 0.2828 | 0.8518 |
| 0.0969 | 0.8463 | 0.8518 |
| −0.7869 | 0.3260 | 0.8518 |
| 0.1190 | −0.8434 | 0.8518 |
| 0.8514 | −0.0267 | 0.8518 |

37 lenslets
density of lenslets 0.8414
radius of lenslets 0.0598

| x | y | distance to center |
|---|---|---|
| | Table 1l | |
| 0.0000 | 0.0000 | 0.0000 |
| 0.2267 | 0.1902 | 0.2959 |
| −0.2267 | −0.1902 | 0.2959 |

-continued 37 lenslets
density of lenslets 0.8414
radius of lenslets 0.0598

| x | y | distance to center |
|---|---|---|
| −0.2781 | 0.1012 | 0.2959 |
| 0.2781 | −0.1012 | 0.2959 |
| −0.0514 | 0.2914 | 0.2959 |
| 0.0514 | −0.2914 | 0.2959 |
| 0.0966 | 0.5477 | 0.5561 |
| −0.0966 | −0.5477 | 0.5561 |
| −0.4260 | 0.3575 | 0.5561 |
| 0.4260 | −0.3575 | 0.5561 |
| 0.5226 | 0.1902 | 0.5561 |
| −0.5226 | −0.1902 | 0.5561 |
| 0.3746 | 0.4465 | 0.5828 |
| −0.1993 | 0.5477 | 0.5828 |
| −0.3746 | −0.4465 | 0.5828 |
| 0.1993 | −0.5477 | 0.5828 |
| −0.5740 | 0.1012 | 0.5828 |
| 0.5740 | −0.1012 | 0.5828 |
| 0.4260 | 0.7379 | 0.8520 |
| −0.4260 | 0.7379 | 0.8520 |
| −0.4260 | −0.7379 | 0.8520 |
| 0.4260 | −0.7379 | 0.8520 |
| 0.6527 | 0.5477 | 0.8520 |
| −0.6527 | 0.5477 | 0.8520 |
| −0.6527 | −0.5477 | 0.8520 |
| 0.6527 | −0.5477 | 0.8520 |
| 0.8520 | 0.0000 | 0.8520 |
| 0.8007 | 0.2914 | 0.8520 |
| −0.8007 | 0.2914 | 0.8520 |
| −0.8520 | 0.0000 | 0.8520 |
| −0.8007 | −0.2914 | 0.8520 |
| 0.8007 | −0.2914 | 0.8520 |

Table 1d

| 0.1480 | 0.8391 | 0.8520 |
| −0.1480 | 0.8391 | 0.8520 |
| −0.1480 | −0.8391 | 0.8520 |
| 0.1480 | −0.8391 | 0.8520 |

TABLE 1e 60 lenslets
density of lenslets 0.8388
radius of lenslets 0.0649

| x | y | distance to center |
|---|---|---|
| 0.0010 | 0.0020 | 0.0023 |
| −0.0764 | −0.2160 | 0.2291 |
| −0.2265 | −0.0399 | 0.2300 |
| 0.1511 | −0.1739 | 0.2304 |
| −0.1458 | 0.1808 | 0.2323 |
| 0.2279 | 0.0466 | 0.2327 |
| 0.0811 | 0.2253 | 0.2395 |
| −0.4143 | 0.0952 | 0.4251 |
| −0.2854 | −0.3160 | 0.4258 |
| 0.1329 | −0.4045 | 0.4258 |
| 0.4173 | −0.0863 | 0.4261 |
| −0.1106 | 0.4125 | 0.4270 |
| −0.0945 | −0.4466 | 0.4565 |
| −0.4352 | −0.1397 | 0.4571 |
| 0.3417 | −0.3049 | 0.4580 |
| −0.3358 | 0.3128 | 0.4589 |
| 0.4353 | 0.1492 | 0.4601 |
| 0.1174 | 0.4538 | 0.4687 |
| 0.3255 | 0.3527 | 0.4800 |
| −0.3652 | 0.5422 | 0.6537 |
| 0.6518 | 0.0679 | 0.6554 |
| −0.6335 | 0.1691 | 0.6557 |
| −0.2717 | −0.5967 | 0.6557 |
| 0.1737 | −0.6322 | 0.6557 |
| −0.6529 | −0.0614 | 0.6558 |
| −0.4620 | −0.4653 | 0.6558 |

TABLE 1e-continued 60 lenslets
density of lenslets 0.8388
radius of lenslets 0.0649

| x | y | distance to center |
|---|---|---|
| 0.3825 | −0.5326 | 0.6558 |
| 0.6356 | −0.1629 | 0.6561 |
| −0.1557 | 0.6403 | 0.6589 |
| −0.5550 | 0.3867 | 0.6764 |
| −0.0537 | −0.6743 | 0.6764 |
| −0.6118 | −0.2891 | 0.6767 |
| 0.5600 | −0.3815 | 0.6776 |
| 0.6083 | 0.3026 | 0.6795 |
| 0.2933 | 0.6129 | 0.6795 |
| 0.0721 | 0.6806 | 0.6844 |
| 0.4985 | 0.5062 | 0.7105 |
| 0.2573 | 0.8440 | 0.8823 |
| 0.8827 | 0.0537 | 0.8843 |
| 0.8386 | 0.2807 | 0.8843 |
| 0.7297 | 0.4995 | 0.8843 |
| 0.4883 | 0.7373 | 0.8843 |
| −0.0391 | 0.8835 | 0.8843 |
| −0.2668 | 0.8431 | 0.8843 |
| −0.4763 | 0.7451 | 0.8843 |
| −0.6533 | 0.5961 | 0.8843 |
| −0.7855 | 0.4063 | 0.8843 |
| −0.8640 | 0.1887 | 0.8843 |
| −0.8834 | −0.0418 | 0.8843 |
| −0.8423 | −0.2695 | 0.8843 |
| −0.7430 | −0.4796 | 0.8843 |
| −0.5932 | −0.6559 | 0.8843 |
| −0.4029 | −0.7873 | 0.8843 |
| −0.1849 | −0.8648 | 0.8843 |
| 0.0457 | −0.8832 | 0.8843 |
| 0.2731 | −0.8411 | 0.8843 |
| 0.4819 | −0.7415 | 0.8843 |
| 0.6577 | −0.5912 | 0.8843 |
| 0.7909 | −0.3957 | 0.8843 |
| 0.8664 | −0.1771 | 0.8843 |

TABLE 1f 61 lenslets
density of lenslets 0.8414
radius of lenslets 0.0598

| x | y | distance to center |
|---|---|---|
| 0.0000 | 0.0000 | 0.0000 |
| 0.2230 | 0.0598 | 0.2309 |
| 0.0598 | 0.2230 | 0.2309 |
| −0.1633 | 0.1633 | 0.2309 |
| −0.2230 | −0.0598 | 0.2309 |
| −0.0598 | −0.2230 | 0.2309 |
| 0.1633 | −0.1633 | 0.2309 |
| 0.4461 | 0.0000 | 0.4461 |
| 0.0000 | 0.4461 | 0.4461 |
| 0.3863 | 0.2230 | 0.4461 |
| 0.2230 | 0.3863 | 0.4461 |
| −0.2230 | 0.3863 | 0.4461 |
| −0.3863 | 0.2230 | 0.4461 |
| −0.4461 | 0.0000 | 0.4461 |
| 0.0000 | −0.4461 | 0.4461 |
| −0.3863 | −0.2230 | 0.4461 |
| −0.2230 | −0.3863 | 0.4461 |
| 0.2230 | −0.3863 | 0.4461 |
| 0.3863 | −0.2230 | 0.4461 |
| 0.6172 | 0.2230 | 0.6563 |
| 0.5018 | 0.4230 | 0.6563 |
| 0.1155 | 0.6461 | 0.6563 |
| −0.1155 | 0.6461 | 0.6563 |
| −0.5018 | 0.4230 | 0.6563 |
| −0.6172 | 0.2230 | 0.6563 |
| −0.6172 | −0.2230 | 0.6563 |
| −0.5018 | −0.4230 | 0.6563 |
| −0.1155 | −0.6461 | 0.6563 |

TABLE 1f-continued

61 lenslets
density of lenslets 0.8414
radius of lenslets 0.0598

| x | y | distance to center |
|---|---|---|
| 0.1155 | −0.6461 | 0.6563 |
| 0.5018 | −0.4230 | 0.6563 |
| 0.6172 | −0.2230 | 0.6563 |
| 0.6770 | 0.0000 | 0.6770 |
| 0.3385 | 0.5863 | 0.6770 |
| −0.3385 | 0.5863 | 0.6770 |
| −0.6770 | 0.0000 | 0.6770 |
| −0.3385 | −0.5863 | 0.6770 |
| 0.3385 | −0.5863 | 0.6770 |
| 0.8770 | 0.1155 | 0.8845 |
| 0.8172 | 0.3385 | 0.8845 |
| 0.7018 | 0.5385 | 0.8845 |
| 0.5385 | 0.7018 | 0.8845 |
| 0.3385 | 0.8172 | 0.8845 |
| 0.1155 | 0.8770 | 0.8845 |
| −0.1155 | 0.8770 | 0.8845 |
| −0.3385 | 0.8172 | 0.8845 |
| −0.5385 | 0.7018 | 0.8845 |
| −0.7018 | 0.5385 | 0.8845 |
| −0.8172 | 0.3385 | 0.8845 |
| −0.8770 | 0.1155 | 0.8845 |
| −0.8770 | −0.1155 | 0.8845 |
| −0.8172 | −0.3385 | 0.8845 |
| −0.7018 | −0.5385 | 0.8845 |
| −0.5385 | −0.7018 | 0.8845 |
| −0.3385 | −0.8172 | 0.8845 |
| −0.1155 | −0.8770 | 0.8845 |
| 0.1155 | −0.8770 | 0.8845 |
| 0.3385 | −0.8172 | 0.8845 |
| 0.5385 | −0.7018 | 0.8845 |
| 0.7018 | −0.5385 | 0.8845 |
| 0.8172 | −0.3385 | 0.8845 |
| 0.8770 | −0.1155 | 0.8845 |

TABLE 1g

90 lenslets
density of lenslets 0.8388
radius of lenslets 0.0649

| x | y | distance to center |
|---|---|---|
| −0.0006 | 0.0024 | 0.0025 |
| 0.0865 | −0.1662 | 0.1873 |
| −0.1033 | −0.1570 | 0.1880 |
| 0.1889 | −0.0057 | 0.1889 |
| −0.1900 | 0.0116 | 0.1904 |
| 0.0998 | 0.1633 | 0.1914 |
| −0.0897 | 0.1725 | 0.1944 |
| 0.0206 | −0.3441 | 0.3447 |
| 0.3093 | −0.1522 | 0.3447 |
| −0.2906 | −0.1864 | 0.3453 |
| 0.2869 | 0.1939 | 0.3463 |
| −0.3075 | 0.1608 | 0.3470 |
| 0.2076 | −0.3122 | 0.3749 |
| −0.1688 | −0.3350 | 0.3751 |
| 0.3758 | 0.0264 | 0.3767 |
| −0.3774 | −0.0178 | 0.3778 |
| 0.1617 | 0.3426 | 0.3788 |
| −0.2057 | 0.3225 | 0.3825 |
| −0.0246 | 0.3819 | 0.3827 |
| 0.3912 | −0.3596 | 0.5314 |
| −0.5084 | −0.1549 | 0.5315 |
| −0.4216 | −0.3235 | 0.5315 |
| −0.1181 | −0.5182 | 0.5315 |
| 0.0713 | −0.5268 | 0.5316 |
| 0.5056 | 0.1646 | 0.5317 |
| 0.4930 | −0.1996 | 0.5318 |
| 0.4168 | 0.3321 | 0.5329 |
| −0.4925 | 0.2101 | 0.5355 |
| −0.3895 | 0.3693 | 0.5367 |
| 0.1115 | 0.5254 | 0.5371 |

TABLE 1g-continued

90 lenslets
density of lenslets 0.8388
radius of lenslets 0.0649

| x | y | distance to center |
|---|---|---|
| 0.2583 | −0.4949 | 0.5583 |
| −0.3016 | −0.4704 | 0.5588 |
| 0.5592 | −0.0219 | 0.5596 |
| −0.5601 | 0.0329 | 0.5611 |
| 0.2950 | 0.4775 | 0.5613 |
| −0.2532 | 0.5061 | 0.5659 |
| −0.0736 | 0.5669 | 0.5716 |
| 0.5946 | 0.3981 | 0.7155 |
| −0.5983 | −0.3924 | 0.7155 |
| 0.0426 | −0.7143 | 0.7155 |
| 0.6408 | −0.3184 | 0.7155 |
| −0.6309 | 0.3398 | 0.7166 |
| −0.6985 | 0.1626 | 0.7172 |
| 0.4728 | 0.5435 | 0.7203 |
| 0.5390 | −0.4784 | 0.7207 |
| −0.6851 | −0.2238 | 0.7208 |
| −0.4783 | −0.5392 | 0.7208 |
| −0.1468 | −0.7057 | 0.7208 |
| 0.2297 | −0.6832 | 0.7208 |
| 0.7070 | −0.1406 | 0.7209 |
| 0.6834 | 0.2306 | 0.7212 |
| 0.1364 | 0.7134 | 0.7264 |
| −0.2143 | 0.6940 | 0.7264 |
| −0.5279 | 0.4990 | 0.7264 |
| 0.4061 | −0.6137 | 0.7359 |
| −0.7349 | −0.0408 | 0.7360 |
| −0.3303 | −0.6578 | 0.7361 |
| 0.7354 | 0.0482 | 0.7370 |
| 0.3199 | 0.6655 | 0.7384 |
| −0.3939 | 0.6332 | 0.7457 |
| −0.0429 | 0.7752 | 0.7764 |
| 0.2902 | 0.8573 | 0.9051 |
| 0.8917 | 0.1556 | 0.9052 |
| 0.8397 | 0.3379 | 0.9052 |
| 0.7509 | 0.5055 | 0.9052 |
| 0.6291 | 0.6508 | 0.9052 |
| 0.4797 | 0.7676 | 0.9052 |
| 0.1003 | 0.8996 | 0.9052 |
| −0.1989 | 0.8831 | 0.9052 |
| −0.3785 | 0.8222 | 0.9052 |
| −0.5703 | 0.7030 | 0.9052 |
| −0.7042 | 0.5687 | 0.9052 |
| −0.8073 | 0.4095 | 0.9052 |
| −0.8749 | 0.2323 | 0.9052 |
| −0.9041 | 0.0449 | 0.9052 |
| −0.8935 | −0.1447 | 0.9052 |
| −0.8438 | −0.3277 | 0.9052 |
| −0.7570 | −0.4963 | 0.9052 |
| −0.6370 | −0.6431 | 0.9052 |
| −0.4890 | −0.7617 | 0.9052 |
| −0.3189 | −0.8471 | 0.9052 |
| −0.1354 | −0.8950 | 0.9052 |
| 0.0540 | −0.9036 | 0.9052 |
| 0.2411 | −0.8725 | 0.9052 |
| 0.4176 | −0.8031 | 0.9052 |
| 0.5758 | −0.6985 | 0.9052 |
| 0.7087 | −0.5632 | 0.9052 |
| 0.8104 | −0.4031 | 0.9052 |
| 0.8767 | −0.2254 | 0.9052 |
| 0.9044 | −0.0378 | 0.9052 |

TABLE 1h

91 lenslets
density of lenslets 0.8414
radius of lenslets 0.0598

| x | y | distance to center |
|---|---|---|
| 0.0000 | 0.0000 | 0.0000 |
| 0.1893 | 0.0000 | 0.1893 |

TABLE 1h-continued 91 lenslets
density of lenslets 0.8414
radius of lenslets 0.0598

| x | y | distance to center |
|---|---|---|
| 0.0946 | 0.1639 | 0.1893 |
| −0.0946 | 0.1639 | 0.1893 |
| −0.1893 | 0.0000 | 0.1893 |
| −0.0946 | −0.1639 | 0.1893 |
| 0.0946 | −0.1639 | 0.1893 |
| 0.3159 | 0.1407 | 0.3458 |
| 0.0361 | 0.3439 | 0.3458 |
| −0.2798 | 0.2033 | 0.3458 |
| −0.3159 | −0.1407 | 0.3458 |
| −0.0361 | −0.3439 | 0.3458 |
| 0.2798 | −0.2033 | 0.3458 |
| 0.2213 | 0.3046 | 0.3765 |
| −0.1531 | 0.3439 | 0.3765 |
| −0.3744 | 0.0394 | 0.3765 |
| −0.2213 | −0.3046 | 0.3765 |
| 0.1531 | −0.3439 | 0.3765 |
| 0.3744 | −0.0394 | 0.3765 |
| 0.4888 | 0.2176 | 0.5351 |
| 0.0559 | 0.5322 | 0.5351 |
| −0.4329 | 0.3145 | 0.5351 |
| −0.4888 | −0.2176 | 0.5351 |
| −0.0559 | −0.5322 | 0.5351 |
| 0.4329 | −0.3145 | 0.5351 |
| 0.5473 | 0.0376 | 0.5486 |
| 0.3942 | 0.3816 | 0.5486 |
| 0.2411 | 0.4928 | 0.5486 |
| −0.1333 | 0.5322 | 0.5486 |
| −0.3062 | 0.4552 | 0.5486 |
| −0.5275 | 0.1506 | 0.5486 |
| −0.5473 | −0.0376 | 0.5486 |
| −0.3942 | −0.3816 | 0.5486 |
| −0.2411 | −0.4928 | 0.5486 |
| 0.1333 | −0.5322 | 0.5486 |
| 0.3062 | −0.4552 | 0.5486 |
| 0.5275 | −0.1506 | 0.5486 |
| 0.5793 | 0.4209 | 0.7161 |
| −0.0749 | 0.7122 | 0.7161 |
| −0.6542 | 0.2913 | 0.7161 |
| −0.5793 | −0.4209 | 0.7161 |
| 0.0749 | −0.7122 | 0.7161 |
| 0.6542 | −0.2913 | 0.7161 |
| 0.6740 | 0.2570 | 0.7213 |
| 0.4527 | 0.5616 | 0.7213 |
| 0.1144 | 0.7122 | 0.7213 |
| −0.2600 | 0.6728 | 0.7213 |
| −0.5595 | 0.4552 | 0.7213 |
| −0.7127 | 0.1113 | 0.7213 |
| −0.6740 | −0.2570 | 0.7213 |
| −0.4527 | −0.5616 | 0.7213 |
| −0.1144 | −0.7122 | 0.7213 |
| 0.2600 | −0.6728 | 0.7213 |
| 0.5595 | −0.4552 | 0.7213 |
| 0.7127 | −0.1113 | 0.7213 |
| 0.7325 | 0.0770 | 0.7365 |
| 0.2996 | 0.6728 | 0.7365 |
| −0.4329 | 0.5958 | 0.7365 |
| −0.7325 | −0.0770 | 0.7365 |
| −0.2996 | −0.6728 | 0.7365 |
| 0.4329 | −0.5958 | 0.7365 |
| 0.9054 | 0.0000 | 0.9054 |
| 0.8856 | 0.1882 | 0.9054 |
| 0.8271 | 0.3682 | 0.9054 |
| 0.7325 | 0.5322 | 0.9054 |
| 0.6058 | 0.6728 | 0.9054 |
| 0.4527 | 0.7841 | 0.9054 |
| 0.2798 | 0.8611 | 0.9054 |
| 0.0946 | 0.9004 | 0.9054 |
| −0.0946 | 0.9004 | 0.9054 |
| −0.2798 | 0.8611 | 0.9054 |
| −0.4527 | 0.7841 | 0.9054 |
| −0.6058 | 0.6728 | 0.9054 |
| −0.7325 | 0.5322 | 0.9054 |
| −0.8271 | 0.3682 | 0.9054 |
| −0.8856 | 0.1882 | 0.9054 |
| −0.9054 | 0.0000 | 0.9054 |
| −0.8856 | −0.1882 | 0.9054 |
| −0.8271 | −0.3682 | 0.9054 |
| −0.7325 | −0.5322 | 0.9054 |
| −0.6058 | −0.6728 | 0.9054 |
| −0.4527 | −0.7841 | 0.9054 |
| −0.2798 | −0.8611 | 0.9054 |
| −0.0946 | −0.9004 | 0.9054 |
| 0.0946 | −0.9004 | 0.9054 |
| 0.2798 | −0.8611 | 0.9054 |
| 0.4527 | −0.7841 | 0.9054 |
| 0.6058 | −0.6728 | 0.9054 |
| 0.7325 | −0.5322 | 0.9054 |
| 0.8271 | −0.3682 | 0.9054 |
| 0.8856 | −0.1882 | 0.9054 |

TABLE 1i 121 lenslets
density of lenslets 0.8388
radius of lenslets 0.0649

| x | y | distance to center |
|---|---|---|
| 0.0000 | 0.0000 | 0.0000 |
| 0.1543 | 0.0582 | 0.1650 |
| 0.0268 | 0.1628 | 0.1650 |
| −0.1276 | 0.1046 | 0.1650 |
| −0.1543 | −0.0582 | 0.1650 |
| −0.0268 | −0.1628 | 0.1650 |
| 0.1276 | −0.1046 | 0.1650 |
| 0.1811 | 0.2210 | 0.2857 |
| −0.1008 | 0.2673 | 0.2857 |
| −0.2819 | 0.0463 | 0.2857 |
| −0.1811 | −0.2210 | 0.2857 |
| 0.1008 | −0.2673 | 0.2857 |
| 0.2819 | −0.0463 | 0.2857 |
| 0.3087 | 0.1164 | 0.3299 |
| 0.0535 | 0.3255 | 0.3299 |
| −0.2552 | 0.2091 | 0.3299 |
| −0.3087 | −0.1164 | 0.3299 |
| −0.0535 | −0.3255 | 0.3299 |
| 0.2552 | −0.2091 | 0.3299 |
| 0.4363 | 0.0119 | 0.4364 |
| 0.3354 | 0.2792 | 0.4364 |
| 0.2078 | 0.3837 | 0.4364 |
| −0.0741 | 0.4301 | 0.4364 |
| −0.2284 | 0.3719 | 0.4364 |
| −0.4095 | 0.1509 | 0.4364 |
| −0.4363 | −0.0119 | 0.4364 |
| −0.3354 | −0.2792 | 0.4364 |
| −0.2078 | −0.3837 | 0.4364 |
| 0.0741 | −0.4301 | 0.4364 |
| 0.2284 | −0.3719 | 0.4364 |
| 0.4095 | −0.1509 | 0.4364 |
| 0.4630 | 0.1746 | 0.4949 |
| 0.0803 | 0.4883 | 0.4949 |
| −0.3827 | 0.3137 | 0.4949 |
| −0.4630 | −0.1746 | 0.4949 |
| −0.0803 | −0.4883 | 0.4949 |
| 0.3827 | −0.3137 | 0.4949 |
| 0.5912 | 0.0684 | 0.5952 |
| 0.2364 | 0.5462 | 0.5952 |
| −0.3548 | 0.4778 | 0.5952 |
| −0.5912 | −0.0684 | 0.5952 |
| −0.2364 | −0.5462 | 0.5952 |
| 0.3548 | −0.4778 | 0.5952 |
| 0.4855 | 0.3476 | 0.5971 |
| −0.0582 | 0.5943 | 0.5971 |
| −0.5438 | 0.2467 | 0.5971 |
| −0.4855 | −0.3476 | 0.5971 |

TABLE 1i-continued 121 lenslets
density of lenslets 0.8388
radius of lenslets 0.0649

| x | y | distance to center |
|---|---|---|
| 0.0582 | −0.5943 | 0.5971 |
| 0.5438 | −0.2467 | 0.5971 |
| 0.3876 | 0.4803 | 0.6172 |
| −0.2222 | 0.5758 | 0.6172 |
| 0.3087 | 0.1164 | 0.3299 |
| 0.0535 | 0.3255 | 0.3299 |
| −0.2552 | 0.2091 | 0.3299 |
| −0.3087 | −0.1164 | 0.3299 |
| −0.0535 | −0.3255 | 0.3299 |
| 0.2552 | −0.2091 | 0.3299 |
| 0.4363 | 0.0119 | 0.4364 |
| 0.3354 | 0.2792 | 0.4364 |
| 0.2078 | 0.3837 | 0.4364 |
| −0.0741 | 0.4301 | 0.4364 |
| −0.2284 | 0.3719 | 0.4364 |
| −0.4095 | 0.1509 | 0.4364 |
| −0.4363 | −0.0119 | 0.4364 |
| −0.3354 | −0.2792 | 0.4364 |
| −0.2078 | −0.3837 | 0.4364 |
| 0.0741 | −0.4301 | 0.4364 |
| 0.2284 | −0.3719 | 0.4364 |
| 0.4095 | −0.1509 | 0.4364 |
| 0.4630 | 0.1746 | 0.4949 |
| 0.0803 | 0.4883 | 0.4949 |
| −0.3827 | 0.3137 | 0.4949 |
| −0.4630 | −0.1746 | 0.4949 |
| −0.0803 | −0.4883 | 0.4949 |
| 0.3827 | −0.3137 | 0.4949 |
| 0.5912 | 0.0684 | 0.5952 |
| 0.2364 | 0.5462 | 0.5952 |
| −0.3548 | 0.4778 | 0.5952 |
| −0.5912 | −0.0684 | 0.5952 |
| −0.2364 | −0.5462 | 0.5952 |
| 0.3548 | −0.4778 | 0.5952 |
| 0.4855 | 0.3476 | 0.5971 |
| −0.0582 | 0.5943 | 0.5971 |
| −0.5438 | 0.2467 | 0.5971 |
| −0.4855 | −0.3476 | 0.5971 |
| 0.0582 | −0.5943 | 0.5971 |
| 0.5438 | −0.2467 | 0.5971 |
| 0.3876 | 0.4803 | 0.6172 |
| −0.2222 | 0.5758 | 0.6172 |
| −0.6098 | 0.0955 | 0.6172 |
| −0.3876 | −0.4803 | 0.6172 |
| 0.2222 | −0.5758 | 0.6172 |
| 0.6098 | −0.0955 | 0.6172 |
| 0.6180 | 0.2312 | 0.6598 |
| 0.1088 | 0.6508 | 0.6598 |
| −0.5092 | 0.4196 | 0.6598 |
| −0.6180 | −0.2312 | 0.6598 |
| −0.1088 | −0.6508 | 0.6598 |
| 0.5092 | −0.4196 | 0.6598 |
| 0.6438 | 0.3941 | 0.7548 |
| −0.0194 | 0.7546 | 0.7548 |
| −0.6632 | 0.3605 | 0.7548 |
| −0.6438 | −0.3941 | 0.7548 |
| 0.0194 | −0.7546 | 0.7548 |
| 0.6632 | −0.3605 | 0.7548 |
| 0.7498 | 0.1138 | 0.7584 |
| 0.2763 | 0.7063 | 0.7584 |
| −0.4735 | 0.5924 | 0.7584 |
| −0.7498 | −0.1138 | 0.7584 |
| −0.2763 | −0.7063 | 0.7584 |
| 0.4735 | −0.5924 | 0.7584 |
| 0.5498 | 0.5296 | 0.7634 |
| −0.1838 | 0.7409 | 0.7634 |
| −0.7335 | 0.2113 | 0.7634 |
| −0.5498 | −0.5296 | 0.7634 |
| 0.1838 | −0.7409 | 0.7634 |
| 0.7335 | −0.2113 | 0.7634 |
| 0.4275 | 0.6404 | 0.7700 |
| −0.3408 | 0.6904 | 0.7700 |
| −0.7683 | 0.0501 | 0.7700 |
| −0.4275 | −0.6404 | 0.7700 |

TABLE 1i-continued 121 lenslets
density of lenslets 0.8388
radius of lenslets 0.0649

| x | y | distance to center |
|---|---|---|
| 0.3408 | −0.6904 | 0.7700 |
| 0.7683 | −0.0501 | 0.7700 |
| 0.7720 | 0.2903 | 0.8247 |
| 0.1346 | 0.8137 | 0.8247 |
| −0.6374 | 0.5234 | 0.8247 |
| −0.7720 | −0.2903 | 0.8247 |
| −0.1346 | −0.8137 | 0.8247 |
| 0.6374 | −0.5234 | 0.8247 |
| 0.5814 | 0.7089 | 0.9169 |
| −0.3233 | 0.8580 | 0.9169 |
| −0.9047 | 0.1491 | 0.9169 |
| −0.5814 | −0.7089 | 0.9169 |
| 0.3233 | −0.8580 | 0.9169 |
| 0.9047 | −0.1491 | 0.9169 |
| 0.9173 | 0.0208 | 0.9175 |
| 0.8987 | 0.1847 | 0.9175 |
| 0.7978 | 0.4532 | 0.9175 |
| 0.7038 | 0.5887 | 0.9175 |
| 0.4406 | 0.8048 | 0.9175 |
| 0.2894 | 0.8707 | 0.9175 |
| 0.0064 | 0.9175 | 0.9175 |
| −0.1579 | 0.9038 | 0.9175 |
| −0.4767 | 0.7840 | 0.9175 |
| −0.6093 | 0.6860 | 0.9175 |
| −0.7914 | 0.4643 | 0.9175 |
| −0.8617 | 0.3151 | 0.9175 |
| −0.9173 | −0.0208 | 0.9175 |
| −0.8987 | −0.1847 | 0.9175 |
| −0.7978 | −0.4532 | 0.9175 |
| −0.7038 | −0.5887 | 0.9175 |
| −0.4406 | −0.8048 | 0.9175 |
| −0.2894 | −0.8707 | 0.9175 |
| −0.0064 | −0.9175 | 0.9175 |
| 0.1579 | −0.9038 | 0.9175 |
| 0.4767 | −0.7840 | 0.9175 |
| 0.6093 | −0.6860 | 0.9175 |
| 0.7914 | −0.4643 | 0.9175 |
| 0.8617 | −0.3151 | 0.9175 |

TABLE 1j 151 lenslets
density of lenslets 0.8414
radius of lenslets 0.0598

| x | y | distance to center |
|---|---|---|
| 0.0000 | 0.0000 | 0.0000 |
| 0.1171 | 0.0912 | 0.1484 |
| −0.0204 | 0.1470 | 0.1484 |
| −0.1375 | 0.0558 | 0.1484 |
| −0.1171 | −0.0912 | 0.1484 |
| 0.0204 | −0.1470 | 0.1484 |
| 0.1375 | −0.0558 | 0.1484 |
| 0.2546 | 0.0354 | 0.2571 |
| 0.0967 | 0.2382 | 0.2571 |
| −0.1579 | 0.2028 | 0.2571 |
| −0.2546 | −0.0354 | 0.2571 |
| −0.0967 | −0.2382 | 0.2571 |
| 0.1579 | −0.2028 | 0.2571 |
| 0.2342 | 0.1824 | 0.2968 |
| −0.0408 | 0.2940 | 0.2968 |
| −0.2750 | 0.1116 | 0.2968 |
| −0.2342 | −0.1824 | 0.2968 |
| 0.0408 | −0.2940 | 0.2968 |
| 0.2750 | −0.1116 | 0.2968 |
| 0.3717 | 0.1265 | 0.3927 |
| 0.2138 | 0.3294 | 0.3927 |
| 0.0763 | 0.3852 | 0.3927 |
| −0.1783 | 0.3498 | 0.3927 |
| −0.2954 | 0.2586 | 0.3927 |

TABLE 1j-continued 151 lenslets
density of lenslets 0.8414
radius of lenslets 0.0598

| x | y | distance to center |
|---|---|---|
| −0.3921 | 0.0205 | 0.3927 |
| −0.3717 | −0.1265 | 0.3927 |
| −0.2138 | −0.3294 | 0.3927 |
| −0.0763 | −0.3852 | 0.3927 |
| 0.1783 | −0.3498 | 0.3927 |
| 0.2954 | −0.2586 | 0.3927 |
| 0.3921 | −0.0205 | 0.3927 |
| 0.3513 | 0.2735 | 0.4452 |
| −0.0612 | 0.4410 | 0.4452 |
| −0.4125 | 0.1675 | 0.4452 |
| −0.3513 | −0.2735 | 0.4452 |
| 0.0612 | −0.4410 | 0.4452 |
| 0.4125 | −0.1675 | 0.4452 |
| 0.5092 | 0.0707 | 0.5141 |
| 0.1934 | 0.4764 | 0.5141 |
| −0.3159 | 0.4056 | 0.5141 |
| −0.5092 | −0.0707 | 0.5141 |
| −0.1934 | −0.4764 | 0.5141 |
| 0.3159 | −0.4056 | 0.5141 |
| 0.4888 | 0.2177 | 0.5351 |
| 0.3309 | 0.4205 | 0.5351 |
| 0.0559 | 0.5322 | 0.5351 |
| −0.1988 | 0.4968 | 0.5351 |
| −0.4330 | 0.3145 | 0.5351 |
| −0.5296 | 0.0763 | 0.5351 |
| −0.4888 | −0.2177 | 0.5351 |
| −0.3309 | −0.4205 | 0.5351 |
| 0.2342 | 0.1824 | 0.2968 |
| −0.0408 | 0.2940 | 0.2968 |
| −0.2750 | 0.1116 | 0.2968 |
| −0.2342 | −0.1824 | 0.2968 |
| 0.0408 | −0.2940 | 0.2968 |
| 0.2750 | −0.1116 | 0.2968 |
| 0.3717 | 0.1265 | 0.3927 |
| 0.2138 | 0.3294 | 0.3927 |
| 0.0763 | 0.3852 | 0.3927 |
| −0.1783 | 0.3498 | 0.3927 |
| −0.2954 | 0.2586 | 0.3927 |
| −0.3921 | 0.0205 | 0.3927 |
| −0.3717 | −0.1265 | 0.3927 |
| −0.2138 | −0.3294 | 0.3927 |
| −0.0763 | −0.3852 | 0.3927 |
| 0.1783 | −0.3498 | 0.3927 |
| 0.2954 | −0.2586 | 0.3927 |
| 0.3921 | −0.0205 | 0.3927 |
| 0.3513 | 0.2735 | 0.4452 |
| −0.0612 | 0.4410 | 0.4452 |
| −0.4125 | 0.1675 | 0.4452 |
| −0.3513 | −0.2735 | 0.4452 |
| 0.0612 | −0.4410 | 0.4452 |
| 0.4125 | −0.1675 | 0.4452 |
| 0.5092 | 0.0707 | 0.5141 |
| 0.1934 | 0.4764 | 0.5141 |
| −0.3159 | 0.4056 | 0.5141 |
| −0.5092 | −0.0707 | 0.5141 |
| −0.1934 | −0.4764 | 0.5141 |
| 0.3159 | −0.4056 | 0.5141 |
| 0.4888 | 0.2177 | 0.5351 |
| 0.3309 | 0.4205 | 0.5351 |
| 0.0559 | 0.5322 | 0.5351 |
| −0.1988 | 0.4968 | 0.5351 |
| −0.4330 | 0.3145 | 0.5351 |
| −0.5296 | 0.0763 | 0.5351 |
| −0.4888 | −0.2177 | 0.5351 |
| −0.3309 | −0.4205 | 0.5351 |
| −0.0559 | −0.5322 | 0.5351 |
| 0.1988 | −0.4968 | 0.5351 |
| 0.4330 | −0.3145 | 0.5351 |
| 0.5296 | −0.0763 | 0.5351 |
| 0.4684 | 0.3647 | 0.5936 |
| −0.0817 | 0.5880 | 0.5936 |
| −0.5501 | 0.2233 | 0.5936 |
| −0.4684 | −0.3647 | 0.5936 |
| 0.0817 | −0.5880 | 0.5936 |

TABLE 1j-continued 151 lenslets
density of lenslets 0.8414
radius of lenslets 0.0598

| x | y | distance to center |
|---|---|---|
| 0.5501 | −0.2233 | 0.5936 |
| 0.6467 | 0.0149 | 0.6469 |
| 0.6263 | 0.1619 | 0.6469 |
| 0.3105 | 0.5675 | 0.6469 |
| 0.1729 | 0.6234 | 0.6469 |
| −0.3363 | 0.5526 | 0.6469 |
| −0.4534 | 0.4615 | 0.6469 |
| −0.6467 | −0.0149 | 0.6469 |
| −0.6263 | −0.1619 | 0.6469 |
| −0.3105 | −0.5675 | 0.6469 |
| −0.1729 | −0.6234 | 0.6469 |
| 0.3363 | −0.5526 | 0.6469 |
| 0.4534 | −0.4615 | 0.6469 |
| 0.6059 | 0.3089 | 0.6801 |
| 0.0354 | 0.6792 | 0.6801 |
| −0.5705 | 0.3703 | 0.6801 |
| −0.6059 | −0.3089 | 0.6801 |
| −0.0354 | −0.6792 | 0.6801 |
| 0.5705 | −0.3703 | 0.6801 |
| 0.6701 | −0.1317 | 0.6829 |
| 0.4495 | 0.5154 | 0.6839 |
| −0.2216 | 0.6470 | 0.6839 |
| −0.6711 | 0.1315 | 0.6839 |
| −0.4495 | −0.5154 | 0.6839 |
| 0.2217 | −0.6470 | 0.6839 |
| 0.5855 | 0.4559 | 0.7420 |
| −0.1021 | 0.7350 | 0.7420 |
| −0.6876 | 0.2791 | 0.7420 |
| −0.5855 | −0.4559 | 0.7420 |
| 0.1021 | −0.7350 | 0.7420 |
| 0.6876 | −0.2791 | 0.7420 |
| 0.7434 | 0.2531 | 0.7853 |
| 0.1525 | 0.7704 | 0.7853 |
| −0.5909 | 0.5173 | 0.7853 |
| −0.7434 | −0.2531 | 0.7853 |
| −0.1525 | −0.7704 | 0.7853 |
| 0.5909 | −0.5173 | 0.7853 |
| 0.4249 | 0.6621 | 0.7867 |
| −0.3609 | 0.6990 | 0.7867 |
| −0.7858 | 0.0369 | 0.7867 |
| −0.4249 | −0.6621 | 0.7867 |
| 0.3609 | −0.6990 | 0.7867 |
| 0.7858 | −0.0369 | 0.7867 |
| 0.7878 | 0.1115 | 0.7957 |
| 0.2974 | 0.7380 | 0.7957 |
| −0.4905 | 0.6266 | 0.7957 |
| −0.7878 | −0.1115 | 0.7957 |
| −0.2974 | −0.7380 | 0.7957 |
| 0.4905 | −0.6266 | 0.7957 |
| 0.5854 | 0.6043 | 0.8413 |
| −0.2307 | 0.8091 | 0.8413 |
| −0.8160 | 0.2048 | 0.8413 |
| −0.5854 | −0.6043 | 0.8413 |
| 0.2307 | −0.8091 | 0.8413 |
| 0.8160 | −0.2048 | 0.8413 |
| 0.0000 | 0.8427 | 0.8427 |
| 0.7298 | 0.4214 | 0.8427 |
| −0.7298 | 0.4214 | 0.8427 |
| 0.0000 | −0.8427 | 0.8427 |
| −0.7298 | −0.4214 | 0.8427 |
| 0.7298 | −0.4214 | 0.8427 |
| −0.4182 | −0.8249 | 0.9248 |
| −0.9240 | −0.0512 | 0.9254 |
| −0.5055 | 0.7753 | 0.9255 |
| 0.5063 | −0.7748 | 0.9255 |
| 0.4192 | 0.8254 | 0.9257 |
| 0.9245 | 0.0493 | 0.9258 |
| 0.9027 | 0.2054 | 0.9258 |
| 0.8583 | 0.3470 | 0.9258 |
| 0.7297 | 0.5698 | 0.9258 |
| 0.5462 | 0.7475 | 0.9258 |
| 0.2734 | 0.8845 | 0.9258 |
| 0.1286 | 0.9168 | 0.9258 |
| −0.1286 | 0.9168 | 0.9258 |

TABLE 1j-continued 151 lenslets
density of lenslets 0.8414
radius of lenslets 0.0598

| x | y | distance to center |
|---|---|---|
| −0.3742 | 0.8468 | 0.9258 |
| −0.6293 | 0.6790 | 0.9258 |
| −0.7297 | 0.5698 | 0.9258 |
| −0.8583 | 0.3470 | 0.9258 |
| −0.9205 | 0.0993 | 0.9258 |
| −0.9027 | −0.2054 | 0.9258 |
| −0.8583 | −0.3470 | 0.9258 |
| −0.7297 | −0.5698 | 0.9258 |
| −0.5462 | −0.7475 | 0.9258 |
| −0.2734 | −0.8845 | 0.9258 |
| −0.1286 | −0.9168 | 0.9258 |
| 0.1286 | −0.9168 | 0.9258 |
| 0.3742 | −0.8468 | 0.9258 |
| 0.6293 | −0.6790 | 0.9258 |
| 0.7297 | −0.5698 | 0.9258 |
| 0.8583 | −0.3470 | 0.9258 |
| 0.9205 | −0.0993 | 0.9258 |

TABLE 1l 235 lenslets
density of lenslets 0.8414
radius of lenslets 0.0598

| x | y | distance to center |
|---|---|---|
| 0.0000 | 0.0000 | 0.0000 |
| 0.1197 | 0.0000 | 0.1197 |
| 0.0598 | 0.1036 | 0.1197 |
| −0.0598 | 0.1036 | 0.1197 |
| −0.1197 | 0.0000 | 0.1197 |
| −0.0598 | −0.1036 | 0.1197 |
| 0.0598 | −0.1036 | 0.1197 |
| 0.0000 | 0.2073 | 0.2073 |
| 0.1795 | 0.1036 | 0.2073 |
| −0.1795 | 0.1036 | 0.2073 |
| 0.0000 | −0.2073 | 0.2073 |
| −0.1795 | −0.1036 | 0.2073 |
| 0.1795 | −0.1036 | 0.2073 |
| 0.2393 | 0.0000 | 0.2393 |
| 0.1197 | 0.2073 | 0.2393 |
| −0.1197 | 0.2073 | 0.2393 |
| −0.2393 | 0.0000 | 0.2393 |
| −0.1197 | −0.2073 | 0.2393 |
| 0.1197 | −0.2073 | 0.2393 |
| 0.2992 | 0.1036 | 0.3166 |
| 0.2393 | 0.2073 | 0.3166 |
| 0.0598 | 0.3109 | 0.3166 |
| −0.0598 | 0.3109 | 0.3166 |
| −0.2393 | 0.2073 | 0.3166 |
| −0.2992 | 0.1036 | 0.3166 |
| −0.2992 | −0.1036 | 0.3166 |
| −0.2393 | −0.2073 | 0.3166 |
| −0.0598 | −0.3109 | 0.3166 |
| 0.0598 | −0.3109 | 0.3166 |
| 0.2393 | −0.2073 | 0.3166 |
| 0.2992 | −0.1036 | 0.3166 |
| 0.3590 | 0.0000 | 0.3590 |
| 0.1795 | 0.3109 | 0.3590 |
| −0.1795 | 0.3109 | 0.3590 |
| −0.3590 | 0.0000 | 0.3590 |
| −0.1795 | −0.3109 | 0.3590 |
| 0.1795 | −0.3109 | 0.3590 |
| 0.0000 | 0.4146 | 0.4146 |
| 0.3590 | 0.2073 | 0.4146 |
| −0.3590 | 0.2073 | 0.4146 |
| 0.0000 | −0.4146 | 0.4146 |
| −0.3590 | −0.2073 | 0.4146 |
| 0.3590 | −0.2073 | 0.4146 |
| 0.4188 | 0.1036 | 0.4315 |
| 0.2992 | 0.3109 | 0.4315 |

TABLE 1l-continued 235 lenslets
density of lenslets 0.8414
radius of lenslets 0.0598

| x | y | distance to center |
|---|---|---|
| 0.1197 | 0.4146 | 0.4315 |
| −0.1197 | 0.4146 | 0.4315 |
| −0.2992 | 0.3109 | 0.4315 |
| −0.4188 | 0.1036 | 0.4315 |
| −0.4188 | −0.1036 | 0.4315 |
| −0.2992 | −0.3109 | 0.4315 |
| −0.1197 | −0.4146 | 0.4315 |
| 0.1197 | −0.4146 | 0.4315 |
| 0.2992 | −0.3109 | 0.4315 |
| 0.4188 | −0.1036 | 0.4315 |
| 0.4787 | 0.0000 | 0.4787 |
| 0.2393 | 0.4146 | 0.4787 |
| −0.2393 | 0.4146 | 0.4787 |
| −0.4787 | 0.0000 | 0.4787 |
| −0.2393 | −0.4146 | 0.4787 |
| 0.2393 | −0.4146 | 0.4787 |
| 0.4787 | 0.2073 | 0.5216 |
| 0.4188 | 0.3109 | 0.5216 |
| 0.0598 | 0.5182 | 0.5216 |
| −0.0598 | 0.5182 | 0.5216 |
| −0.4188 | 0.3109 | 0.5216 |
| −0.4787 | 0.2073 | 0.5216 |
| −0.4787 | −0.2073 | 0.5216 |
| −0.4188 | −0.3109 | 0.5216 |
| −0.0598 | −0.5182 | 0.5216 |
| 0.0598 | −0.5182 | 0.5216 |
| 0.4188 | −0.3109 | 0.5216 |
| 0.4787 | −0.2073 | 0.5216 |
| 0.5385 | 0.1036 | 0.5484 |
| 0.3590 | 0.4146 | 0.5484 |
| 0.1795 | 0.5182 | 0.5484 |
| −0.1795 | 0.5182 | 0.5484 |
| −0.3590 | 0.4146 | 0.5484 |
| −0.5385 | 0.1036 | 0.5484 |
| −0.5385 | −0.1036 | 0.5484 |
| −0.3590 | −0.4146 | 0.5484 |
| −0.1795 | −0.5182 | 0.5484 |
| 0.1795 | −0.5182 | 0.5484 |
| 0.3590 | −0.4146 | 0.5484 |
| 0.5385 | −0.1036 | 0.5484 |
| 0.5984 | 0.0000 | 0.5984 |
| 0.2992 | 0.5182 | 0.5984 |
| −0.2992 | 0.5182 | 0.5984 |
| −0.5984 | 0.0000 | 0.5984 |
| −0.2992 | −0.5182 | 0.5984 |
| 0.2992 | −0.5182 | 0.5984 |
| 0.0000 | 0.6218 | 0.6218 |
| 0.5385 | 0.3109 | 0.6218 |
| −0.5385 | 0.3109 | 0.6218 |
| 0.0000 | −0.6218 | 0.6218 |
| −0.5385 | −0.3109 | 0.6218 |
| 0.5385 | −0.3109 | 0.6218 |
| 0.5984 | 0.2073 | 0.6332 |
| 0.4787 | 0.4146 | 0.6332 |
| 0.1197 | 0.6218 | 0.6332 |
| −0.1197 | 0.6218 | 0.6332 |
| −0.4787 | 0.4146 | 0.6332 |
| −0.5984 | 0.2073 | 0.6332 |
| −0.5984 | −0.2073 | 0.6332 |
| −0.4787 | −0.4146 | 0.6332 |
| −0.1197 | −0.6218 | 0.6332 |
| 0.1197 | −0.6218 | 0.6332 |
| 0.4787 | −0.4146 | 0.6332 |
| 0.5984 | −0.2073 | 0.6332 |
| 0.6582 | 0.1036 | 0.6663 |
| 0.4188 | 0.5182 | 0.6663 |
| 0.2393 | 0.6218 | 0.6663 |
| −0.2393 | 0.6218 | 0.6663 |
| −0.4188 | 0.5182 | 0.6663 |
| −0.6582 | 0.1036 | 0.6663 |
| −0.6582 | −0.1036 | 0.6663 |
| −0.4188 | −0.5182 | 0.6663 |
| −0.2393 | −0.6218 | 0.6663 |
| 0.2393 | −0.6218 | 0.6663 |

TABLE 1l-continued 235 lenslets
density of lenslets 0.8414
radius of lenslets 0.0598

| x | y | distance to center |
|---|---|---|
| 0.4188 | −0.5182 | 0.6663 |
| 0.6582 | −0.1036 | 0.6663 |
| 0.7180 | 0.0000 | 0.7180 |
| 0.3590 | 0.6218 | 0.7180 |
| −0.3590 | 0.6218 | 0.7180 |
| −0.7180 | 0.0000 | 0.7180 |
| −0.3590 | −0.6218 | 0.7180 |
| 0.3590 | −0.6218 | 0.7180 |
| 0.6582 | 0.3109 | 0.7279 |
| 0.5984 | 0.4146 | 0.7279 |
| 0.0598 | 0.7255 | 0.7279 |
| −0.0598 | 0.7255 | 0.7279 |
| −0.5984 | 0.4146 | 0.7279 |
| −0.6582 | 0.3109 | 0.7279 |
| −0.6582 | −0.3109 | 0.7279 |
| −0.5984 | −0.4146 | 0.7279 |
| −0.0598 | −0.7255 | 0.7279 |
| 0.0598 | −0.7255 | 0.7279 |
| 0.5984 | −0.4146 | 0.7279 |
| 0.6582 | −0.3109 | 0.7279 |
| 0.7185 | 0.2075 | 0.7478 |
| 0.5389 | 0.5184 | 0.7478 |
| 0.1795 | 0.7260 | 0.7478 |
| −0.1795 | 0.7260 | 0.7478 |
| −0.5389 | 0.5184 | 0.7478 |
| −0.7185 | 0.2075 | 0.7478 |
| −0.7185 | −0.2075 | 0.7478 |
| −0.5389 | −0.5184 | 0.7478 |
| −0.1795 | −0.7260 | 0.7478 |
| 0.1795 | −0.7260 | 0.7478 |
| 0.5389 | −0.5184 | 0.7478 |
| 0.7185 | −0.2075 | 0.7478 |
| 0.7779 | 0.1036 | 0.7847 |
| 0.4787 | 0.6218 | 0.7847 |
| 0.2992 | 0.7255 | 0.7847 |
| −0.2992 | 0.7255 | 0.7847 |
| −0.4787 | 0.6218 | 0.7847 |
| −0.7779 | 0.1036 | 0.7847 |
| −0.7779 | −0.1036 | 0.7847 |
| −0.4787 | −0.6218 | 0.7847 |
| −0.2992 | −0.7255 | 0.7847 |
| 0.2992 | −0.7255 | 0.7847 |
| 0.4787 | −0.6218 | 0.7847 |
| 0.7779 | −0.1036 | 0.7847 |
| 0.8377 | 0.0000 | 0.8377 |
| 0.4188 | 0.7255 | 0.8377 |
| −0.4188 | 0.7255 | 0.8377 |
| −0.8377 | 0.0000 | 0.8377 |
| −0.4188 | −0.7255 | 0.8377 |
| 0.4188 | −0.7255 | 0.8377 |
| 0.7779 | 0.3114 | 0.8379 |
| 0.6586 | 0.5179 | 0.8379 |
| 0.1192 | 0.8293 | 0.8379 |
| −0.1192 | 0.8293 | 0.8379 |
| −0.6586 | 0.5179 | 0.8379 |
| −0.7779 | 0.3114 | 0.8379 |
| −0.7779 | −0.3114 | 0.8379 |
| −0.6586 | −0.5179 | 0.8379 |
| −0.1192 | −0.8293 | 0.8379 |
| 0.1192 | −0.8293 | 0.8379 |
| 0.6586 | −0.5179 | 0.8379 |
| 0.7779 | −0.3114 | 0.8379 |
| 0.0000 | 0.8395 | 0.8395 |
| 0.7270 | 0.4197 | 0.8395 |
| −0.7270 | 0.4197 | 0.8395 |
| 0.0000 | −0.8395 | 0.8395 |
| −0.7270 | −0.4197 | 0.8395 |
| 0.7270 | −0.4197 | 0.8395 |
| 0.8780 | 0.1691 | 0.8942 |
| 0.5855 | 0.6759 | 0.8942 |
| 0.2926 | 0.8450 | 0.8942 |
| −0.2926 | 0.8450 | 0.8942 |
| −0.5855 | 0.6759 | 0.8942 |
| −0.8780 | 0.1691 | 0.8942 |
| −0.8780 | −0.1691 | 0.8942 |
| −0.5855 | −0.6759 | 0.8942 |
| −0.2926 | −0.8450 | 0.8942 |
| 0.2926 | −0.8450 | 0.8942 |
| 0.5855 | −0.6759 | 0.8942 |
| 0.8780 | −0.1691 | 0.8942 |
| 0.9379 | 0.0654 | 0.9402 |
| 0.8951 | 0.2875 | 0.9402 |
| 0.8462 | 0.4096 | 0.9402 |
| 0.7779 | 0.5281 | 0.9402 |
| 0.6966 | 0.6314 | 0.9402 |
| 0.5256 | 0.7795 | 0.9402 |
| 0.4123 | 0.8450 | 0.9402 |
| 0.1986 | 0.9190 | 0.9402 |
| 0.0684 | 0.9377 | 0.9402 |
| −0.0684 | 0.9377 | 0.9402 |
| −0.1986 | 0.9190 | 0.9402 |
| −0.4123 | 0.8450 | 0.9402 |
| −0.5256 | 0.7795 | 0.9402 |
| −0.6966 | 0.6314 | 0.9402 |
| −0.7779 | 0.5281 | 0.9402 |
| −0.8462 | 0.4096 | 0.9402 |
| −0.8951 | 0.2875 | 0.9402 |
| −0.9379 | 0.0654 | 0.9402 |
| −0.9379 | −0.0654 | 0.9402 |
| −0.8951 | −0.2875 | 0.9402 |
| −0.8462 | −0.4096 | 0.9402 |
| −0.7779 | −0.5281 | 0.9402 |
| −0.6966 | −0.6314 | 0.9402 |
| −0.5256 | −0.7795 | 0.9402 |
| −0.4123 | −0.8450 | 0.9402 |
| −0.1986 | −0.9190 | 0.9402 |
| −0.0684 | −0.9377 | 0.9402 |
| 0.0684 | −0.9377 | 0.9402 |
| 0.1986 | −0.9190 | 0.9402 |
| 0.4123 | −0.8450 | 0.9402 |
| 0.5256 | −0.7795 | 0.9402 |
| 0.6966 | −0.6314 | 0.9402 |
| 0.7779 | −0.5281 | 0.9402 |
| 0.8462 | −0.4096 | 0.9402 |
| 0.8951 | −0.2875 | 0.9402 |
| 0.9379 | −0.0654 | 0.9402 |

TABLE 1k 199 lenslets
density of lenslets 0.8388
radius of lenslets 0.0649

| x | y | distance to center |
|---|---|---|
| 0.0000 | 0.0000 | 0.0000 |
| 0.0930 | 0.0906 | 0.1299 |
| −0.0320 | 0.1259 | 0.1299 |
| −0.1250 | 0.0352 | 0.1299 |
| −0.0930 | −0.0906 | 0.1299 |
| 0.0320 | −0.1259 | 0.1299 |
| 0.1250 | −0.0352 | 0.1299 |
| 0.2180 | 0.0554 | 0.2249 |
| 0.0610 | 0.2165 | 0.2249 |
| −0.1570 | 0.1611 | 0.2249 |
| −0.2180 | −0.0554 | 0.2249 |
| −0.0610 | −0.2165 | 0.2249 |
| 0.1570 | −0.1611 | 0.2249 |
| 0.1860 | 0.1812 | 0.2597 |
| −0.0640 | 0.2517 | 0.2597 |
| −0.2500 | 0.0705 | 0.2597 |
| −0.1860 | −0.1812 | 0.2597 |
| 0.0640 | −0.2517 | 0.2597 |
| 0.2500 | −0.0705 | 0.2597 |
| 0.3430 | 0.0202 | 0.3436 |

TABLE 1k-continued 199 lenslets
density of lenslets 0.8388
radius of lenslets 0.0649

| x | y | distance to center |
|---|---|---|
| 0.3110 | 0.1460 | 0.3436 |
| 0.1540 | 0.3071 | 0.3436 |
| 0.0290 | 0.3423 | 0.3436 |
| −0.1889 | 0.2869 | 0.3436 |
| −0.2819 | 0.1963 | 0.3436 |
| −0.3430 | −0.0202 | 0.3436 |
| −0.3110 | −0.1460 | 0.3436 |
| −0.1540 | −0.3071 | 0.3436 |
| −0.0290 | −0.3423 | 0.3436 |
| 0.1889 | −0.2869 | 0.3436 |
| 0.2819 | −0.1963 | 0.3436 |
| 0.2790 | 0.2719 | 0.3896 |
| −0.0959 | 0.3776 | 0.3896 |
| −0.3749 | 0.1057 | 0.3896 |
| −0.2790 | −0.2719 | 0.3896 |
| 0.0959 | −0.3776 | 0.3896 |
| 0.3749 | −0.1057 | 0.3896 |
| 0.4360 | 0.1108 | 0.4498 |
| 0.1220 | 0.4329 | 0.4498 |
| −0.3139 | 0.3222 | 0.4498 |
| −0.4360 | −0.1108 | 0.4498 |
| −0.1220 | −0.4329 | 0.4498 |
| 0.3139 | −0.3222 | 0.4498 |
| 0.4040 | 0.2366 | 0.4682 |
| 0.2470 | 0.3977 | 0.4682 |
| −0.0030 | 0.4682 | 0.4682 |
| −0.2209 | 0.4128 | 0.4682 |
| −0.4069 | 0.2315 | 0.4682 |
| −0.4679 | 0.0151 | 0.4682 |
| −0.4040 | −0.2366 | 0.4682 |
| −0.2470 | −0.3977 | 0.4682 |
| 0.0030 | −0.4682 | 0.4682 |
| 0.2209 | −0.4128 | 0.4682 |
| 0.4069 | −0.2315 | 0.4682 |
| 0.4679 | −0.0151 | 0.4682 |
| 0.3720 | 0.3625 | 0.5194 |
| −0.1279 | 0.5034 | 0.5194 |
| −0.4999 | 0.1409 | 0.5194 |
| −0.3720 | −0.3625 | 0.5194 |
| 0.1279 | −0.5034 | 0.5194 |
| 0.4999 | −0.1409 | 0.5194 |
| 0.5609 | 0.0756 | 0.5660 |
| 0.5290 | 0.2014 | 0.5660 |
| 0.2150 | 0.5236 | 0.5660 |
| 0.0900 | 0.5588 | 0.5660 |
| −0.3459 | 0.4480 | 0.5660 |
| −0.4389 | 0.3574 | 0.5660 |
| −0.5609 | −0.0756 | 0.5660 |
| −0.5290 | −0.2014 | 0.5660 |
| −0.2150 | −0.5236 | 0.5660 |
| −0.0900 | −0.5588 | 0.5660 |
| 0.3459 | −0.4480 | 0.5660 |
| 0.4389 | −0.3574 | 0.5660 |
| 0.4970 | 0.3273 | 0.5951 |
| −0.0349 | 0.5940 | 0.5951 |
| −0.5319 | 0.2668 | 0.5951 |
| −0.4970 | −0.3273 | 0.5951 |
| 0.0349 | −0.5940 | 0.5951 |
| 0.5319 | −0.2668 | 0.5951 |
| 0.3405 | 0.4902 | 0.5968 |
| −0.2542 | 0.5400 | 0.5968 |
| −0.5948 | 0.0498 | 0.5968 |
| −0.3405 | −0.4902 | 0.5968 |
| 0.2542 | −0.5400 | 0.5968 |
| 0.5948 | −0.0498 | 0.5968 |
| 0.4650 | 0.4531 | 0.6493 |
| −0.1599 | 0.6292 | 0.6493 |
| −0.6249 | 0.1761 | 0.6493 |
| −0.4650 | −0.4531 | 0.6493 |
| 0.1599 | −0.6292 | 0.6493 |
| 0.6249 | −0.1761 | 0.6493 |
| 0.6220 | 0.2920 | 0.6871 |
| 0.0581 | 0.6846 | 0.6871 |
| −0.5639 | 0.3926 | 0.6871 |
| −0.6220 | −0.2920 | 0.6871 |
| −0.0581 | −0.6846 | 0.6871 |
| 0.5639 | −0.3926 | 0.6871 |
| 0.6875 | 0.0464 | 0.6890 |
| 0.3036 | 0.6185 | 0.6890 |
| −0.3839 | 0.5722 | 0.6890 |
| −0.6875 | −0.0464 | 0.6890 |
| −0.3036 | −0.6185 | 0.6890 |
| 0.3839 | −0.5722 | 0.6890 |
| 0.6803 | 0.1760 | 0.7027 |
| 0.1877 | 0.6771 | 0.7027 |
| −0.4926 | 0.5011 | 0.7027 |
| −0.6803 | −0.1760 | 0.7027 |
| −0.1877 | −0.6771 | 0.7027 |
| 0.4926 | −0.5011 | 0.7027 |
| 0.5900 | 0.4179 | 0.7230 |
| −0.0669 | 0.7199 | 0.7230 |
| −0.6569 | 0.3020 | 0.7230 |
| −0.5900 | −0.4179 | 0.7230 |
| 0.0669 | −0.7199 | 0.7230 |
| 0.6569 | −0.3020 | 0.7230 |
| 0.4299 | 0.5843 | 0.7255 |
| −0.2911 | 0.6645 | 0.7255 |
| −0.7210 | 0.0802 | 0.7255 |
| −0.4299 | −0.5843 | 0.7255 |
| 0.2911 | −0.6645 | 0.7255 |
| 0.7210 | −0.0802 | 0.7255 |
| 0.5544 | 0.5473 | 0.7790 |
| −0.1968 | 0.7538 | 0.7790 |
| −0.7512 | 0.2065 | 0.7790 |
| −0.5544 | −0.5473 | 0.7790 |
| 0.1968 | −0.7538 | 0.7790 |
| 0.7512 | −0.2065 | 0.7790 |
| 0.7149 | 0.3827 | 0.8109 |
| 0.0261 | 0.8105 | 0.8109 |
| −0.6889 | 0.4278 | 0.8109 |
| −0.7149 | −0.3827 | 0.8109 |
| −0.0261 | −0.8105 | 0.8109 |
| 0.6889 | −0.4278 | 0.8109 |
| 0.8126 | 0.0118 | 0.8127 |
| 0.3961 | 0.7097 | 0.8127 |
| −0.4166 | 0.6979 | 0.8127 |
| −0.8126 | −0.0118 | 0.8127 |
| −0.3961 | −0.7097 | 0.8127 |
| 0.4166 | −0.6979 | 0.8127 |
| 0.7732 | 0.2667 | 0.8179 |
| 0.1557 | 0.8030 | 0.8179 |
| −0.6175 | 0.5363 | 0.8179 |
| −0.7732 | −0.2667 | 0.8179 |
| −0.1557 | −0.8030 | 0.8179 |
| 0.6175 | −0.5363 | 0.8179 |
| 0.8082 | 0.1416 | 0.8205 |
| 0.2815 | 0.7707 | 0.8205 |
| −0.5267 | 0.6291 | 0.8205 |
| −0.8082 | −0.1416 | 0.8205 |
| −0.2815 | −0.7707 | 0.8205 |
| 0.5267 | −0.6291 | 0.8205 |
| 0.6794 | 0.5121 | 0.8507 |
| −0.1038 | 0.8444 | 0.8507 |
| −0.7831 | 0.3323 | 0.8507 |
| −0.6794 | −0.5121 | 0.8507 |
| 0.1038 | −0.8444 | 0.8507 |
| 0.7831 | −0.3323 | 0.8507 |
| 0.5550 | 0.6771 | 0.8755 |
| −0.3089 | 0.8192 | 0.8755 |
| −0.8639 | 0.1420 | 0.8755 |
| −0.5550 | −0.6771 | 0.8755 |
| 0.3089 | −0.8192 | 0.8755 |
| 0.8639 | −0.1420 | 0.8755 |
| 0.9015 | 0.2319 | 0.9309 |
| 0.2499 | 0.8967 | 0.9309 |
| −0.6516 | 0.6648 | 0.9309 |
| −0.9015 | −0.2319 | 0.9309 |
| −0.2499 | −0.8967 | 0.9309 |

TABLE 1k-continued 199 lenslets
density of lenslets 0.8388
radius of lenslets 0.0649

| x | y | distance to center |
|---|---|---|
| 0.6516 | −0.6648 | 0.9309 |
| 0.9301 | 0.0967 | 0.9351 |
| 0.8627 | 0.3608 | 0.9351 |
| 0.8044 | 0.4768 | 0.9351 |
| 0.6799 | 0.6419 | 0.9351 |
| 0.4959 | 0.7928 | 0.9351 |
| 0.3813 | 0.8538 | 0.9351 |
| 0.1189 | 0.9275 | 0.9351 |
| −0.0108 | 0.9350 | 0.9351 |
| −0.2159 | 0.9098 | 0.9351 |
| −0.4386 | 0.8258 | 0.9351 |
| −0.5488 | 0.7571 | 0.9351 |
| −0.7438 | 0.5667 | 0.9351 |
| −0.8151 | 0.4582 | 0.9351 |
| −0.8959 | 0.2679 | 0.9351 |
| −0.9345 | 0.0330 | 0.9351 |
| −0.9301 | −0.0967 | 0.9351 |
| −0.8627 | −0.3608 | 0.9351 |
| −0.8044 | −0.4768 | 0.9351 |
| −0.6799 | −0.6419 | 0.9351 |
| −0.4959 | −0.7928 | 0.9351 |
| −0.3813 | −0.8538 | 0.9351 |
| −0.1189 | −0.9275 | 0.9351 |
| 0.0108 | −0.9350 | 0.9351 |
| 0.2159 | −0.9098 | 0.9351 |
| 0.4386 | −0.8258 | 0.9351 |
| 0.5488 | −0.7571 | 0.9351 |
| 0.7438 | −0.5667 | 0.9351 |
| 0.8151 | −0.4582 | 0.9351 |
| 0.8959 | −0.2679 | 0.9351 |
| 0.9345 | −0.0330 | 0.9351 |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An illumination device comprising:
  a plurality of light sources emitting light along an optical axis;
  an optical gate arranged along the optical axis;
  a light collector arranged between the plurality of light sources and the optical gate, the light collector is adapted to collect light from a plurality of light sources, the light collector comprises a plurality of lenslets adapted to collect light from the plurality of light sources and adapted to convert the collected light into a plurality of light beams so that the plurality of light beams propagate along an optical axis and through the optical gate; where each of the lenslets comprises an entrance surface where the light enters the lenslet and an exit surface where the light exits the lenslet, and wherein the lenslets are arranged in a pattern including adjacent lenslets; and
  an optical projecting system adapted to collect at least a part of the plurality of light beams and adapted to image the optical gate at a distance along the optical axis;
  wherein the lenslets of at least some pairs of the adjacent lenslets have different optical power and wherein the exit surfaces of the pairs of the adjacent lenslets including different optical power meet along a boundary.

2. The illumination device of claim 1 wherein the boundary along which exit surfaces of adjacent surfaces meet is at least 1 mm long.

3. The illumination device of claim 1 wherein the exit surfaces of the pairs of the adjacent lenslets have different curvature and wherein the boundary is curved.

4. The illumination device of claim 1 wherein at least some of the adjacent lenslets are separated by a substantial plane zone, where the substantial plane zone meet with the exit surface of adjacent surfaces.

5. The illumination device of claim 1 wherein the pattern is a dense circular pattern including adjacent lenslets.

6. The illumination device of claim 1 wherein the optical axes of at least some of the lenslets are angled relative to the optical axis.

7. The illumination device of claim 6 wherein an angle of angled lenslets depends on a distance from the angled lenslet to the optical axis, so that lenslets having a substantially same distance to the optical axis have a same angle.

8. The illumination device of claim 1 wherein a longitudinal position along the optical axis of adjacent lenslets are different for at least some of the adjacent lenslets.

9. The illumination device of claim 8, wherein the longitudinal position of the lenslets depend on a distance from the lenslet to the optical axis, so that lenslets having a same or substantially same distance to the optical axis have a same longitudinal position.

10. The illumination device of claim 1 wherein the optical axes of at least some of the lenslets are angled relative to the optical axis and where an angle of the angled lenslets depends on a distance from an angled lenslet to the optical axis and wherein a longitudinal position along the optical axis of adjacent lenslets are different for at least some of the adjacent lenslets and where a longitudinal position of the lenslets depend on the distance from the lenslet to the optical axis, so that lenslets having a substantially same distance to the optical axis have a same angle and a same longitudinal position.

11. The illumination device of claim 1 wherein the lenslets comprise a plurality of outermost adjacent lenslets located along an outer boundary, wherein each of the outermost adjacent lenslets has a same radial distance to a center of the light collector.

12. The illumination device of claim 11 wherein each of the outermost adjacent lenslets are located adjacent to two other outermost adjacent lenslets so that exit surfaces of the outermost adjacent lenslets meet along a boundary.

13. The illumination device of claim 1 wherein the light collector is molded as a one piece light collector.

14. A method of providing an illumination device, the method comprising:
  arranging a plurality of light sources to emit light along an optical axis;
  arranging an optical gate along the optical axis;
  providing and arranging a light collector to collect light from the plurality of light sources, wherein the light collector is to collect light from a plurality of light sources, wherein the light collector comprises a plurality of lenslets adapted to collect light from the plurality of light sources and adapted to convert the collected light into a plurality of light beams so that the plurality of light beams propagate along the optical axis and through the optical gate, wherein each lenslet comprises an entrance surface where the light enters the lenslet and an exit surface where the light exits the lenslet, and wherein each lenslet has a substantial uniform circular cross section of the lenslet, and providing an optical projecting system to collect at least a part of the plurality of light beams passing through the optical gate, the optical projecting system is adapted to image the optical gate at a distance along said optical axis;

wherein providing the light collector comprises:

providing at least one pair of adjacent lenslets, where the lenslets of the at least one pair of the adjacent lenslets have different optical power; and providing the pair of adjacent lenslets in a state where the exit surfaces of the pairs of the adjacent lenslets having different optical power meet along a boundary.

15. The method of claim 14 wherein providing the pair of adjacent lenslets in a state where the exit surfaces of the pairs of the adjacent lenslets having different optical power meet along a boundary comprises:

extending a volume of at least one of the adjacent lenslets.

16. The method of claim 15 wherein extending the volume of at least one of said adjacent lenslets comprises:

extending a curved exit surface or the entrance surface of one of the adjacent lenslets until an extended part meets at a surface of another adjacent surface.

17. The method of claim 14 wherein providing the pair of adjacent lenslets in a state where the exit surfaces of the pairs of the adjacent lenslets having different optical power meet along a boundary comprises:

extending a volume of both of the adjacent lenslets.

18. The method of claim 15 wherein extending the volume of both of the adjacent lenslets comprises:

extending curved exit surfaces of both of the adjacent lenses until the curved exit surfaces meet.

19. The method of claim 15 wherein extending the volume of both of the adjacent lenslets comprises:

extending curved entrance surfaces of both of the adjacent lenses until the curved entrance surfaces meet.

20. An illumination device comprising:

a plurality of light sources for emitting light along an optical axis;

an optical gate arranged along the optical axis;

a light collector arranged between the plurality of light sources and the optical gate, wherein the light collector is adapted to collect light from a plurality of light sources, the light collector comprises a plurality of lenslets adapted to collect light from the plurality of light sources and adapted to convert the collected light into a plurality of light beams to propagate along an optical axis and through the optical gate; where each of the lenslets comprises an entrance surface and where the light enters the lenslet and an exit surface where the light exits the lenslet, and wherein the lenslets are arranged in a pattern including adjacent lenslets; and an optical projecting system adapted to collect at least a part of the plurality of light beams and adapted to image the optical gate at a distance along the optical axis;

wherein the lenslets of at least some pairs of the adjacent lenslets have different optical power and wherein the exit surfaces of the pairs of the adjacent lenslets that include a different optical power meet along a boundary.

\* \* \* \* \*